US008176145B1

(12) United States Patent
Stender et al.

(10) Patent No.: US 8,176,145 B1
(45) Date of Patent: May 8, 2012

(54) SYSTEM AND METHOD FOR PROVIDING INSURANCE DATA PROCESSING SERVICES VIA A USER INTERFACE

(75) Inventors: Mark J. Stender, Avon, CT (US); Ruth B. Terray, Marlborough, CT (US); Donald White, Amston, CT (US); Linda Hirning, Rocky Hill, CT (US); Eric Neely, Simsbury, CT (US); Charlene G. Woronowicz, Spring, TX (US)

(73) Assignee: The Travelers Indemnity Company, Hartford, CT (US)

( * ) Notice: Subject to any disclaimer, the term of this patent is extended or adjusted under 35 U.S.C. 154(b) by 1446 days.

(21) Appl. No.: 11/546,018

(22) Filed: Oct. 10, 2006
(Under 37 CFR 1.47)

Related U.S. Application Data

(63) Continuation-in-part of application No. 09/909,751, filed on Jul. 23, 2001, now abandoned, and a continuation-in-part of application No. 10/150,576, filed on May 17, 2002, now Pat. No. 7,490,050, which is a continuation-in-part of application No. 09/860,679, filed on May 18, 2001, now abandoned.

(60) Provisional application No. 60/219,691, filed on Jul. 21, 2000, provisional application No. 60/206,007, filed on May 19, 2000, provisional application No. 60/291,999, filed on May 18, 2001.

(51) Int. Cl.
*G06F 15/16* (2006.01)
*G06Q 40/00* (2006.01)
(52) U.S. Cl. ........... 709/219; 705/4; 707/999.001; 707/999.003; 712/1
(58) Field of Classification Search .......... 705/4; 707/999.001, 999.003; 709/219; 712/1
See application file for complete search history.

(56) References Cited

U.S. PATENT DOCUMENTS

| 4,831,526 | A | * | 5/1989 | Luchs et al. ............ 705/4 |
|---|---|---|---|---|
| 5,182,705 | A | | 1/1993 | Barr et al. |
| 5,191,522 | A | | 3/1993 | Bosco et al. |
| 5,262,940 | A | | 11/1993 | Sussman |
| 5,493,105 | A | | 2/1996 | Desai |
| 5,523,942 | A | * | 6/1996 | Tyler et al. ............ 705/4 |
| 5,655,085 | A | * | 8/1997 | Ryan et al. ............ 705/4 |
| 5,701,451 | A | | 12/1997 | Rogers et al. |
| 5,754,830 | A | | 5/1998 | Butts et al. |

(Continued)

OTHER PUBLICATIONS

U.S. Appl. No. 09/843,841, filed Apr. 30, 2001.

(Continued)

*Primary Examiner* — Alina N. Boutah
(74) *Attorney, Agent, or Firm* — Stroock & Stroock & Lavan LLP

(57) ABSTRACT

A system architecture for providing remote access to insurance applications from a remote location is provided, including: a presentation layer located at the remote location that provides tools for navigating within one of the insurance applications and executing business transactions, wherein the presentation layer is based on web browser technology; an application layer that enforces predetermined rules of business on commands and transactions input from the remote location; a data access layer that manages physical storage of data relating to the insurance applications in databases and provides the application layer with access to application data; and a distributed technical layer separating a presentation logic of the presentation layer from an application logic of the application layer, wherein the distributed technical layer is configured to coordinate an execution of the insurance applications on one or more different platforms.

28 Claims, 55 Drawing Sheets

U.S. PATENT DOCUMENTS

| | | | |
|---|---|---|---|
| 5,768,578 A | | 6/1998 | Kirk et al. |
| 5,793,964 A | | 8/1998 | Rogers et al. |
| 5,796,932 A | | 8/1998 | Fox et al. |
| 5,828,840 A | * | 10/1998 | Cowan et al. ............ 709/203 |
| 5,850,442 A | * | 12/1998 | Muftic ..................... 705/65 |
| 5,870,719 A | | 2/1999 | Maritzen et al. |
| 5,873,066 A | | 2/1999 | Underwood et al. |
| 5,893,072 A | | 4/1999 | Zizzamia |
| 5,926,817 A | | 7/1999 | Christeson et al. |
| 5,956,691 A | | 9/1999 | Powers |
| 5,974,430 A | | 10/1999 | Mutschler et al. |
| 5,978,799 A | | 11/1999 | Hirsch |
| 5,987,434 A | | 11/1999 | Libman |
| 6,009,402 A | * | 12/1999 | Whitworth ................ 705/4 |
| 6,067,525 A | * | 5/2000 | Johnson et al. ........... 705/7.13 |
| 6,073,242 A | * | 6/2000 | Hardy et al. .............. 726/1 |
| 6,078,890 A | | 6/2000 | Mangin et al. |
| 6,088,677 A | * | 7/2000 | Spurgeon .................. 705/4 |
| 6,122,632 A | | 9/2000 | Botts et al. |
| 6,144,944 A | | 11/2000 | Kurtzman, II et al. |
| 6,144,990 A | | 11/2000 | Brandt et al. |
| 6,175,831 B1 | | 1/2001 | Weinreich et al. |
| 6,330,551 B1 | * | 12/2001 | Burchetta et al. ......... 705/80 |
| 6,347,306 B1 | * | 2/2002 | Swart ....................... 705/32 |
| 6,587,836 B1 | | 7/2003 | Ahlberg et al. |
| 6,615,253 B1 | | 9/2003 | Bowman-Amuah |
| 6,615,258 B1 | | 9/2003 | Barry et al. |
| 6,682,421 B1 | | 1/2004 | Rowe et al. |
| 6,684,196 B1 | * | 1/2004 | Mini et al. ................ 705/14.34 |
| 6,721,713 B1 | * | 4/2004 | Guheen et al. ............ 705/1.1 |
| 6,898,597 B1 | * | 5/2005 | Cook et al. ............... 1/1 |
| 6,922,720 B2 | | 7/2005 | Cianciarulo et al. |
| 6,938,022 B1 | * | 8/2005 | Singhal ..................... 705/74 |
| 7,107,325 B1 | * | 9/2006 | Krish ........................ 709/220 |
| 7,124,088 B2 | * | 10/2006 | Bauer et al. .............. 705/4 |
| 7,127,414 B1 | * | 10/2006 | Awadallah et al. ........ 705/26.8 |
| 7,330,826 B1 | * | 2/2008 | Porat et al. ............... 705/26.3 |
| 7,343,310 B1 | * | 3/2008 | Stender ..................... 705/4 |
| 7,389,246 B1 | * | 6/2008 | Ohrt .......................... 705/4 |
| 7,401,025 B1 | * | 7/2008 | Lokitz ...................... 705/346 |
| 7,640,176 B1 | * | 12/2009 | Aldrich et al. ............ 705/4 |
| 7,707,505 B1 | * | 4/2010 | Ohrt et al. ................. 715/738 |
| 2002/0002475 A1 | * | 1/2002 | Freedman et al. ......... 705/4 |
| 2002/0024537 A1 | | 2/2002 | Jones et al. |
| 2002/0026334 A1 | * | 2/2002 | Igoe ......................... 705/4 |
| 2002/0042763 A1 | * | 4/2002 | Pillay et al. ............... 705/35 |
| 2002/0091550 A1 | * | 7/2002 | White et al. .............. 705/4 |
| 2002/0111725 A1 | | 8/2002 | Burge |
| 2002/0111835 A1 | * | 8/2002 | Hele et al. ................ 705/4 |
| 2002/0116228 A1 | * | 8/2002 | Bauer et al. .............. 705/4 |
| 2002/0184163 A1 | * | 12/2002 | Lotter et al. .............. 705/67 |
| 2002/0188484 A1 | * | 12/2002 | Grover et al. ............. 705/4 |
| 2002/0198743 A1 | * | 12/2002 | Ariathurai et al. ........ 705/4 |
| 2003/0093302 A1 | | 5/2003 | Quido et al. |
| 2003/0144884 A1 | * | 7/2003 | Mayaud .................... 705/3 |
| 2004/0015422 A1 | * | 1/2004 | Glick et al. ............... 705/34 |

OTHER PUBLICATIONS

U.S. Appl. No. 09/860,679, filed May 18, 2001.
U.S. Appl. No. 10/150,576, filed May 17, 2002.
U.S. Appl. No. 09/909,866, filed Jul. 23, 2001.
Strazewski Len, "Flexible Technology Resolves hardcore Business Issues", Rough Notes, vol. 10, p. 143 (Oct. 2000).
www.netquote.com, submitted Dec. 26, 2006.
www.prudential.com, submitted Dec. 26, 2006.
www.ehealthinsurance.com, Sep. 13, 2005.
www.insureme.com, Sep. 13, 2005.
Savage, Terry. Web site lets you compare car insurance quotes. Chicago Sun-Times, Chicago, IL, p. 49 (Jul. 18, 1999).
Insure.com Announces October Launch of CARS(SM) by PR Newswire. pp. 1-3. New York (Sep. 28, 1999).
Technology Update. American Agent & Broker. 71:7 (Jul. 1999).
Money-Go-Round: Driving a Deal On-Line: The Internet Offers Cheap Quotes for Car Insurance. Daily Telegraph (Jul. 11, 1998).
Shopping for Car Insurance Online Doesn't Kill the Pain. Mixed Results: Digging for Quotes Can Be Frustrating, But It Beats Phone Tag With Agents. Atlanta Constitution (Feb. 7, 2000).
New Opportunities to Sell Insurance Products (Emerge for Banks). Bank Marketing. 32:10 (Oct. 2000).
Dual Strategy. (Company Business and Marketing). Insurance and Technology. 25:7 (Jul. 2000).
Commonwealth Bank Takes Net Honors. Retail Banker International. (Apr. 22, 1999).
Anthem Health of New York Brings Group Health Insurance to the Web; Anthem Site Gives Employers and Brokers Immediate Group Quotes Online. Business Wire (Apr. 8, 1999).
CitX Announces New Internet-Based E Commerce Platform for Insurance Companies to Automate Marketing, Underwriting, and Distribution of Insurance Products. PR Newswire (Sep. 21, 1998).
A Powerful Offering. Distribution Management Briefing (Mar. 2000).
Microsoft Press, Microsoft Corporation, Microsoft Press Computer Dictionary, 3rd Edition, c. 1997, pp. 268 and 305.
Finding Intranet Solutions at Comdex. Communications Week. 63:95-7 (Nov. 18, 1996).
Solect Launches IAF 2.5, A Comprehensive Billing and Customer Care Solution; Software Infrastructure Enables Service Providers to Grow Their Internet Business. Business Wire. p. 3090284 (Mar. 9, 1998).
SiteBridge Corporation Launches CustomerNow for Real-Time Customer Service on the Web. Business Wire, p. 4271173 (Apr. 27, 1998).
MATRAnet Addresses Gap in Customer Relations, Enabling Companies to Maximize Web Sales. M2 Presswire (Jun. 9, 1999).
Grigonis, Richard. App Gens: More Than Just IVR. Computer Telephony. 7:9, 54 (Sep. 1999).
Yen, J. et al. Collaborative and Scalable Financial Analysis with Multi-Agent Technology. Proceedings of the 32nd Hawaii International Conference on System Sciences. (Mar. 1999).
HomeCom and Progressive Auto Insurance Delivering Online Insurance; Automobile and Motorcycle Insurance Will be Available Using the Internet Business Editors. Business Wire. pp. 1-3 (May 14, 1999).

* cited by examiner

EXAMPLES OF DATA TABLES

| # | Table |
|---|---|
| 100 | Auto Quote |
| 102 | Coverage |
| 104 | Driver |
| 106 | Driver Incident |
| 108 | Driver Usage |
| 110 | Model Name |
| 112 | Quote Survey |
| 114 | Survey Answer |
| 116 | Survey Question |
| 118 | Symb |
| 120 | Vehicle |
| 122 | VIN |
| 124 | Visit |
| 126 | Visitor |
| 128 | Visitor Filter |
| 130 | Queue |
| 132 | Optional Financial Information |
| 134 | Agent Distribution |
| 136 | Current Carrier |
| 138 | Quote Switch |
| 140 | Zip Code |

FIG. 4

| Purpose | Hardware/Operating System |
|---|---|
| Web Server | Compaq / 2 x 700 Mhz CPU / 2GB RAM<br>Windows 2000 Advanced Server SP1 |
| Application Server | Compaq / 2 x 833 Mhz CPU / 2GB RAM<br>Windows 2000 Advanced Server SP1 |
| Database Server | Sun Ultra 2 / 2 x 400 Mhz CPU / 2GB RAM<br>Sun Solaris 2.6 Kernel Patch Revision 21 |
| MI Database Server | Compaq / 4 x 700 Mhz CPU / 2GB RAM<br>Windows 2000 Advanced Server SP1 |

Fig. 12

| Purpose | Software |
|---|---|
| Web Server | Internet Information Server (IIS) 5.0 |
| Application Server | BEA WebLogic Application Server v5.0 SP6<br>Java Development Kit JDK v1.3.0<br>Oracle Client – Version 8.1.6<br>Java API for XML Parsing v1.1<br>Java Mail API v1.2<br>JavaBeans Activation Framework v1.0.1<br>MQSeries Client for Java v3.0 |
| Database Server | Oracle Server Enterprise Edition – Version 8.1.6 |
| MI Database Server | Microsoft SQLServer Version 7.0 |

Travelers Insurance — Travelers Insurance Center — eQuote

YOU'RE BETTER OFF UNDER THE UMBRELLA

Travelers Products | Background Information | Driver Information

Now we need to collect information about all the drivers in your household.

Driver 1 —— 326

| Field | Value |
|---|---|
| First name | AMELIA |
| Last name | SWEETING |
| Email address (e.g. name@aol.com) | lhirning@travelers.com |
| Home phone | 860 - 954 - 8187 |
| Work phone (if applicable) | 860 - 954 - 8187 |
| Social Security Number Why is this important? | 314 - 34 - 1450 |
| Birthdate | January / 1 / 1950 |
| Gender | ○ Male ○ Female |
| Marital status | Divorced |
| Age when first licensed in US or Canada | 16 |
| Residence street address | 2629 SOUTHPORT |
| Residence City/State/Zip | CHICAGO, IL 60614 |
| Mailing Street Address (leave blank if same as Residence) | |
| Mailing State/Zip | IL  60614 |

Fig. 18

Figure 20:
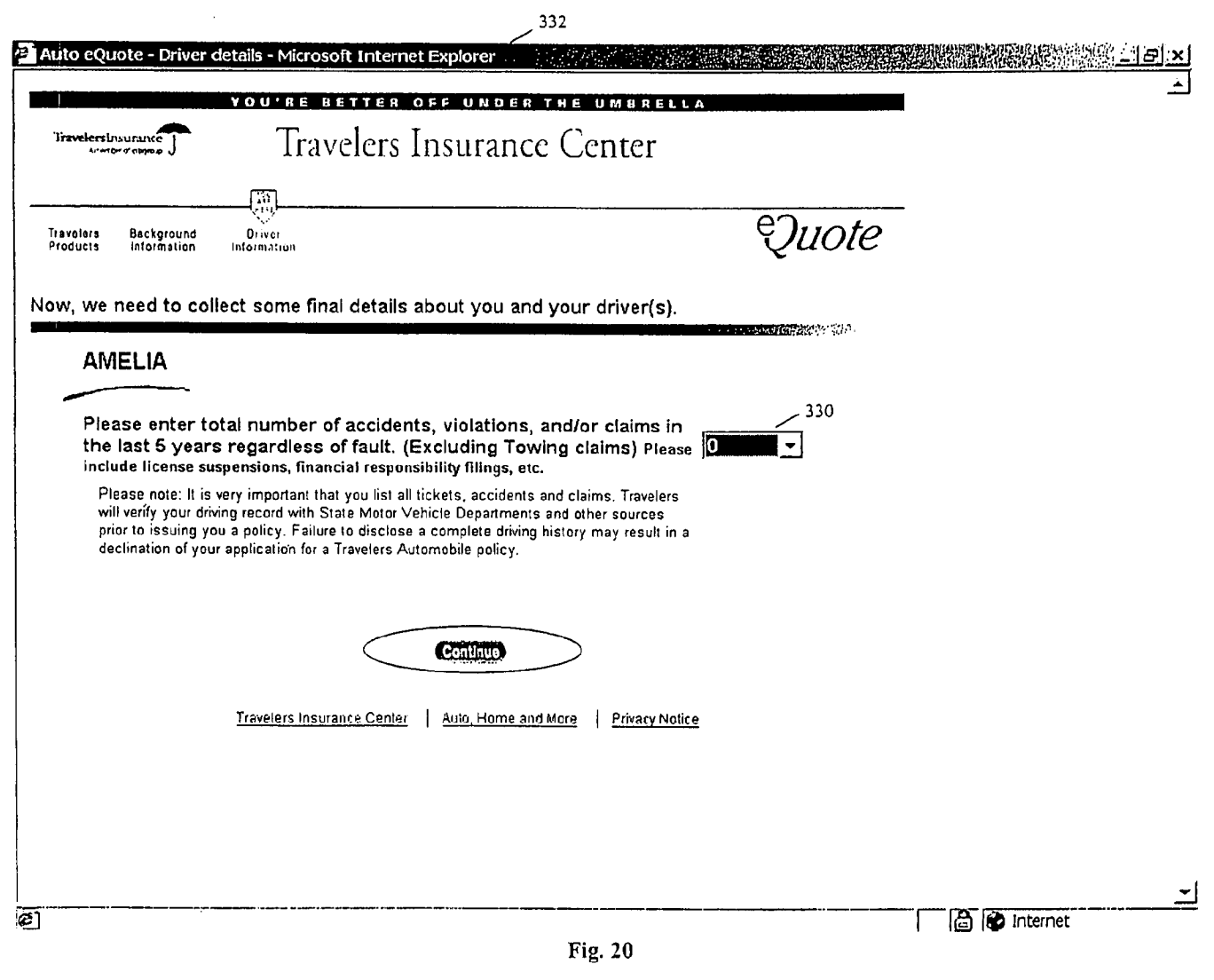

TravelersInsurance

Travelers Insurance Center eQuote

Travelers Products | Background Information | Driver Information

Now, we need to collect some final details about you and your driver(s).

AMELIA

Please enter total number of accidents, violations, and/or claims in the last 5 years regardless of fault. (Excluding Towing claims) Please include license suspensions, financial responsibility filings, etc. — 330 [0 ▼]

Please note: It is very important that you list all tickets, accidents and claims. Travelers will verify your driving record with State Motor Vehicle Departments and other sources prior to issuing you a policy. Failure to disclose a complete driving history may result in a declination of your application for a Travelers Automobile policy.

(Continue)

Travelers Insurance Center | Auto, Home and More | Privacy Notice

Travelers Insurance Center eQuote

| Travelers Products | Background Information | Driver Information | Vehicle Information | Coverage Information | Insurance Information |

Please answer the following questions... — 350

*...We're Almost Done!*

Has any household member owned or leased a car and been uninsured greater than 30 days?  ○ Yes  ● No Is any driver in the household currently without a valid U.S. or Canadian drivers license?  ○ Yes  ● No

[Continue]

Travelers Insurance Center | Auto, Home and More | Privacy Notice

Fig. 31

Travelers Insurance Center — eQuote

| Travelers Products | Background Information | Driver Information | Vehicle Information | Coverage Information | Insurance Information |

Statement Of Understanding. —— 390

- eQuotes are not applications for insurance. The questions asked in these eQuote requests may vary from the questions asked on an application in a particular state. Receipt of an eQuote does not guarantee that your application will be accepted should you apply for insurance. Likewise, our inability to provide you with a eQuote does not always mean that your application for insurance will be rejected.
- eQuotes are based on the information you provide, please be as accurate as possible. It is possible based upon this information, that you may not get an eQuote.
- eQuotes are estimates and subject to change based on verification of actual VIN numbers, claim and credit history and/or driving record.
- Any policies issued will be underwritten by the Travelers Indemnity Company, The Standard Fire Insurance Company or their property casualty affiliates or subsidiaries, One Tower Square, Hartford, CT 06183.
- Insurance products are not deposits, not FDIC-insured, not bank guaranteed and not a condition to any bank services.
- You have the right to choose any insurance agent or company you wish and your choice shall not affect your banking relationship(s) with the financial institution that may have referred you to Travelers.

Fig. 32

Travelers Insurance Center

YOU'RE BETTER OFF UNDER THE UMBRELLA

| Travelers Products | Background Information | Driver Information | Vehicle Information | Coverage Information |

Here is your Auto eQuote. —— 394

Based on the information you've provided, we are pleased to provide you with a preliminary premium estimate of:

$97 per month

*Show me more!*

Please note, this premium is only an estimate and subject to change based on verification of actual VIN numbers, claim history, credit history and/or driving record.

eQuote

Auto eQuote

At Travelers, we think about ways to make your life easier -- so you don't have to.

While there are many excellent reasons for choosing Travelers automobile insurance, the most important is the dependability of the company you buy it from. The cheapest insurance offered by some auto insurers can carry hidden costs: long waits for claim payment or even less protection. You deserve the very best -- at Travelers, you'll get:

- Quality coverage to protect you and what's valuable to you
- Affordable prices and discounts designed to save you money
- Responsive people, resources, and services to handle matters for you, quickly and professionally to save you time
- The best claim service we believe you will find anywhere
- The strength and high industry ratings of Travelers.

*Show me more!*

Please note, this premium is only an estimate and subject to change based on verification of actual VIN numbers, claim history, credit history and/or driving record.

- Quality coverage to protect you and what's valuable to you
- Affordable prices and discounts designed to save you money
- Responsive people, resources, and services to handle matters for you, quickly and professionally to save you time
- The best claim service we believe you will find anywhere
- The strength and high industry ratings of Travelers.

When you add it all up, the benefits of choosing Travelers go far beyond what you would receive from other auto insurance companies.

Next Steps

*You can:*

*Us*  Licensed insurance representatives are available to answer your questions and complete an application. Talk to us about your Auto eQuote today!

398 — *See Details*  Review individual coverages and premiums by vehicle. Your Auto Quote details are only a click away!

*See Options* Change your coverage limits or modify your deductibles. If you haven't already done so, meet our Coverage Wizardsm. It's so easy to explore your options!

Fig. 33b

Travelers Insurance Center eQuote

| Travelers Products | Background Information | Driver Information | Vehicle Information | Coverage Information | Insurance Information | Auto eQuote |

Here are your Auto eQuote details.

Produced exclusively for AMELIA SWEETING on 05/15/2001 using rates and rules in effect at that time.

Driver Information — 400

| Name | Birthdate | Gender | Status | Tickets/Accidents/Claims |
|---|---|---|---|---|
| AMELIA | 01/01/1950 | Female | Divorced | 0 |

Add Driver    Change Driver

Vehicle Information — 402

| Model Year | Make | Model | Body Style | Engine Size |
|---|---|---|---|---|
| 2001 | OLDS | ALERO GLS | 2 DR COUPE | 3.4 liter 6 cylinder |

Add Vehicle    Change Vehicle

Coverage & Premium Information — 404

Fig. 34a

Coverage & Premium Information

|  | 2001 OLDS ALERO GLS |
|---|---|
| Principal Driver | AMELIA |
| Bodily Injury $250,000 / $500,000 | $171.00 |
| Property Damage $200,000 | $115.00 |
| UM $100,000 / $300,000 | $57.00 |
| UND $100,000 / $300,000 | $8.00 |
| Medical Coverage $5,000 | $5.00 |
| Comprehensive $250 | $204.00 |
| Collision $100 | $605.00 |

Estimated Totals By Vehicle     $1,165.00

Total Estimated Annual Premium $1,165

Please note: This *Auto* eQuote is valid for this session only. A subsequent *Auto* eQuote will be based on rates in effect at that time.

Next Steps

*You can:* Licensed insurance representatives are available to answer your questions and complete an application. Talk to us about your *Auto* eQuote today!

Fig. 34b

Next Steps

*You can:*

408 — *U.S.* — Licensed insurance representatives are available to answer your questions and complete an application. Talk to us about your Auto eQuote today!

414 — *Options:* Change your coverage limits or modify your deductibles. If you haven't already done so, meet our Coverage Wizard℠. It's so easy to explore your options!

Important Disclosures

Please note:

- eQuotes are not applications for insurance. The questions asked in these eQuote requests may vary from the questions asked on an application in a particular state. Receipt of an eQuote does not guarantee that your application will be accepted should you apply for insurance. Likewise, our inability to provide you with a eQuote does not always mean that your application for insurance will be rejected.
- eQuotes are based on the information you provide, please be as accurate as possible. It is possible based upon this information, that you may not get an eQuote.
- eQuotes are estimates and subject to change based on verification of actual VIN numbers, claim and credit history and/or driving record.
- Any policies issued will be underwritten by the Travelers Indemnity Company, The Standard Fire Insurance Company or their property casualty affiliates or subsidiaries, One Tower Square, Hartford, CT 06183
- Insurance products are not deposits, not FDIC-insured, not bank guaranteed and not a condition to any bank services.
- You have the right to choose any insurance agent or company you wish and your choice shall not affect your banking relationship(s) with the financial institution that may have referred you to Travelers.

Travelers Insurance Center | Auto, Home and More | Privacy Notice

SYSTEM AND METHOD FOR PROVIDING INSURANCE DATA PROCESSING SERVICES VIA A USER INTERFACE

RELATED APPLICATIONS

This application is a continuation-in-part of U.S. patent application Ser. No. 09/909,751 entitled "SYSTEM AND METHOD FOR PROVIDING INSURANCE DATA PROCESSING SERVICES VIA A USER INTERFACE," filed Jul. 23, 2001, which is herein incorporated by reference in its entirety, which claims the benefit of U.S. Provisional Application No. 60/219,691 "SYSTEM AND METHOD FOR PROVIDING WEB-BASED INTERFACE TO LEGACY INSURANCE APPLICATIONS," filed Jul. 21, 2000, which is herein incorporated by reference in its entirety.

This application is a continuation-in-part of U.S. patent application Ser. No. 10/150,576 filed May 17, 2002, entitled "Method and System for Furnishing an On-Line Quote for an Insurance Product," which claims the benefit of U.S. Provisional Application No. 60/291,999 filed May 18, 2001, entitled "Method and System for Furnishing an On-Line Quote for an Insurance Product (QuickQuote)," and which is a continuation-in-part of U.S. patent application Ser. No. 09/860,679, filed May 18, 2001, entitled "Method and System for Furnishing an On-Line Quote for an Insurance Product," which claims priority to U.S. Provisional Application No. 60/206,007 filed May 19, 2000, entitled "Method and System for Furnishing an On-Line Quote for an Insurance Product (QuickQuote)," all of which are incorporated herein by this reference.

FIELD OF THE INVENTION

The present invention relates generally to the field of electronic commerce, and more particularly to a method and system for providing a user with an on-line, real-time quote for an insurance product, such as an auto insurance product.

In addition, the invention relates to a system and method for a technical infrastructure that is essentially a high-level blue print for how new data processing systems, such as commercial-lines insurance systems, should be built. More specifically, the present invention relates to a system and method for a technical infrastructure that specifies a common set of hardware, operating systems, telecommunications software, middleware, and development tools to provide the bases and interconnections for new data processing systems such as insurance systems. As referred to herein, commercial-lines insurance policies relate to insurance policies for commercial and/or business needs, as opposed to individuals' needs. Examples of commercial-lines insurance include, but not limited to: business owners insurance policy (e.g., Travelers' MasterPac policy); automobile insurance coverage for businesses; workers compensation insurance; and umbrella insurance coverage.

BACKGROUND OF THE INVENTION

Presently available on-line quoting tools for insurance products, such as auto insurance, do not allow a user to receive real-time advice. The current environment consists, for example, of Hypertext Markup Language (HTML) forms that allow a user to enter some of the information needed for the generation of auto quotes. That information is then emailed to a customer support representative (CSR) via a Common Gateway Interface (CGI) process. The CSR subsequently contacts the user to gather additional information and generate a quote, for example, via a legacy system. Thus, it is not possible for the user to receive real-time advice, such as the availability of different types of insurance products or the various coverage requirements of different states.

Building data processing systems is much like building a house. Viewed from that perspective, a technical architecture or infrastructure of a software system represents the blueprints, foundation, plumbing, insulation, and electrical components of a home. When a homeowner purchases a new home, he/she may choose to build upon its foundation and structure. Customizations like floorings, siding windows and fixtures will tailor the house to meet the homeowner's specific needs, while preserving its structural integrity. Similarly, each application or project using the technical infrastructure will need to define an "applications architecture" that will leverage the architecture to address its specific needs. Furthermore, the tools provided with the technical infrastructure must allow individual applications flexibility in design, while ensuring the applications' operational integrity and maintainability.

FIG. 37 shows a known technical infrastructure of a data processing system, which is server-based in its design and includes Windows NT-based client desktops 1010 (e.g., personal computers), servers 1020, and mainframe hosts 1-70 in a systems environment. Most client users have little beyond the operating system (OS) installed on their desktops. As for the servers, these machines are typically configured as file servers and contain space for users' home directories and personal system configurations (e.g., INI files), as well as shared drives for organizational use. All applications and most office automation software are typically stored on host file servers, i.e., at the server level, and downloaded to the desktop when needed. Each server is configured as an NT backup domain controller and implemented with Windows NT security authentication. Thus, users must provide a login and password to gain access to the software system. Furthermore, a single NT primary domain controller is typically installed in a central node location 1030. The known data processing system may also include a server 1050 that is based on OS/2 and configured for support and optimal execution of DOS applications written in Basic computer language. Most host mainframe applications are MVS/IMS-based (Multiple Virtual Storage/Information Management System), although some run under MVS/CICS (Customer Information Control System). These applications are currently accessed via 3270 emulation using Attachmate Extra! software, which is installed on the server 1020 as shown in FIG. 37.

The known system environment typically uses IMS/DB (DataBase) and DB2 database management systems on the host mainframe and Microsoft SQL (Structured Query Language) server at the host server level as database managers. Some applications also make use of Microsoft Access. Some Access databases can be installed in the field while other application databases reside on servers in the central node location 1030 or on the host mainframe 1070. Office automation and other databases are handled in different ways, depending on their structure and usage. For instance, Folio databases, which are read-only in nature, are deployed to the field on Windows NT servers, such as server 1020. Lotus Notes databases, which may be read-only or read/write, are installed in the central node location 1030.

For communication protocols, most LAN/WAN traffic to the central node location for desktop-to-server communication is conventionally based on IBM's NetBIOS protocol, with some systems implementing Novell's IPX protocol. Whereas, SNA and 3270 Bisynch are used for communication between desktops and host mainframes. Several techniques are commonly used for server-to-mainframe communications. The tools and protocols used include IBM DDCS for communication with DB2, DTF to MVS/CICS, LU2 to MVS/IMS, IBM's MQ Series software, and Texas Instruments (TI) Communication Bridge. For groupware, the host software system environment uses Lotus Notes to support e-mail, workflow, and (on a limited basis) document management activities, with the Notes servers all installed in the central node location. Software distribution to Windows NT clients and servers is performed using Microsoft's SMS tools. Distribution between OS/2 servers is done using Ascom Timeplex's Synchrony products. The known application development tools of choice are Microsoft Visual Basic (VB) for local applications and TI Composer for accessing host data sources. Most legacy applications are written in IMS COBOL. The known client/server applications are written such that work-in-process, or work-in-progress, (WIP) data is created and manipulated at the server level, and forwarded to the mainframe for permanent storage upon completion of a unit of work.

The aforementioned known system environment suffers from several shortcomings that inhibit its effectiveness in the current business environment. First, this environment suffers from inconsistent application "look and feel" because it contains a mix of mainframe and client/server systems. From a user presentation perspective, character-based mainframe applications operate in a fundamentally different manner from those server applications that were developed employing a graphical user interface (GUI). Even applications written for the same platform (i.e., for the same mainframe or server) do not employ a consistent mode of operation; thus, inhibiting user productivity. Second, there is a lack of interoperability. The applications of the known environment were, for the most part, independently developed from one another and do not share common data. Numerous situations exist where, in order for the user to carry out a business transaction, data must be re-keyed into multiple applications that behave inconsistently.

This is not only undesirable from a productivity perspective, but may cause data synchronization problems in cases where information is incorrectly entered. Third, there is a lack of reuse. In other words, a problem caused by the lack of synergy between the current applications is that code that should be common to all applications is often reinvented. For example, slightly different code for validating office codes of an insurance agent as a system user may exist in many system applications, where a single, standard approach to performing this function would be sufficient. Fourth, as noted above, the known client/server applications are typically written such that data is created and manipulated at the server level, and forwarded to the mainframe for permanent storage upon completion of a unit of work. This technique of remote data access consumes considerable network bandwidth, and ideally should be discarded in favor of an infrastructure strategy that allows data to be manipulated closer to its source.

SUMMARY OF THE INVENTION

It is a feature and advantage of the present invention to provide a method and system for furnishing an on-line quote to a user for an insurance product, such as auto insurance, which enables the quote to be presented in real time, without the delay inherent, for example, with the use of email.

It is another feature and advantage of the present invention to provide a method and system for furnishing a real-time, on-line quote to a user for an insurance product, such as auto insurance, which frees up CSR personnel resources to focus on the sale of policies and reduces costs in terms of CSR personnel.

It is a further feature and advantage of the present invention to provide a method and system for furnishing an on-line quote to a user for an insurance product, such as auto insurance, in which the upload of information collected by the system also reduces costs, for example, by eliminating the need for CSR personnel to retype the information into a host system for use in downstream systems.

It is an additional feature and advantage of the present invention to provide a method and system for furnishing an on-line quote to a user for an insurance product, such as auto insurance, in which data uploaded to a database is used for management information reporting.

To achieve the stated and other features, advantages and objects, the system and method for an embodiment of the present invention makes use of computer hardware and software to provide a user with an on-line, real-time quote for an insurance product, such as auto insurance. Thus, the system of the present invention allows the user to receive real-time advice, for example, about the different types of insurance products available, or the various coverage requirements of different states, with all of the convenience of an on-line agent. The system provides an on-line auto quoting application that includes a coverage wizard which provides state-specific on-line counseling to help make insurance decisions. Further, the system of the present invention provides a unique on-line quoting tool which enables the user to enter information, for example, about himself or herself, his or her income, his or her ability to live without a car, and other similar types of information about the user's lifestyle. The application for an embodiment of the present invention then recommends to the user coverages and liabilities, deductibles, and similar items to help the user determine the best insurance coverage to meet his or her needs.

In an embodiment of the present invention, a user is allowed to log on to a web site and access an on-line quote application on a presentation server via a link from the web site. The user is then allowed to enter user data and coverage information on the presentation server, and the presentation server retrieves deployable content profile information for the user from a database. The deployable content profile information, for example, allows the user to be identified by an underwriter and/or allows the user to be directed to a customer support representative or a selected agent. In an aspect of the deployable content profile information, a business user is allowed to access a deployable content administration tool page. The business user is authenticated with a username and password and is presented an administration tool screen pre-filled with data from existing files. In another aspect of the deployable content profile information, an administration tool output is written to a file and/or the database.

If the user enters a vehicle identification number, a database query is executed by the presentation server, and auto information corresponding to the vehicle identification number is retrieved for the user from a vehicle identification database by the presentation server. Otherwise, a vehicle identification number is constructed for the user by the presentation server utilizing user-entered make and model information in conjunction with the vehicle identification number database. The user is allowed to enter a request for the quote on the presentation server, and the user data is formatted and transferred to a rating engine server via a Java module. The user data is submitted to a knowledge-based management system module and database, which determine a tier corresponding to the user data and return the tier to the rating engine server. The rating engine server returns the requested quote to the presentation server, which displays the quote for the user, and a management information database is updated with the user data and the quote.

If an indication of continued interest in the requested quote is received from the user by the presentation server, the user is presented with a client number associated with the quote, and the quote data is sent to a computer telephony integration database. The process of presenting the client number involves, for example, transferring pre-fill data for the user to the rating engine server by the presentation server, transferring formatted user data to a host application via message queue series, generating the client number by the host application, and, returning the client number by the host application through a message queue series return queue. The client number is displayed for the user by the presentation server for reference in communicating with a customer support representative. In addition, the client number is logged in a management information database and/or recorded in a quote database.

In an alternate aspect of an embodiment of the present invention, the system likewise makes use of computer hardware and software to provide the user with an on-line, real-time quote for an insurance product, such as auto insurance, but with changes, for example, to the application functionality and infrastructure. In an alternate embodiment of the invention, the user at a computing device is allowed to enter basic user information, for example, on a background information page and/or a driver information page of an on-line quote system application via an on-line quote system web server. The user can log on to the on-line quote system web server direct, or the user can log on to an underwriter's web site server and be redirected to the on-line quote system web site server.

When the user logs on and begins the quote process, the browser of the user's computing device sends an on-line quote system page request to the on-line quote system web server. If the page request is for a JavaServer Page, the on-line quote system web server forwards the page request to an on-line quote system application server, and the application server processes the page request. Static Hypertext Markup Language and image files are retrieved from the on-line quote system application by the on-line quote system web server. Continuing with the method and system of an alternate embodiment, the on-line quote system application calls a common data entry system to request credit information for the user. The common data entry system receives the request and invokes an insurance financial score credit transaction. The common data entry system calls a report ordering warehouse to order an insurance financial score report, and the report ordering warehouse sends the credit information request to an outside credit information source. Upon receiving the requested credit information, the common data entry system sends the credit information for the user to the on-line quote system application.

In an alternate embodiment of the invention, the user is allowed to enter a selection on the on-line quote system application via the on-line quote system web server for an assistance feature for choosing a coverage for the user. The assistance features available for selection by the user include, for example, a coverage wizard feature that makes coverage recommendations for the user based on financial information entered by the user and a direct-to-quote feature that generates coverage choices for the user based on information previously entered by the user. Other assistance features available for selection by the user include, for example, a coverage wizard feature that allows the user to understand coverage choices without entering financial information and a no-assistance feature that allows the user to choose coverage without guidance. Thereafter, the user is allowed to enter a selection of coverage for the user on the on-line quote system application via the on-line quote system web server.

Continuing with the method and system of an alternate embodiment, the user is prompted for and allowed to enter underwriting information on the on-line quote system application via the on-line quote system web server. The on-line quote system application calls a rating engine of the common data entry system to request rating information for the user based at least in part on the basic user information and at least in part on the underwriting information. The on-line quote system application passes at least part of the basic user information and at least part of the underwriting information to the common data entry system rating engine, for example, via MessageQueue. The common data entry system invokes a rating transaction and determines a correct pricing tier for the user via a knowledge-based management system module and determines underwriting knockouts, completeness, and a rating via a reconciliation system. The rating information for the user is sent to the on-line quote system application by the common data entry system, for example, via MessageQueue.

In an alternate embodiment of the invention, the on-line quote system application displays a quote for the user for the selected coverage via the on-line quote system web server based at least in part on the rating information. If an indication of the user's continued interest in the quote is received by the on-line quote system application, for example, by clicking on a "Talk-to-Us" button, the on-line quote system application uploads quote-related information for the user to a backend system and provides the user with a telephone number for a customer service representative or agent via the on-line quote system web server. The quote-related information for the user is uploaded to an on-line quote system database by the on-line quote system application, and the quote-related information for the user is pulled from the on-line quote system database into a computer telephony integration system database by the computer telephony integration system. The quote-related information for the user is sent to a host system on a mainframe computer via MessageQueue Series by the on-line quote system application.

A fast-forward feature of the on-line quote system application for an alternate embodiment of the present invention permits the user to modify one or more previous entries without repeating the entire on-line quote process. The fast-forward feature enables the user to go only to pages in the on-line quote system application that require modification by the user and displays only pages in the on-line quote system application for the user that are affected by the modification.

In addition, embodiments of the present invention provide a technical architecture of a data processing system that can flexibly address the business, technical, and operational requirements of the host entity and its system.

Embodiments of the present invention also provide a layer of technical insulation between the user interface and existing host and client/server systems that can: place application processes on the best suited platform (mainframe, server, etc.); avoid moving data and programs around the network; move complex business functions next to where the data resides; manage transaction execution; properly scale to increases in volume; move office automation tools (Word, Notes, Excel, etc.) from the server to the client; move to a more efficient network protocol such as Internet protocol (IP); move all final transaction data to host databases and keep work-in-progress, or work-in-process, (WIP) data on servers; and move to a more powerful data base server technology (e.g., Microsoft SQL Server).

Embodiments of the present invention also provide a layer of technical insulation between the user interface and existing host and client/server systems that can: separate the workflow and supporting screenflow from the product layer, business functions, and business function code; combine many different technologies on the back end to a single technology at the front end and on the presentation layer; and share data between applications.

Embodiments of the present invention further provide Internet servers in front of the aforementioned technical insulation that can provide access to the host and client/server systems, provide active platform technology for sophisticated Internet graphical user interface (GUI) and data editing, and utilize Microsoft's Component Object Model (COM) technology for process-to-process communication.

Embodiments of the present invention also provide a technical infrastructure that implement fail over and load balancing technology for web, database, and middleware servers.

Embodiments of the present invention additionally provide common program interfaces for applications to users to alert DSMS of impending problems.

Embodiments of the present invention also provide a three-tiered application model for host applications using the aforementioned technical infrastructure embodiments.

Additional objects, advantages, and novel features of the invention will be set forth in part in the description which follows, and in part will become more apparent to those skilled in the art upon examination of the following, or may be learned by practice of the invention.

BRIEF DESCRIPTION OF THE DRAWINGS

FIG. 4 is a chart which illustrates examples of data tables for the system of an embodiment of the present invention;

FIG. 12 is a table that shows examples of hardware utilized in the on-line quote system and method for an alternate embodiment of the present invention;

FIG. 13 is a table that shows examples of software utilized in the on-line quote system and method for an alternate embodiment of the present invention;

FIGS. 14-35 show examples of Graphical User Interface (GUI) screens for the on-line quote system for an alternate embodiment of the present invention;

DETAILED DESCRIPTION OF THE INVENTION

Figure 1:
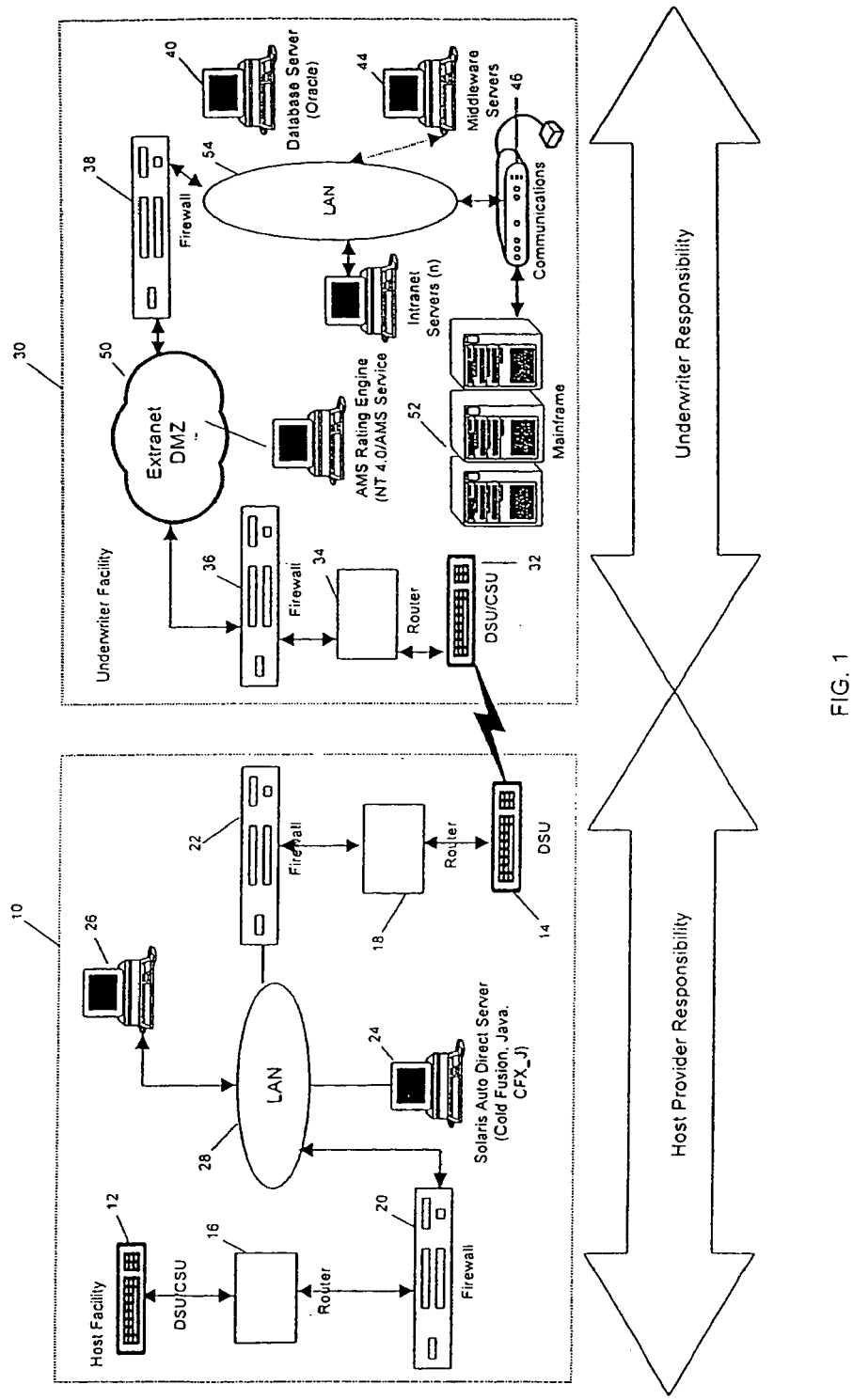
FIG. 1 is a schematic diagram which illustrates an example overview of key components and the flow of information between key components for the on-line insurance quote system for an embodiment of the present invention.

Referring now in detail to an embodiment of the present invention, an example of which is illustrated in the accompanying attachments, FIG. 1 is a schematic diagram which illustrates an example overview of key components and the flow of information between key components for the on-line insurance quote system for an embodiment of the present invention. Referring to FIG. 1, the system utilizes, for example, a host facility 10 with data service units/channel service units (DSUs) 12, 14, routers 16, 18, firewalls 20, 22, and servers 24, 26 connected over a local area network (LAN) 28. The system also makes use, for example, of an underwriter's facility 30 coupled to the host facility 10 with DSU 32, router 34, firewalls 36, 38, servers 40, 42, 44, and 46, rating engine 48, DMZ 50, and mainframe 52 connected over a LAN 54.

The system for an embodiment of the present invention provides an online auto quoting facility that provides a user with a real-time auto insurance quote. The user can initiate contact with a personal lines CSR to purchase insurance based on that quote. The system connects to the rating server 48, such as a proprietary rating engine available from Agency Management System, Inc., pre-fills data into a host application and stores data to be retrieved via a computer telephony integration (CTI) system. The system application is written with Cold Fusion, Java, C, C++, Hypertext Markup Language (HTML), and JavaScript. An aspect of the system and method for an embodiment of the present invention is providing the online quoting facility on affinity client websites. The system enables the user to enter data into web pages constructed with Cold Fusion Markup Language (CFML), HTML, and minimal JavaScript.

Once the user information is entered, the user has, for example, three different levels of assistance for selecting coverages. One such level is a coverage wizard, which can utilize financial data, entered by the user and held only during the session, to make coverage recommendations. The user is allowed to use the coverage wizard to understand coverages without entering financial information. The user can also choose to have no assistance and enter coverages without guidance. When the user requests an online quote, a quote is presented to the user based upon the information entered. The user can change information at any time and request an updated quote. If the user likes the quote, he or she can contact a CSR. The CSR has the ability to retrieve the data in the host application when the call is connected. The system enables, for example, graphical data entry via the Internet. The coverage wizard suggests coverages based on user input. Information entered through the graphical interface is uploaded to the host system via IBM Message Queue (MQ).

In the past, an auto underwriter has used a web site as a vehicle for getting quote requests for its insurance products via email, which generates a fair amount of sold business for the underwriter. The system for an embodiment of the present invention goes beyond that process by presenting the user with an online quote. The generation of the quote online frees up CSR personnel to concentrate on the sale of policies, thus reducing costs. The upload of information collected by the system also reduces costs by eliminating the need for CSR personnel to retype the information into the host application for use in downstream systems. In addition, the data is uploaded to relational database system software, such as a Solaris Oracle database, to be used for management information systems (MIS) reporting.

The intended audience for the system of an embodiment of the present invention is the general public. In an aspect of the present invention, the audience for the invention includes various affinity groups. Advertising campaigns, such as advertising on search engine portals and Internet Service Providers (ISPs), is another aspect of the system of the present invention, which can significantly increase the number of quotes requested. Features of the system include, for example, a web-based deliverable over the Internet; a coverage wizard to facilitate the quoting process by calculating recommended coverage based on the information supplied by the user; a fast path quoting facility for those who know what coverages they need, application scalability to ensure availability to a large volume of concurrent users; integration with the host application, CTI and the auto insurer's downstream systems; real-time access to a vehicle identification number (VIN) database; real-time access to the rating engine 48 residing on the underwriter's DMZ 50; and retention of pertinent information in database format for use in MIS reporting.

The system for an embodiment of the present invention utilizes, for example, a web-based application, which has three major components, including a front end which is referred to as the presentation layer. The presentation layer is developed using, for example, Cold Fusion, and runs on a web application server 24. The web application server 24 communicates with the rating engine server 48 that provides comparative rates. Thus, the system makes use of the rating engine server 48 with a knowledge based system for underwriting owned by the underwriter, and from there it feeds data into the underwriter's CTI system, as well as back into the underwriter's host based system for issuance. The system is available on the Internet and is accessed, for example, via an auto insurer's web site and advertising click-through from external sites. The site accommodates a number of browsers and versions of those browsers, such as Internet Explorer 3.0.2 or greater, Netscape Communicator 3.x or greater, and all AOL browsers 3.x or greater.

Figure 2:
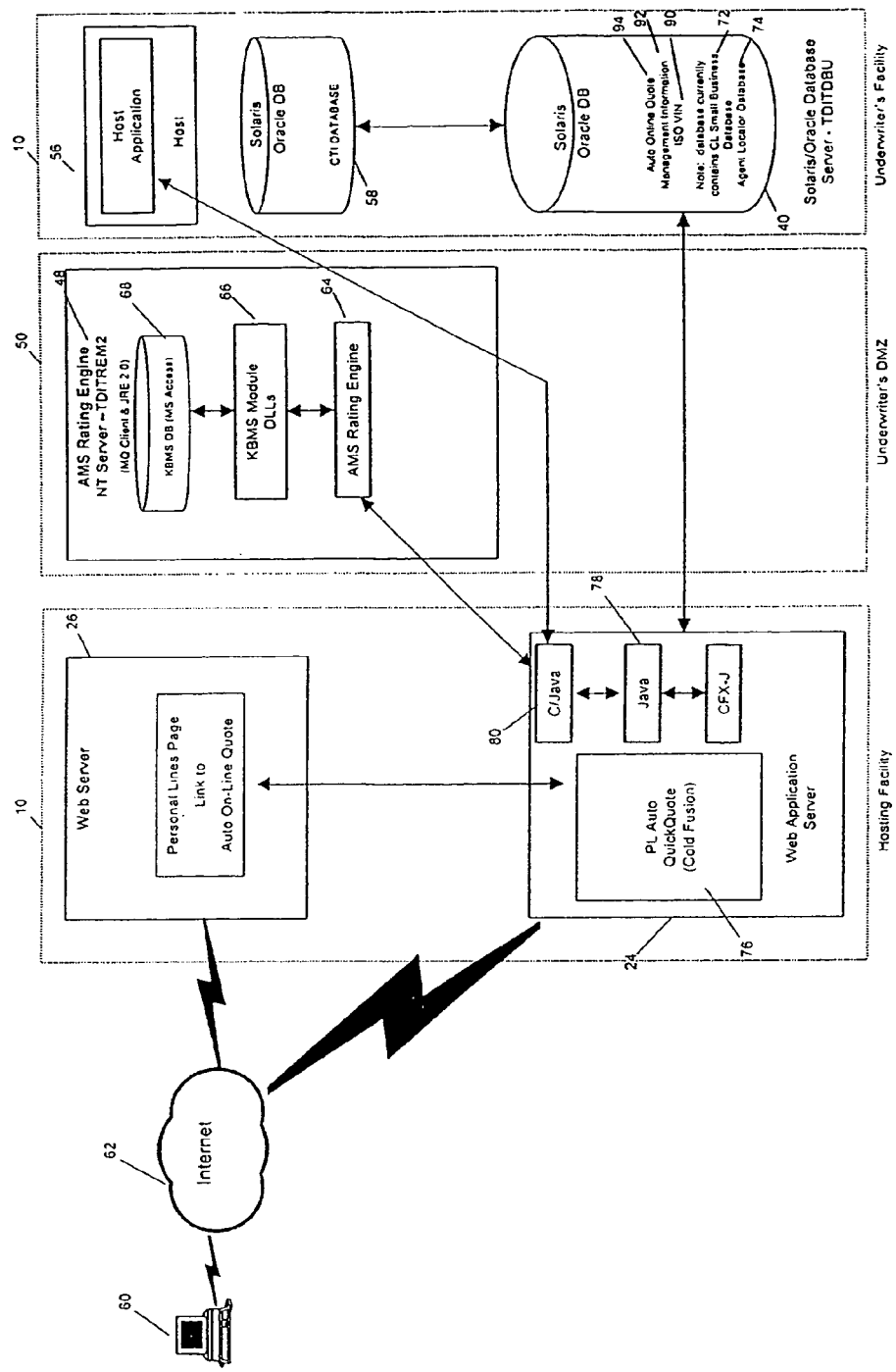
FIG. 2 is a schematic diagram which provides further detail regarding key components and the flow of information between key components of the system 30 for an embodiment of the present invention shown in FIG. 1.

FIG. 2 is a schematic diagram which provides further detail regarding key components and the flow of information between key components of the system for an embodiment of the present invention shown in FIG. 1. Referring to FIG. 2, the hosting facility 10 includes, for example, the web server 26 and web application server 24; the underwriter's DMZ 50 includes, for example, the rating engine server 48; and the underwriter's facility 30 includes, for example, a host application 56 and database server 40. The system application consists of a web application development tool, such as web application server 24, a rating engine server 48, an Oracle management information (MI) database 92, a data feed to the host application 56 with Message Queue Interface (MQ), and a pull to a CTI database 58 from the system database 40. The web application server 24 maintains state with Cold Fusion session variables and presents Cold Fusion Markup Language (CFML) pages to users 60 over the Internet 62.

The rating engine 64, a Knowledge-Based Management System (KBMS) module 66, and the KBMS database 68 reside on rating engine server 48. MQ client and process 80 to forward data to the host application 56 reside on the application server 24. The Oracle database 40 contains the system database. A small business database 72, agent locator 74, and boat/yacht rating databases are also on the database server 40. The rating engine server 48 communicates through a socket connection on a pre-defined port number. The communication between the front-end 10 of the system and the rating engine server 48 is implemented in Java. Remote Method Invocation (RMI) is a model of distributed object application and has a RMI server 80 and RMI client 78. A typical server application creates some remote objects, makes references to them accessible, and waits for clients to invoke methods on these remote objects. A typical client application gets a remote reference to one or more remote objects in the server and then invokes methods on them. RMI provides the mechanism by which the server 80 and the client 78 communicate and pass information back and forth.

In the application for an embodiment of the present invention, once the Cold Fusion application 76 gets all of the input information from the user 60, it passes the information as a string object through the RMI server 80 in the web application server 24. The RMI server 80 then activates a C Dynamic Link Library (DLL) through Java Native Interface (JNI). The message is then passed to the MQSeries queue. The host application 56 picks up the application message from the queue and formats the user information in a CSR screen for quick and accurate service. This web server-to-mainframe host application message exchange makes use of a three tier distributed model. This not only makes the message exchange scalable and secure, it can also be reused in other similar application message exchanges with little or no modifications. The RMI server 80 on the middle tier server 50 uses a Java security policy file to limit the RMI server's access on the server, sometimes referred to as a "sandbox". Besides using the three-tiered architecture for application message passing, the security feature is restricted by the Java2 platform. The RMI client 78 is digitally signed in order to communicate with the RMI server 80. This eliminates the risk of unauthenticated access to the RMI server 80 in the web application server 24.

Figure 3:
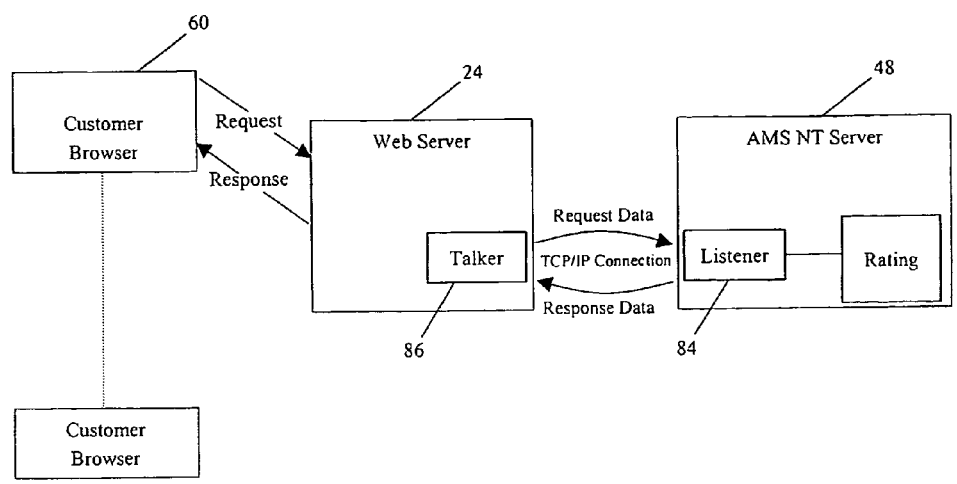
FIG. 3 is a schematic diagram which illustrates an overview of key components and the flow of information between key components for an example of the rating engine utilized for the system for an embodiment of the present invention.

The rating engine 64 utilized for the system of the present invention is, for example, a proprietary rating engine developed by Agency Management System, Inc. and Lexitech. The KBMS module 66 is a proprietary knowledge-based management system developed by Lexitech. FIG. 3 is a schematic diagram which illustrates an overview of key components and the flow of information between key components for an example of the rating engine utilized for the system for an embodiment of the present invention. The rating engine server 48 provides a rating system which allows a front-end provider to utilize Applicative Real-Time Programming (ART) rating to calculate premiums. Input for the rating engine server 48 comes from the web application server 24. Communication between the rating engine server 48 and the web application server 24 is via a Transaction Control Protocol/Internet Protocol (TCP/IP) direct connection. The Data Transfer Protocol (DTP) defines the format that the front-end provider must use to submit data to the rating engine server 48. The DTP is a proprietary communication protocol supported by Agency Management System, Inc. The architecture/operating system for the rating engine 48, for example, is a 32-bit application under NT 4.0 server (with Service Pack 6A) with TCP/IP as the networking protocols. Hardware configuration requirements include, for example, 48 Megs RAM memory, more than 1 GB hard disk with at least 500 MB free disk space, and two Pentium II Pro Processors, 300 mhz CPUs. The development language used is Visual C++. With regard to data transfer, input or request data is packed in the DTP data buffer and sent into the rating system through the network. The output or response data has the same format.

The system for an embodiment of the present invention stores data in the Oracle database 40 with Oracle database attributes. Data is passed, for example, to and from the rating engine server 48. Data is also sent to the host application 56. FIG. 4 is a chart which illustrates examples of data tables for the system of an embodiment of the present invention. Data tables include, for example, an Auto Quote table 100, a Coverage table 102, a Driver table 104, a Driver Incident table 106, a Driver Vehicle Usage table 108, a Model Name table 110, a Quote Survey table 112, a Survey Answer table 114, a Survey Question table 116, a Symb table 118, a Vehicle table 120, a VIN table 122, a Visit table 124, a Visitor table 126, a Visitor Filter table 128, a Queue table 130, various optional financial information tables 132, an Agent Distribution table 134, a Current Carrier table 136, a Quote Switch table 138, and a Zip Code table 140.

Retrieval and/or updating of data between the web application server 24 and the Oracle database server 40 is secured with application level user ID/passwords. Data transmission between the middleware RMI server, 80 and the mainframe host application 56 are secured via MQ security. All communication paths are also secured via stateful inspection of conversations by at least two firewall layers. Confidential data is transferred between the web application server 24, the rating engine server 48, and the host 56. For communication between the web application server 24 and the user 60, Secure Sockets Layer (SSL) is used. A copy of the VIN data is available on the Oracle database 40 for VIN lookups. Consumer data is stored in the Oracle database 40. Consumer information is forwarded and stored on the host 56 in the host application and CTI 58 for CSR retrieval. Deployable content profile is stored in the Oracle database 40. Shadow password files are used to authenticate users 60 for a deployable content administration tool.

Referring further to FIG. 3, the DTP is a communication protocol for a network services "listener" 84 supported by Agency Management System, Inc. In one aspect, the listener 84 rates and/or edits a policy image. The DTP can accept multiple sets of data from different data models with the same set of actions performed on each for several companies. In operation, the listener 84 accepts a TCP/IP socket stream of data from the client program 86. The listener 84 executes the requested action on the image and replies to the client 86 with another stream on the same socket connection. The communication ends when the listener 84 closes the socket. Each stream of data is made up of components in a predetermined order. A DTP request stream is made up of several components, always beginning with listener and instruction blocks. Following these blocks, there may be multiple data sets with multiple table blocks in each. The instructions are carried out upon each data set.

Figure 5:
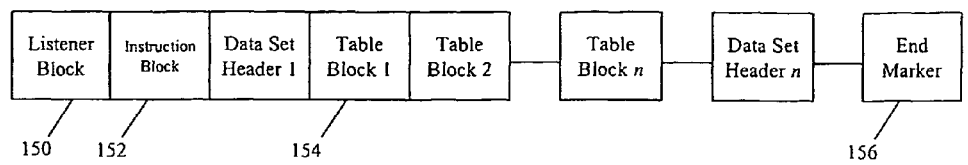
FIG. 5 is a block diagram which illustrates an example of a data transfer protocol visual model utilized for the system for an embodiment of the present invention.

FIG. 5 is a block diagram which illustrates an example of a data transfer protocol visual model utilized for the system for an embodiment of the present invention. Referring to FIG. 5, a listener block 150 identifies the requester and its communications protocol. An instruction block 152 comprises information that is used for all the other components in the stream and is specific to DTP. A table block 154 identifies the table, gives the record count and lists the records along with their length, which is potentially variable. With regard to the tables end marker 156, in order to signify the last table in the data set is complete, a table ID that is equal to zero is sent. For the data set end marker, in order to signify the last data set is complete, a data format ID that is equal to zero is sent. Returned data is in the same format as the request data, with the listener and instruction blocks 150, 152 first. A new data set is returned for each combination of group, data retrieval action and original data set. All the data sets for a company are contiguous. All of the request data sets are also together.

Figure 6:
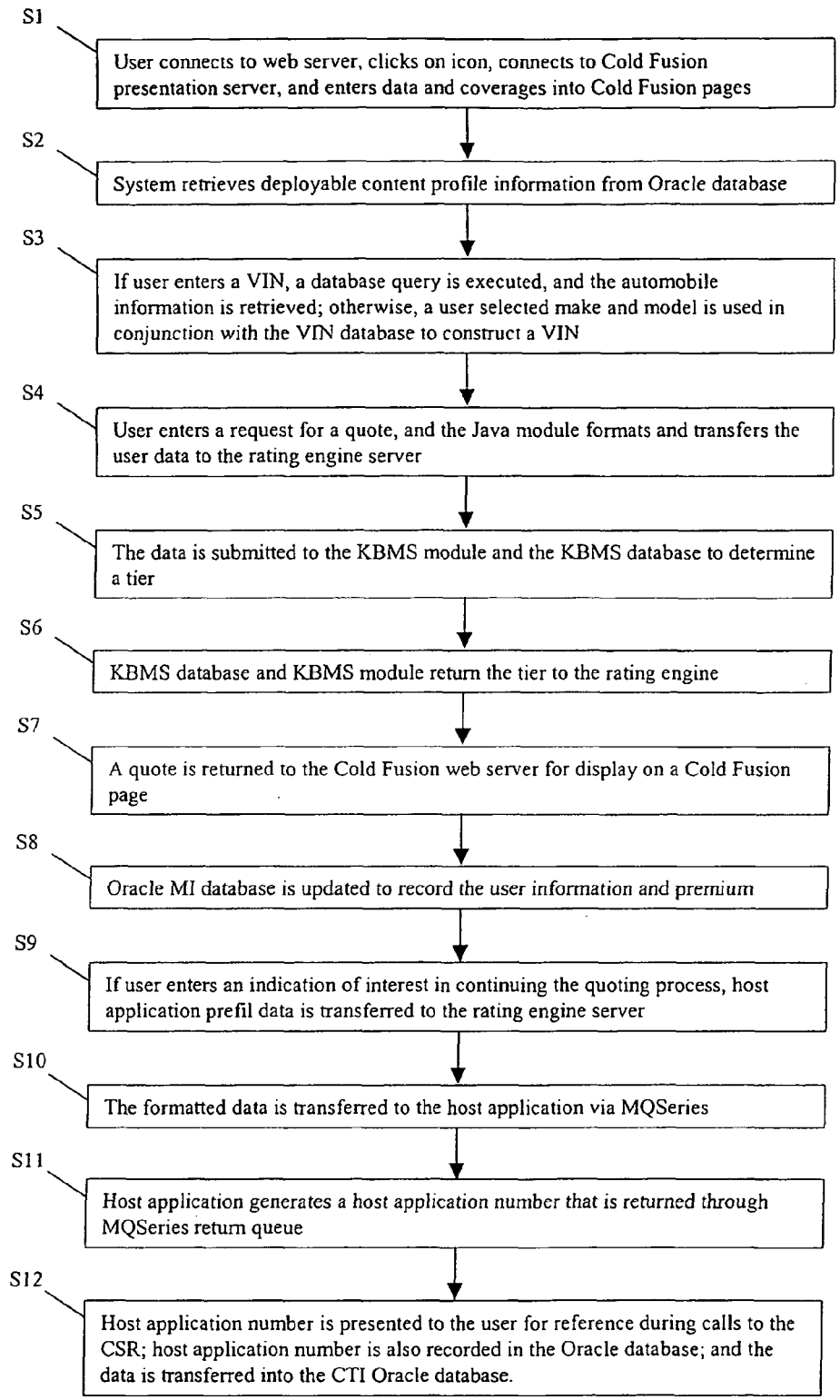
FIG. 6 is a flow chart which illustrates an example of the process of generating a quote by the system for an embodiment of the present invention.

FIG. 6 is a flow chart which illustrates an example of the process of generating a quote by the system for an embodiment of the present invention. Referring to FIG. 6, at S1, the user 60 connects to the web server 26, clicks on an icon, connects to the web application server 24, and enters data and coverages into the Cold Fusion pages. At S2, the system retrieves deployable content profile information from the Oracle database 40. At S3, if the user 60 enters a VIN, a database query is executed, and the automobile information is retrieved; otherwise a user selected make and model is used in conjunction with the VIN database 90 to construct a VIN. At S4, the user 60 enters a request for a quote, and the Java module 78 formats and transfers the user data to the rating engine server 48.

Referring further to FIG. 6, at S5, the data is submitted to the KBMS module 66 and the KBMS database 68 to determine a tier. At S6, the KBMS database 68 and KBMS module 66 return the tier to the rating engine 64. At S7, a quote is returned to the web application server 24 for display on a Cold Fusion page. At S8, the Oracle MI database 92 is updated to record the user information and premium. At S9, if the user 60 is interested in continuing the quoting process, the host application prefil data is transferred to the rating engine server 48. At S10, the formatted data is transferred to the host application 56 via MQSeries. At S11, the host application 56 generates a host application number that is returned through a MQSeries return queue. At S12, the host application number is presented to the user 60 for reference during calls to the CSR. The host application number is also recorded in the Oracle database 40. The data is transferred into the CTI Oracle database 58.

Figure 7:
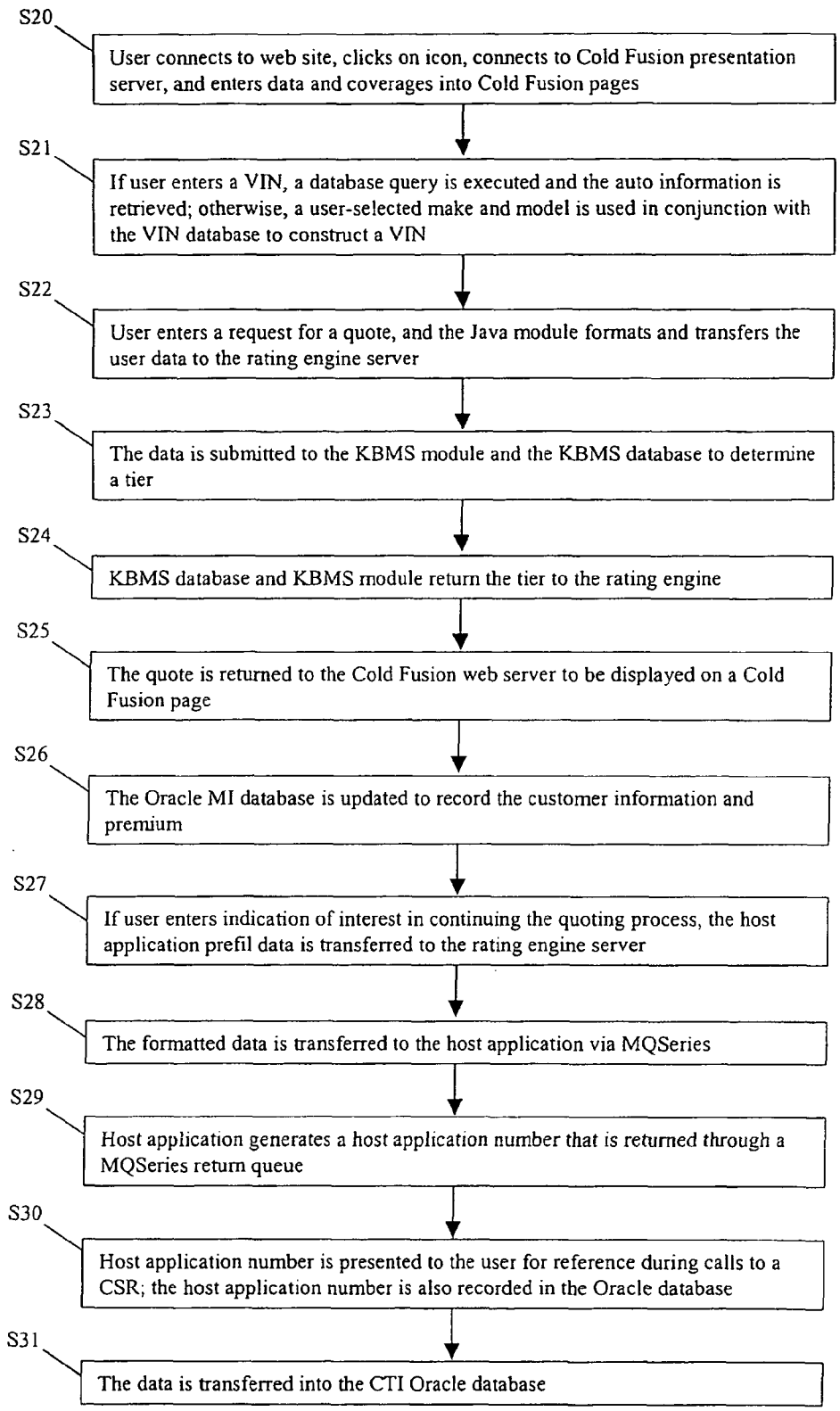
FIG. 7 is a flow chart which illustrates another example of the process of generating a quote by the system for an embodiment of the present invention.

FIG. 7 is a flow chart which illustrates another example of the process of generating a quote by the system for an embodiment of the present invention. Referring to FIG. 7, at S20, the user 60 connects to the web site 26, clicks on an icon, connects to the web application server 24, and enters data and coverages into Cold Fusion pages. At S21, if the user 60 enters a VIN, a database query is executed and the auto information is retrieved. Otherwise, a user-selected make and model is used in conjunction with the VIN database to construct a VIN. At S22, the user 60 enters a request for a quote, and the Java module 78 formats and transfers the user data to the rating engine server 48. At S23, the data is submitted to the KBMS module 66 and the KBMS database 68 to determine a tier. At S24, the KBMS database 68 and KBMS module 66 return the tier to the rating engine 64.

Referring again to FIG. 7, at S25, the quote is returned to the web application server 24 to be displayed on a Cold Fusion page. At S26, the Oracle MI database 92 is updated to record the customer information and premium. At S27, if the user 60 is interested in continuing the quoting process, the host application prefil data is transferred to the rating engine server 48. At S28, the formatted data is transferred to the host application 56 via MQSeries. At S29, the host application 56 generates a host application number that is returned through a MQSeries return queue. At S30, the host application number is presented to the user 60 for reference during calls to a CSR. The host application number is also recorded in the Oracle database 40. At S31, the data is transferred into the CTI Oracle database 58.

In the on-line quote process for an embodiment of the present invention, the rates that are used, for example, are an underwriter's filed rates that are publicly available. However, instead of using the underwriter's rating engines that are back on the underwriter's host, an embodiment of the present invention makes use of a server based rating engine 64. In other words, the underwriter copies its underwriting rules and moves them to live on the server 48 that houses the rating engine 64 for its underwriting. Other aspects for an embodiment of the present invention include, for example, on-line purchasing and on-line issuance of insurance products, such as auto insurance.

Another aspect of the method and system for an embodiment of the present invention includes co-branding the application for use, for example, with the underwriter's affinity partners. Deployable content allows the underwriter to understand who comes in to use the application and to identify the users. The co-branding aspect of the present invention involves actually co-branding the web site with the underwriter's logo. The co-branding aspect provides the ability to customize presentation layer marketing and to customize content to affinity groups. In addition, the deployable content aspect allows the system to direct users through to either CSRs, which are located in the underwriter's service center, or to selected agents.

The web site can be customized to work with either the underwriter's existing CSRs or through specified agents, through deployable content, because the system has profiles for each of the affinity accounts. A user may be sent to an agent, as opposed to a CSR, because agents typically have a higher close rate than CSRs. Further, the system can target down to a particular zip code level to which a quote goes and who will process and close the quote and issue a policy. An advantage of that feature is that certain agents are Internet capable and understand how to close an internet deal, while others are not. In the latter case, the system can route the leads directly to the underwriter's service center.

Figure 8:
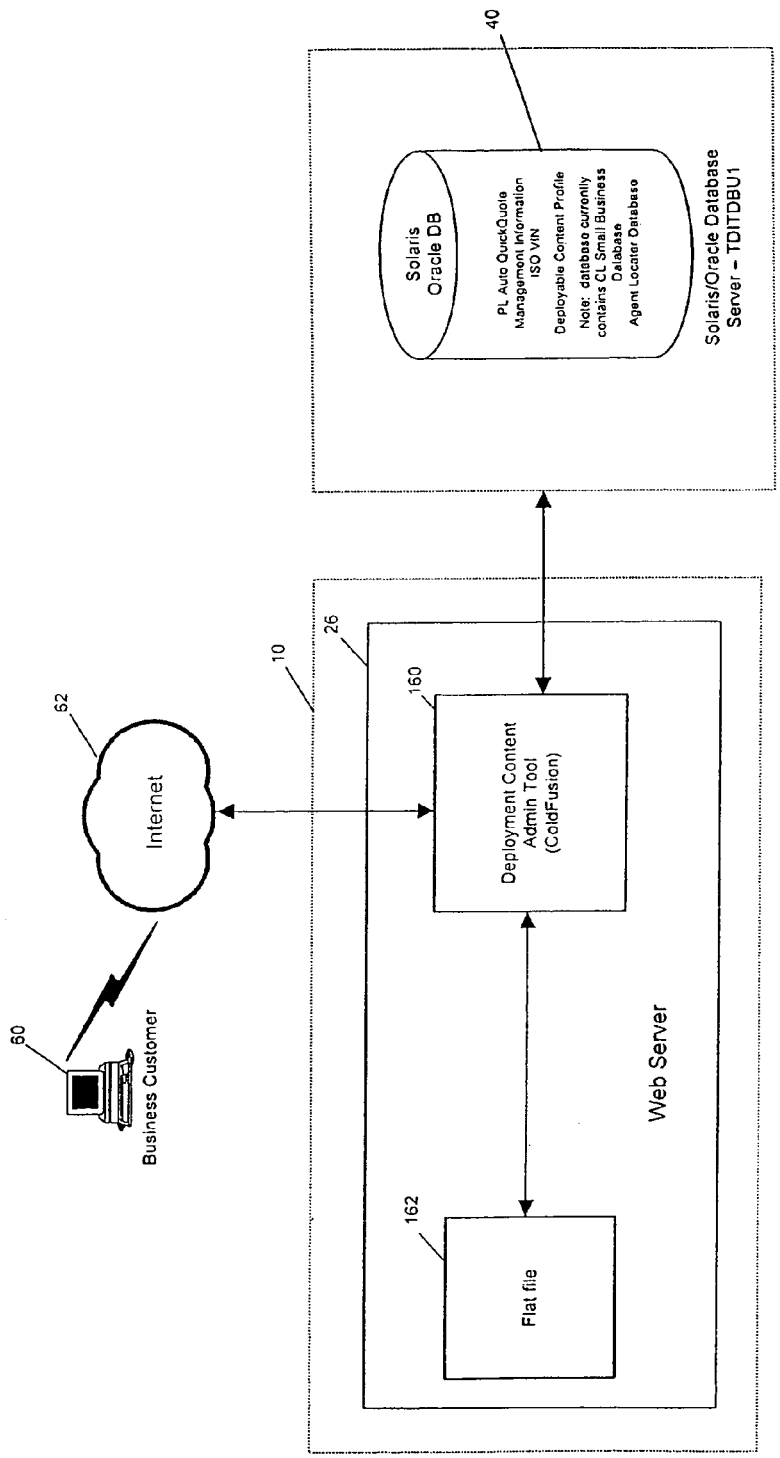
FIG. 8 is a schematic diagram that illustrates an example of components of the deployable content functionality for an embodiment of the present invention.
Figure 9:
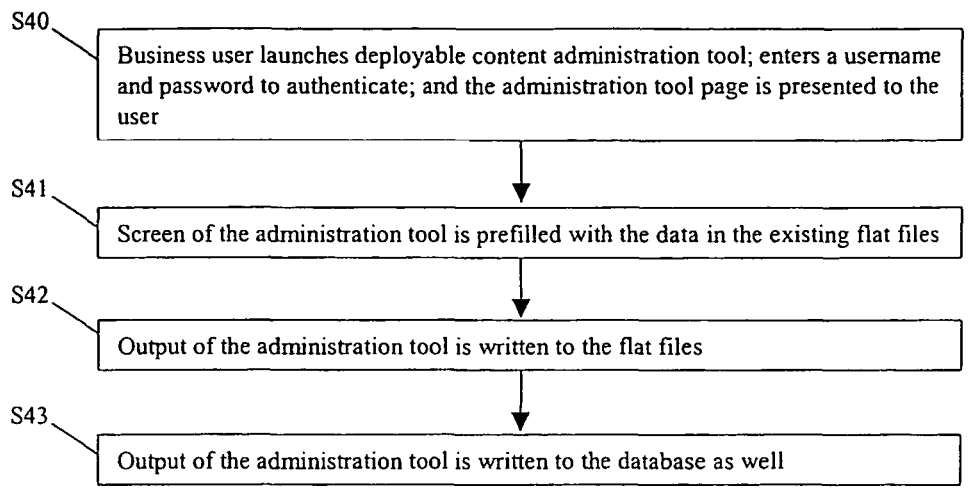
FIG. 9 is a flow chart which illustrates an example of the process flow of the deployable content administration tool application for an embodiment of the present invention.

FIG. 8 is a schematic diagram that illustrates an example of components of the deployable content functionality for an embodiment of the present invention. The system integrates functionality of deployable content, banner ads, and support for affinity groups. In addition, the system of the present invention implements functionality, such as saving and retrieving profile information from the database. The profile information is written to both database and flat files. FIG. 9 is a flow chart which illustrates an example of the process flow of the deployable content administration tool application for an embodiment of the present invention. Referring to FIGS. 8 and 9, at S40, a business user 61 launches the deployable content administration tool 160. The business user 61 enters a username and password to authenticate, and the administration tool page is presented to business user 61. At S41, the screen of the administration tool 160 is pre-filled with the data in the existing flat files 162. At S42, the output of the administration tool 160 is written to the flat files 162. At S43, the output of the administration tool 160 is written to the database 40 as well. Authentication solutions for the deployable content administration tool 160 include, for example, the use of shadow passwords and secure token IDs. A shadow password is a "hidden" file that stores all user passwords and can be read only by root. It is a Unix method for controlling the creation, use, and safe storage of passwords that involves the use of shadow password files and is administered from the Unix infrastructure. The use of secure token IDs entails the creation of infrastructure to use smart cards.

In an alternate embodiment of the present invention, the system likewise performs auto quotes online but with changes to the application functionality and infrastructure, such as changes in the technology in which the application is written. For example, the application for an alternate embodiment of the invention uses Java and JavaServer Pages (JSPs). The system for an alternate aspect likewise connects to two outside systems, namely the CTI system and the Excalibur host application 56, but in the alternate aspect, the system also connects to the host backend for rating, which is the gateway application Common Data Entry (CDE) system environment, and at the underwriter's application that was previously connected to the AMS rating engine 48. In addition, the system of the alternate embodiment also connects to the underwriter's host, which is the underwriter's mainframe 52, for Insurance Financial Score (IFS) scores that goes out to credit bureaus such as ChoicePoint and TransUnion to get IFS scores. In the application for an alternate embodiment, quotes are not anonymous, and because IFS scores are used, quotes are very accurate.

Another aspect in the functionality of the application for an alternate embodiment of the invention provides a process called Direct-to-Quote. In the Direct-to-Quote process, a user is not required to go through every single page in the application and enter what the user wants for coverages. Instead, in the Direct-to-Quote process, some basic financial information is collected as with a Coverage Wizard, and the user is allowed to go directly to quote by clicking on a button. Thus, it is not necessary for the user to go through the entire process of entering the coverages that the user wants. The alternate aspect of the invention introduces application enhancements that form the cornerstone, for example, of a personal lines consumer-centric strategy that enables the successful distribution of personal lines automobile insurance products on the Internet. It is noted that personal lines comprises those types of insurance, such as auto or home insurance, for individuals or families rather than for businesses or organizations. The on-line quote system is marketed, for example, to visitors, for example, of an underwriter's web site and affiliated sites such as Internet Service Providers (ISPs), financial institutions such as banks, and affinity customers.

In this aspect, five major business modules are provided to successfully distribute personal lines products to consumers on the Internet. These modules provide for the solicitation and sale of e-commerce business through an Internet presence. A feature of this consumer-based Internet strategy is the auto product lines. Other features can include, for example, property and on-line service. This aspect of the on-line quote system for an alternate embodiment of the invention provides significant enhancement to the user experience, including improvements to wizards, data entry flow and new fields. The application for this aspect utilizes an object-oriented methodology and is written in Java, JSPs, Hypertext Markup Language (HTML), and JavaScript. In addition, this aspect provides deployment flexibility (deployable content), such as the flexibility to tailor the on-line insurance quote system web site to specific consumers in terms, for example, of graphics, content, rate, and routing, based on their location, affinity group membership or other characteristics.

This aspect of an embodiment of the present invention builds, for example, upon the current application flow. The user enters driver, vehicle, and household information into the on-line quote system web pages. Once this information has been entered, the customer has, for example, four different levels of assistance for selecting coverage. One such level is the Coverage Wizard that can utilize financial data entered by the customer to make coverage recommendations. Another level of assistance is the Direct-to-Quote feature that generates coverage selections based on previously entered data. An additional level of assistance allows the customer to use the Coverage Wizard to understand coverage without entering financial information. In a further level, the user can also choose to have no assistance and enter coverage without guidance. In one aspect of the present invention, the on-line quote application is written in ColdFusion, HTML, JavaScript, Java, C, and C++, runs on Netscape Enterprise Server, and uses the AMS rating engine 48 for rating automobile quotes, and the present aspect reuses many of the same components. Further, the present aspect uses object oriented methodology in which objects are modeled after the business and can be extended and reused in other business initiatives as well as throughout the enterprise.

Figure 10A:
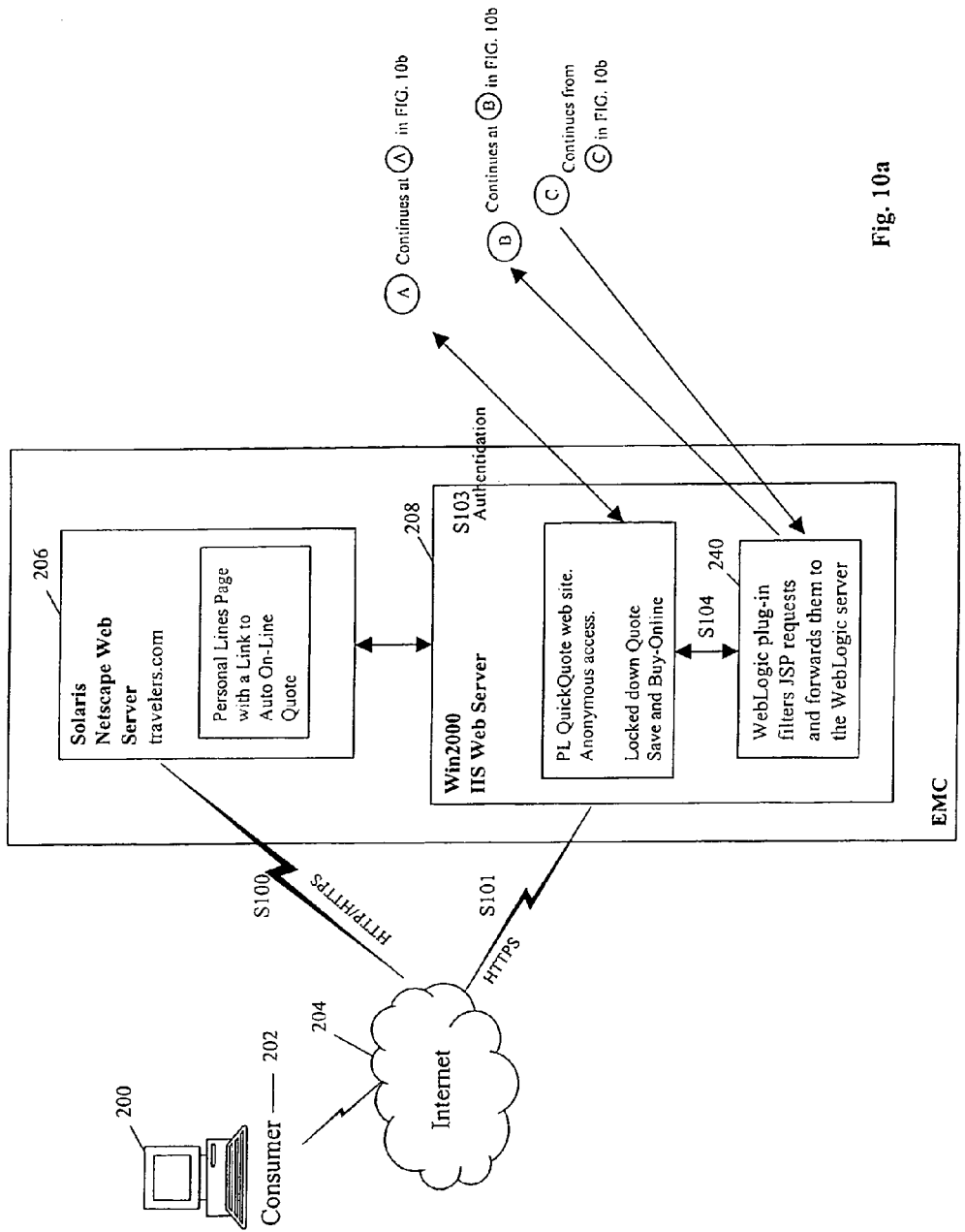
FIGS. 10*a*-10*c* show a schematic diagram that illustrates an example of key components and the flow of information between the key components for this aspect of an alternate embodiment of the present invention.
Figure 10B:
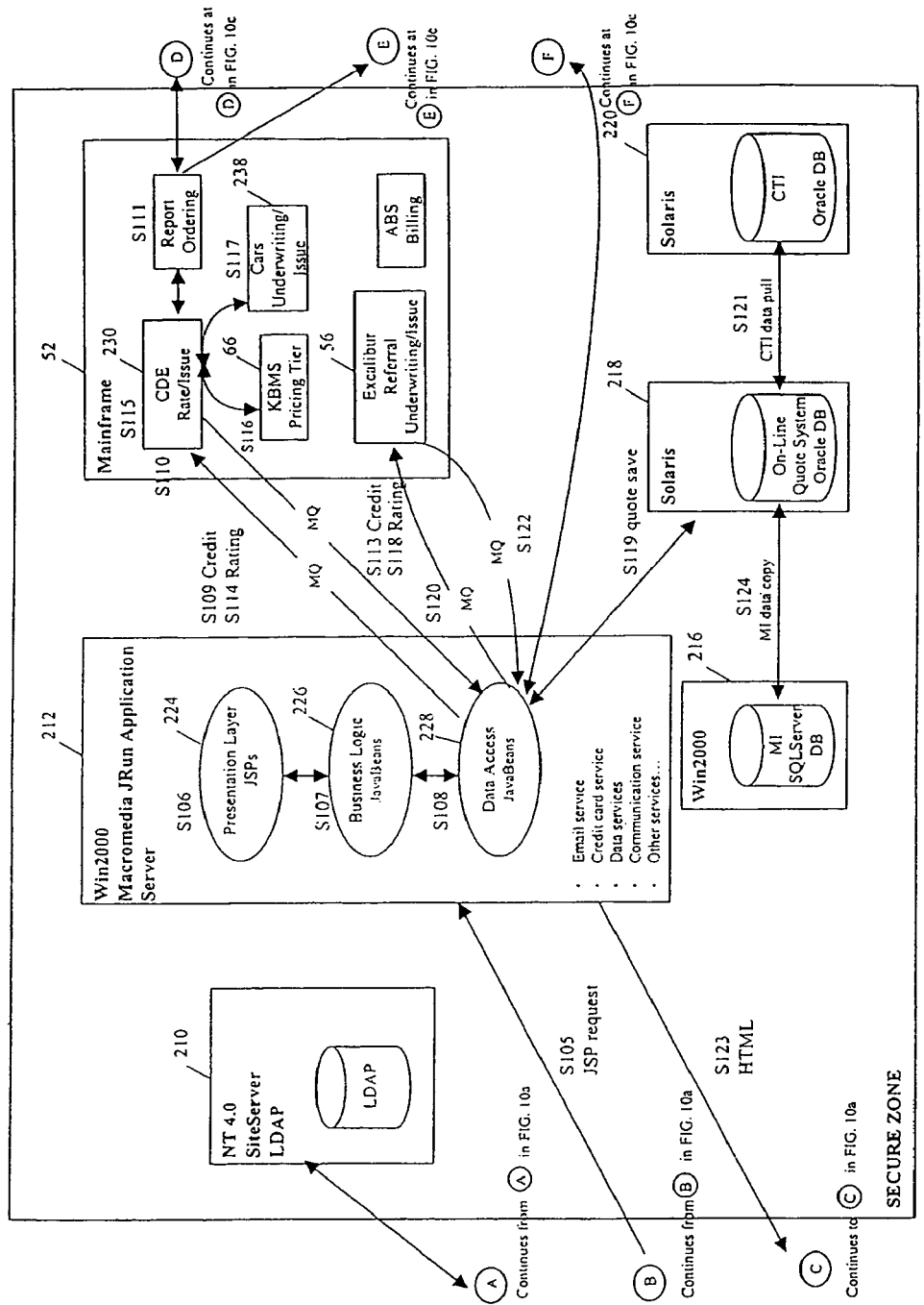
Figure 10C:
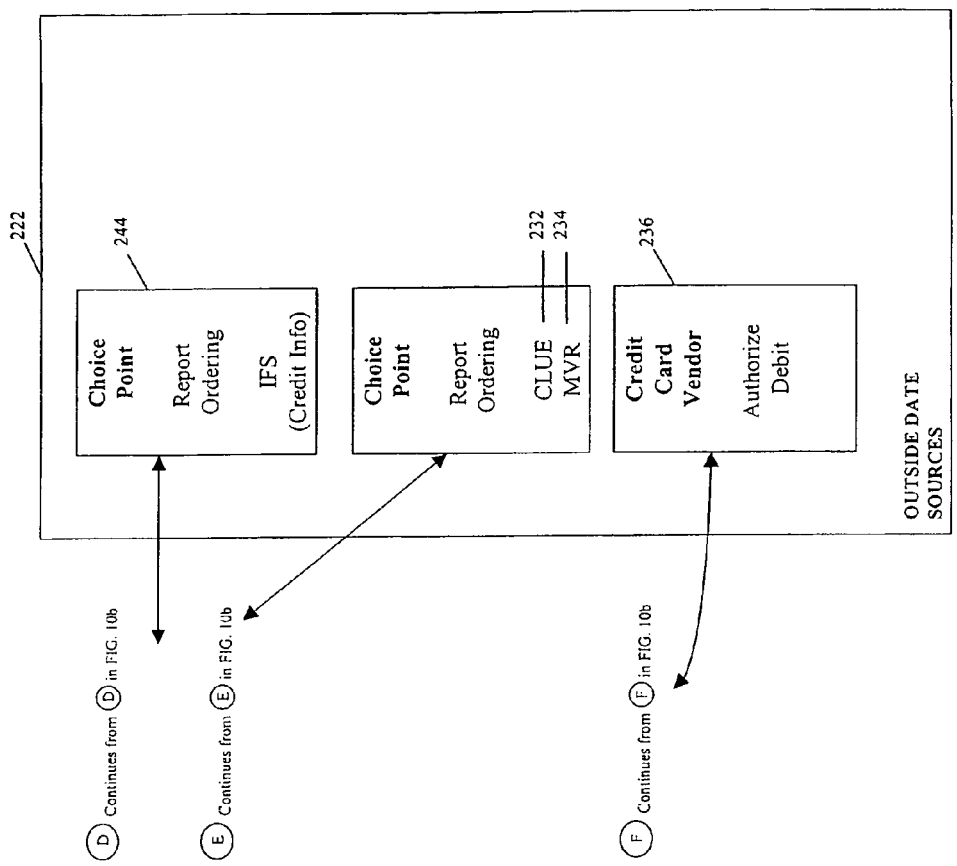

FIGS. 10a, 10b, and 10c (referred to herein collectively as "FIG. 10") show a schematic diagram that illustrates an example of key components and the flow of information between the key components for this aspect of an alternate embodiment of the present invention. Referring to FIG. 10, the application infrastructure for this aspect makes use, for example, of the personal computer (PC) 200 of a customer 202 coupled over a network, such as the Internet 204, to the underwriter's web site server 206 and/or the on-line quote system web site server 208, such as Internet Information Server (IIS) web server running on Windows 2000 NT 4.0. In addition, this aspect utilizes, for example, an authentication server 210, such as SiteServer Lightweight Directory Access Protocol (LDAP); an application server 212, such as Basic Programming Environment for Interactive-Graphical Applications (Macromedia) JRun application server running on Windows 2000; the underwriter's mainframe computer 52, a Structured Query Language (SQL)Server database 216 for MI reporting; an on-line quote system database 218, such as Oracle database running on Solaris; a CTI database 220, and outside data sources 222.

In this aspect, the application is separated into a presentation layer 224, business-logic layer 226, and a data access layer 228. Further, this aspect provides connectivity to component based architecture, such as CDE 230 services and components, and a migratory path to comply with pre-determined standards. Java and JSPs are used to develop the application, and the development tools include, for example, Rational Rose for object modeling, Visual Cafe as the Integrated Development Environment (IDE), and Macromedia JRun as the application server 212. The IIS web server 208 contains all image files and HTML pages; the web site 206 proxies all requests for JSPs to the application server 212; the Macromedia JRun application server 212 processes all JSP requests, and all business objects reside on the application server 212. The application server 212 also sends all rating and quote upload requests to CDE 230 and the Excalibur host application 56 via MQ. The Oracle database server 218 stores user quote data, and the SQLServer database server 216 stores MI data. When the customer 202 requests the on-line auto quote for this aspect of the invention, the system sends a request to the CDE system 230 on the mainframe 52 for underwriting and rating. After receiving a quote, the consumer 202 can then talk to a property lines CSR for purchasing and issuance of automobile insurance based on the quote. The CSR has the ability to retrieve the data, in the CTI database 220 and the Excalibur host application 56 that was uploaded by the system during a "Talk-to-Us" process.

This aspect of the on-line system and method for an embodiment of the present invention replaces several tactical architectural items with components developed, for example, specifically with personal lines in mind and identified as strategic to the business workflow. In this aspect includes, the system includes, for example, conversion to strategic components for underwriting and rating functions. The strategic architectural components used include, for example, the CDE rating process 230 instead of the server-based AMS rating engine 64 and the server based KBMS underwriting engine 66. Further, the system for this aspect utilizes support provided by CDE modular "Plug & Play" that enables the system of the present invention and external on-line vendors to rate through the CDE rating engine 230. For on-line purchase and binding, the CDE components are used for sending information to the downstream purchasing systems. Report ordering rule plan and report evaluation is likewise provided through CDE 230. This aspect also provides support for affinity and retail rates for quote and issue.

Significant enhancement to the user experience is provided in this aspect, for example, by improvements to wizards, data entry flow and new fields. In addition, this aspect includes a "My Insurance" functionality that enables customers to save a quote and recall later and to complete the purchase of insurance during an on-line session without interaction with a company representative using "Apply On-Line" functionality. Additional enhancements can include, for example, user security login and authentication, "Talk to Us" feeds to CDE/Atlas III for e-agents, store and recall of quotes, "My Insurance," and quotes are held for 30 days. Further enhancements can include, for example, on-screen collection of additional information needed for policy issue, request and processing of CLUE (driving incident) 232 and MVR (driving record) 234 reports, down payment calculation, credit card authorization 236, payroll deduction, policy issue through CDE 230 into Safari/CARS (automated reconciliation system) 238. Other enhancements include, for example, downstream feeds, down payment report, passing additional data if the customer 202 selects "Talk to Us", a facility to view consumer report information upon referral, saving quotes purchased data to the MI database 216, and replication of the MI database 216 for customer inquiries.

The on-line quote system for this aspect of the present invention is delivered over the Internet 204, and the system web site 208 is accessed, for example, via the underwriter's web site 206 and advertising click-through and links from external sites. The system web site 208 accommodates a number of browsers and versions of those browsers, such as Internet Explorer 4.x or greater, Netscape Communicator 4.5 or greater, and all AOL browsers 4.x or greater. Customers for the on-line quote system include, for example, the general public and affinity groups such as Costco, AAA, and the underwriter's employees. Hours of availability for quote and issue are dependent on the availability of required mainframe systems, and preferably the functionality is available 7×24. Secure Socket Layer (SSL) is used for security between the underwriter and the consumer 202.

Figure 11A:
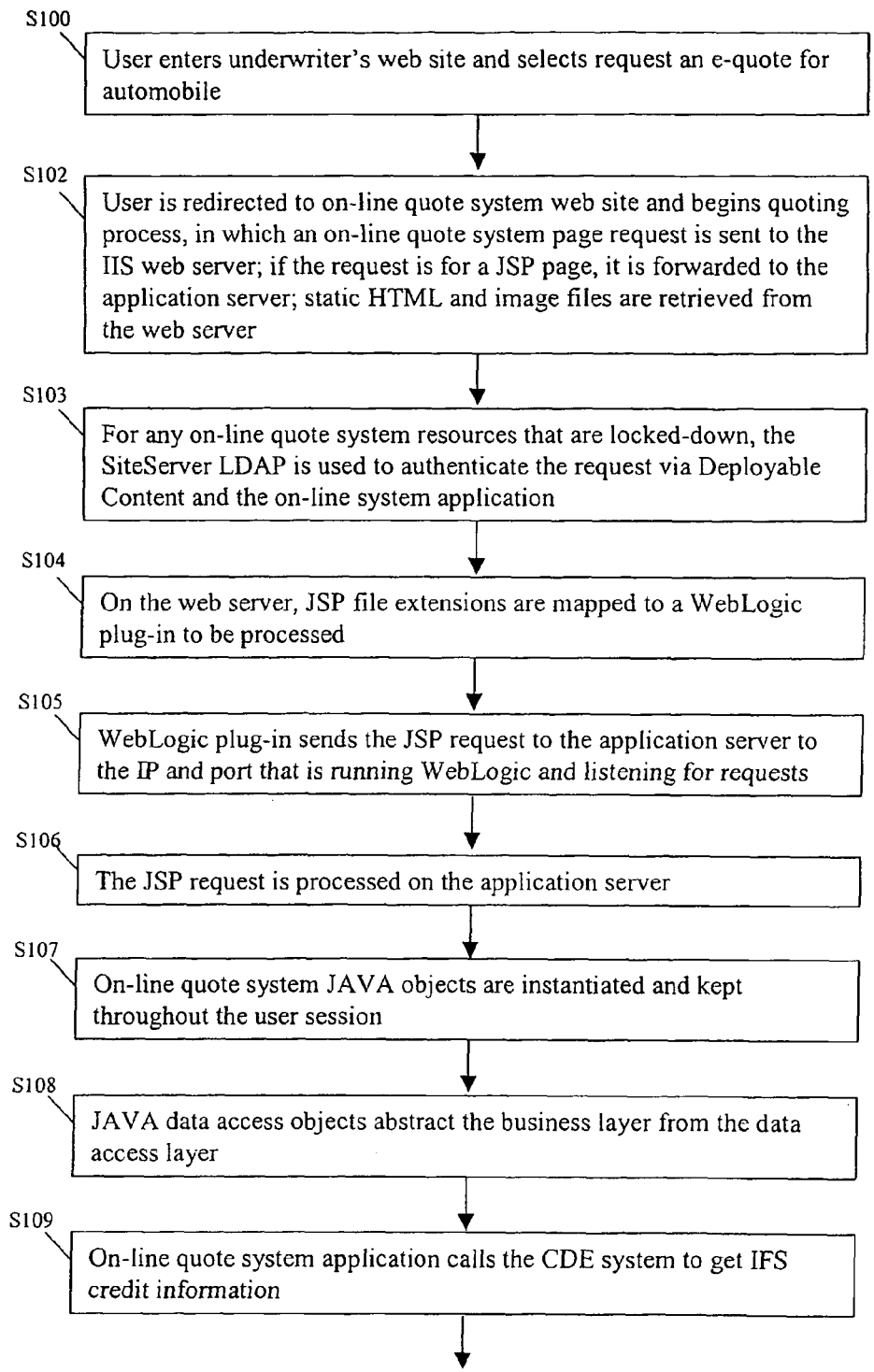
FIGS. 11*a*-11*c* show a flow chart which illustrates an example of the process of providing a real time on-line quote for a consumer by the system and method for the alternate embodiment of the present invention.
Figure 11B:
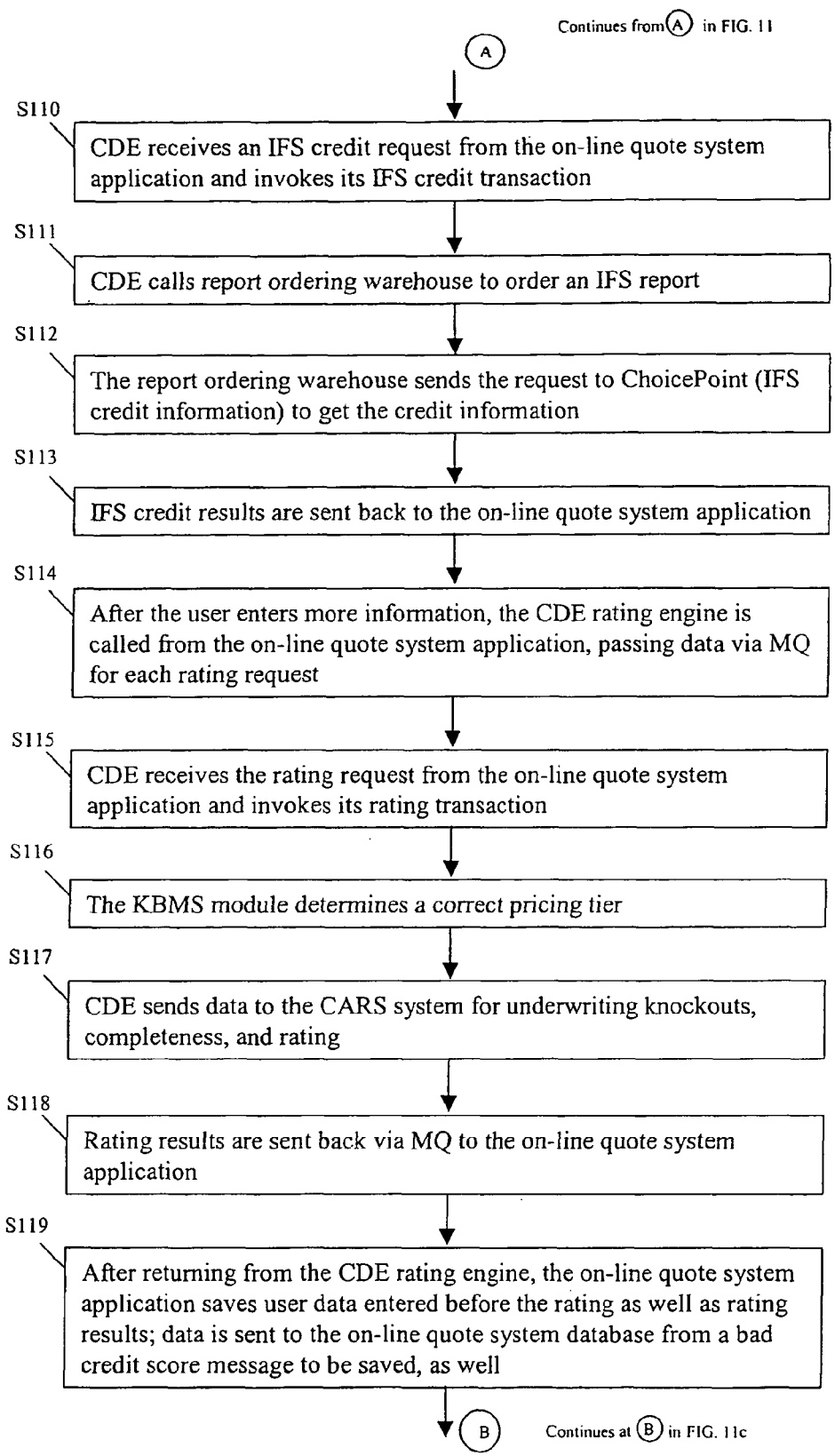
Figure 11C:
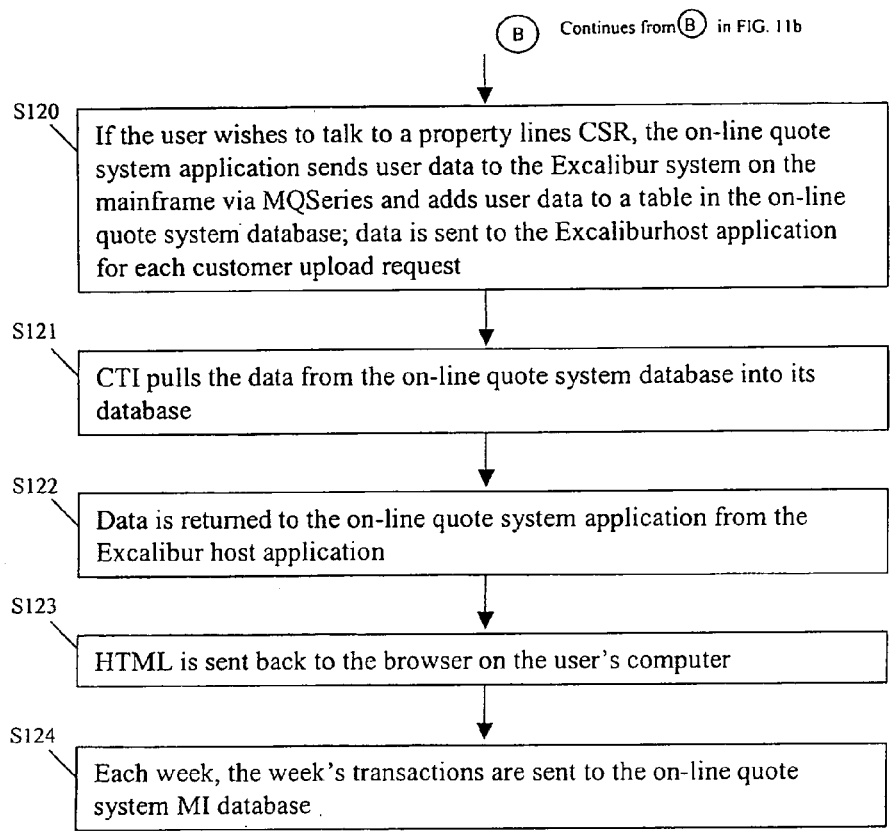

In this aspect, the on-line quote system application continues to prefill and populate the Excalibur host application 56 (upload) and CTI 220 (enhance existing feeds). The intended audience for this application is the general public, as well as affinity groups, such as Costco, AAA, and the underwriter's employees. This aspect for an embodiment of the present invention provides, for example, real-time access to the CDE rating engine 230 residing on the mainframe 52, the use of the Coverage Wizard to facilitate the quoting process by calculating recommended coverages based on the information supplied by the potential customer 202, a Fast Path quoting facility for those who know what coverages they need, integration with the Excalibur host application 56, CTI and the underwriter's personal lines downstream systems, and retention of pertinent information in database format for use in MI reporting. FIGS. 11a, 11b, and 11c (referred to herein collectively as "FIG. 11") show a flow chart which illustrates an example of the process of providing a real time on-line quote for a consumer by the system and method for this aspect of an embodiment of the present invention. Referring to FIGS. 10 and II, at S100, the user 202 at the user's computer 200 enters the underwriter's web site 206 and selects, for example, "Request an e-Quote for Automobile". At S102, after being redirected to the on-line quote system web site 208, the user 202 begins the quoting process, in which an on-line quote system page request is sent to the IIS web server 208. If the request is for a JSP page, the request is forwarded to the application server 212 to be processed. Static HTML and image files are retrieved from the web server 208. At S103, for any on-line quote system resources that are locked-down, the SiteServer LDAP 210 is used to authenticate the request via deployable content and the on-line quote system application 212. At S104, on the web server 208, JSP file extensions are mapped to a WebLogic plug-in 240 to be processed.

Referring further to FIGS. 10 and 11, at S105, the JRun plug-in 240 sends the JSP request to the application server 212 to the IP and port that is running JRun and listening for requests. At S106, the JSP request is processed on the application server 212. The on-line quote system application 212 follows an architectural model that separates the presentation layer 224, business logic layer 226, and data access layer 228. At S107, on-line quote system JAVA objects are instantiated and kept throughout the user session. At S108, JAVA data access objects abstract the business layer 226 from the data access layer 228. At S109, the on-line quote system application 212 calls the CDE system 230 to get Insurance Financial Score (IFS) credit information. At S110, CDE 230 receives an IFS credit request from the on-line quote system application 212 and invokes its IFS credit transaction. At S111, CDE 230 calls a report ordering warehouse 242 to order an IFS report.

Referring again to FIGS. 10 and 11, at S112, the report ordering warehouse 242 sends the request, for example, to ChoicePoint (IFS credit information) 244 to get the credit information. At S113, the IFS credit results are sent back to the on-line quote system application 212. At S114, after the user 202 enters more information, and the CDE rating engine 230 is called from the on-line quote system application 212, passing data via MQ for each rating request. At S115, CDE 230 receives the rating request from the on-line quote system application 212 and invokes its rating transaction. At S116, the KBMS module 66 determines a correct pricing tier. At S117, CDE 230 sends data to the CARS reconciliation system 238 for underwriting knockouts, completeness, and rating. At S118, rating results are sent back via MQ to the on-line quote system application 212.

Referring still further to FIGS. 10 and 11, at S119, after returning from the CDE rating engine 230, the on-line quote system application 212 saves user data entered before the rating as well as rating results. Data is sent to the on-line quote system database 218, for example, from a bad credit score message to be saved, as well. At S120, if the user 202 wishes to talk to a property lines CSR, the on-line quote system application 212 sends user data to the Excalibur system 56 on the mainframe 52 via MQSeries and adds user data to a table in the on-line quote system database 218. Data is sent to the Excalibur host application 56 for each customer upload request. At S121, CTI pulls the data from the on-line quote system database 218 into the CTI database 220. At S122, data is returned to the on-line quote system application 212 from the Excalibur host application 56. At S123, HTML is sent back to the browser on the user's PC 200. At S124, each week, the week's transactions are sent to the on-line quote system MI database 216.

Deployable content for this aspect of an embodiment of the invention provides the flexibility to tailor the on-line quote system web site 208 to specific consumers in terms, for example, of graphics, content, and rating, based on their location, affinity group membership or other characteristics. Deployable content for this aspect also provides, for example, historical tracking of deployable content updates. Profiles are not overlaid, allowing business to review profile history as well as rollback to a previous version. Audit trail of deployable content changes is also provided in this aspect. In this aspect, deployable content is secured using SiteServer LDAP 210, and user IDs are associated with profile updates. In addition, audit requirements are met by preventing the same user from 'signing off' and then 'activating' a profile. Migration between environments is provided in this aspect, and ISCMS is used to migrate scheduled changes through environments to production. For deployable content administration tool authentication, SiteServer LDAP 210 is used to lock-down the deployable content site, and only authorized users are allowed to update deployable content data. Further, the deployable content tool is distributed only in the underwriter's secure zone 246, accessible only by the underwriter's employees.

FIG. 12 is a table that shows examples of hardware utilized in the on-line quote system and method for an alternate embodiment of the present invention. FIG. 13 is a table that shows examples of software utilized in the on-line quote system and method for an alternate embodiment of the present invention. In this aspect, communication between the on-line quote system application 212, CDE 230, and the Excalibur host application 56 occurs through MQ using MQSeries Client for Java v3.0 which employs the native MQ libraries. Communication between the on-line quote system application 212 and CTI occurs through a stored procedure call from CTI to the on-line quote system database 218. The operating system and the infrastructure components for this aspect include, for example, Windows 2000 Advanced Server SP1 300—Internet Information Server (IIS) 5.0 302 for the web server 208, Windows 2000 Advanced Server SP1 304—Macromedia Jrun 3.02 for the application server 212, Sun Solaris 2.6 Kernel Patch Revision 21 308—Oracle Server Enterprise Edition—Version 8.1.6 310 for the database server 218, and Windows 2000 Advanced Server SP1 312—Microsoft SQLServer Version 7.0 314 for the MI database server 216.

For data deployment in this aspect of the invention, user data, such as driver, auto, and household data, is sent to the on-line quote system Oracle database 218 to be stored; IFS user credit data retrieved from CDE 230 is stored in the on-line quote system Oracle database 218; and rating results received from CDE 230 are stored, in the on-line quote system Oracle database 218. Excalibur upload results received from the Excalibur host application 56 are stored in the on-line quote system Oracle database 218. Online quote system MI data is copied from the on-line quote system Oracle database 218 and stored in the MI SQLServer database 216 through the linked server process of SQLServer.

In this aspect of the present invention, the CDE Rating Engine 230 sends consumer information and receives back IFS credit information and rating results, which enables transactions to perform at or better than the AMS rating engine 64. Backup and recovery are provided for the IIS Web Server 208. The application server 212, Oracle database server 218, and SQLServer database server 216 are backed-up and disaster recovery plans are put in place in adherence to pre-determined standards. Permanent Virtual Circuit (PVCS) version control and configuration management software is used for all source and object code storage, and ISCMS is used for version change management and migration through test environments into production. Data is updated at the conclusion of each session and after the CDE rating transaction returns, and purge criteria are also provided. A "hot backup" is performed daily. A subset of the on-line quote system application tables is created in SQLServer for MI purposes. Data is copied over weekly from the on-line quote system Oracle database 218 using SQLServer's "linked server" process. Business customers utilize the data for reporting purposes using, for example, Cognos Impromptu to create MI reports.

Security information that is classified as confidential includes, for example, information about customers, employees (including payroll and other compensation, medical, performance reviews, social security numbers, and home addresses and phone numbers) and financial institution business for which protection is obligatory, with local laws taking precedence; all production information; voice mail access codes; internal and external audit reports; regulatory agency reports (unless specified reports are classified by the regulatory agency as public information); logs and reports produced by security services; and information that the business unit determines has potential for providing competitive advantage. The on-line quote system application captures confidential data including the user's name and address. Also, if users choose to base their auto coverage on their personal financial data, information such as total household income and total value of assets is also collected. In addition, a user's social security number is collected and credit declination reasons are shown to the user 202. This data is stored in the on-line quote system Oracle database 218.

For the authentication process in this aspect of the on-line quote system for an embodiment of the invention, anonymous access is used to access the on-line quote system site 208. SiteServer LDAP 210 security is used to lock-down the deployable content site that remains in the underwriter's secure zone 246. With respect to the authorization process, the web server 208 has an ID and password for on-line quote system anonymous access, and the application server 212 accepts only requests from the web server 208. Retrieval and updating of data between the application server 212 and the Oracle database server 218 is secured with an application level ID and password. CDE 230 and Excalibur host application 56 MQ transactions are secured using Real Time Support's Security Exit for JAVA. The connection is secured by a Resource Access Control Facility (RACF) ID and password exchanged during the connection, and the ID and password are encrypted and self-maintained. The MI SQLServer database 216 is updated from the Oracle database 218 through a scheduled job that follows pre-determined security standards. The site uses Secure Socket Layer (SSL).

With regard to auditing and monitoring, all possible communication processes are monitored via a monitoring infrastructure including, for example, IIS Web Server's ability to proxy JSP requests to the application server, connectivity between the application server 212 and CDE 230/Excalibur 56, connectivity between the application server 212 and the Oracle database server 218, connectivity between the on-line quote system Oracle database 218 and the CTI Oracle database 220, and connectivity between the Oracle database 218 and the SQLServer database 216. The areas involved in security administration include, for example, Data Administrator 30 (DA) and Information Systems (IS) security The IDs utilized include, for example, the ID on the web server 208 for on-line quote system anonymous access, read only. The application server 212 has an ID/password of Oracle database server 218 for application access. The application server 212 has MQ Security Exit program with the RACF ID that has read permission on the MQ queues. The MI SQLServer database 216 has an ID/password of the Oracle database 218 for linked server access.

Figure 14:
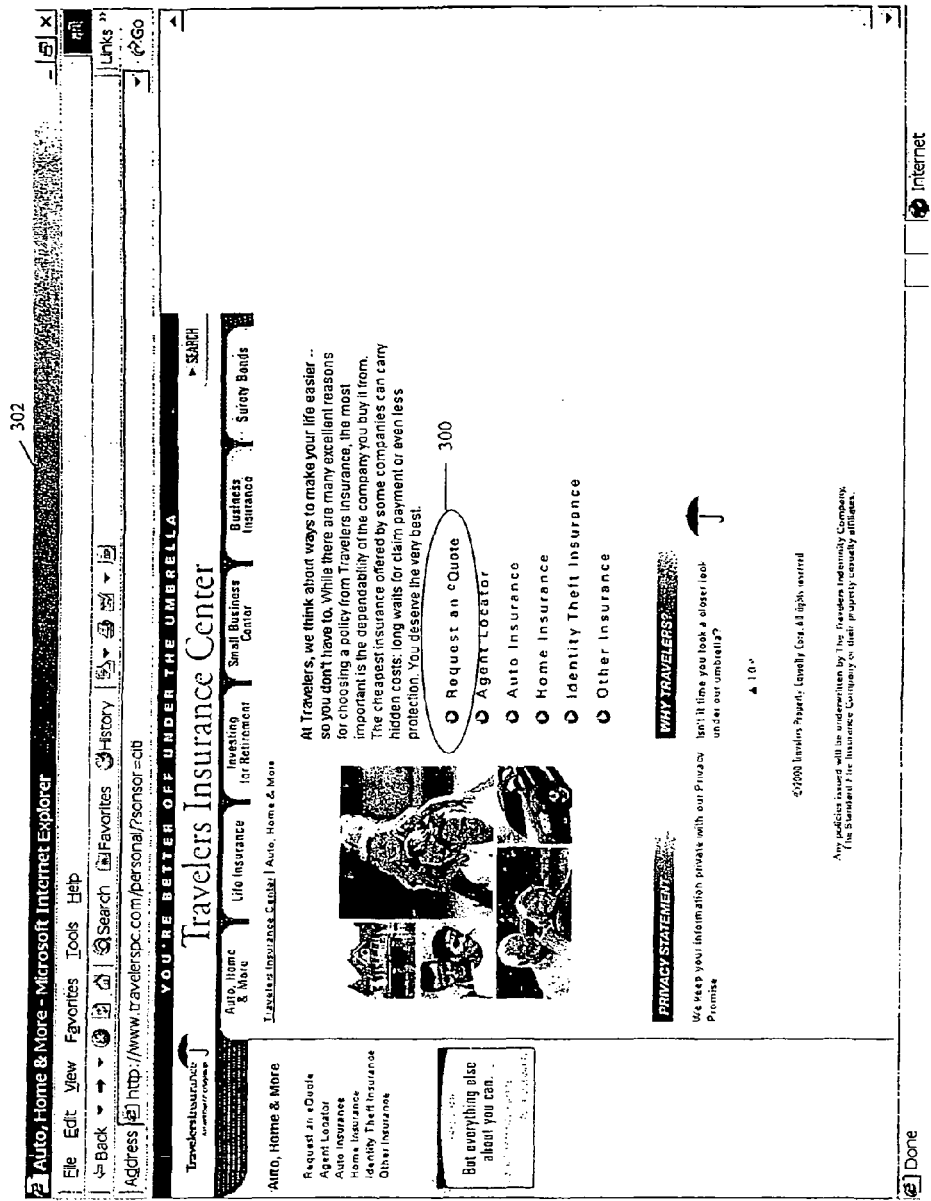
Figure 15:
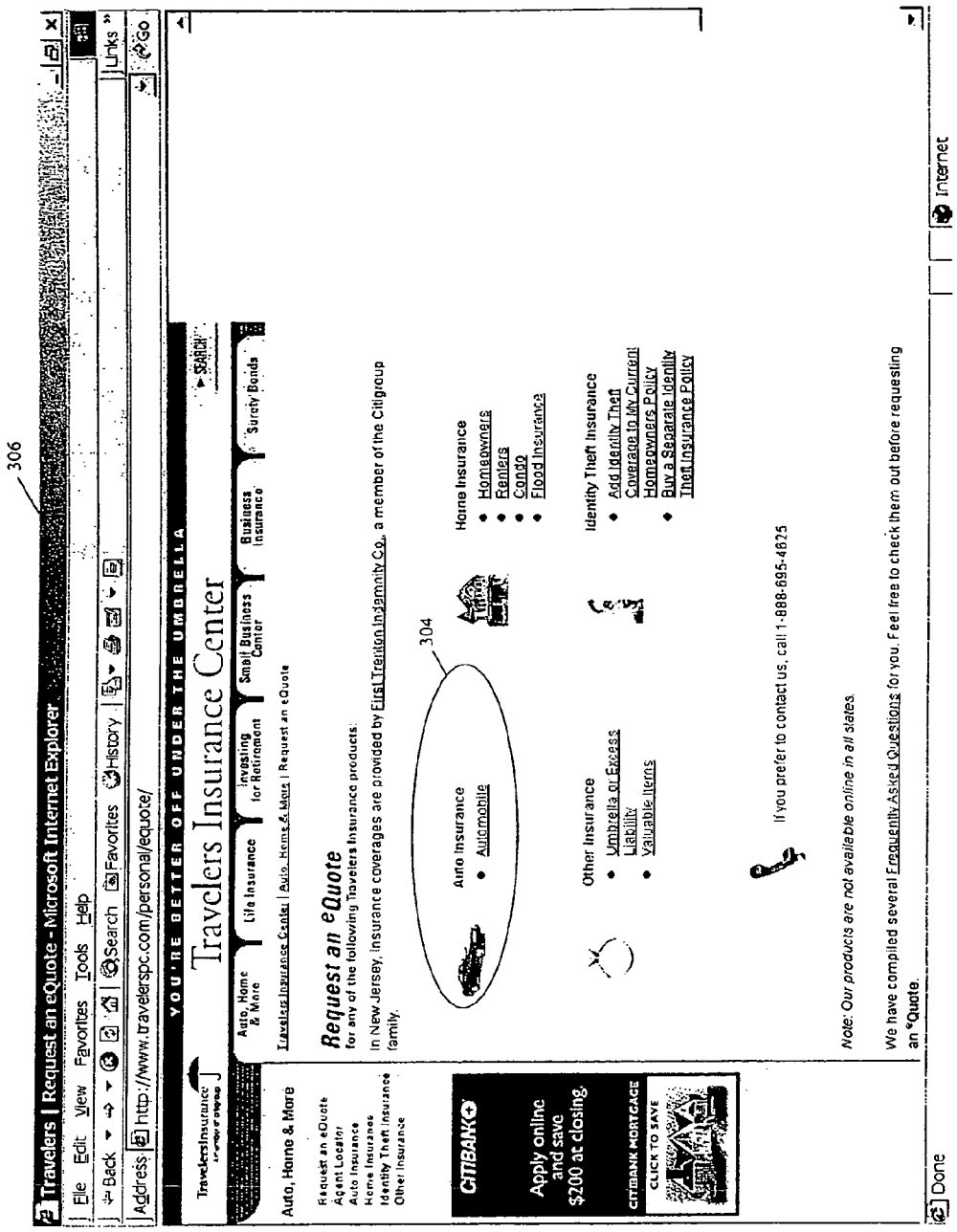
Figure 16:
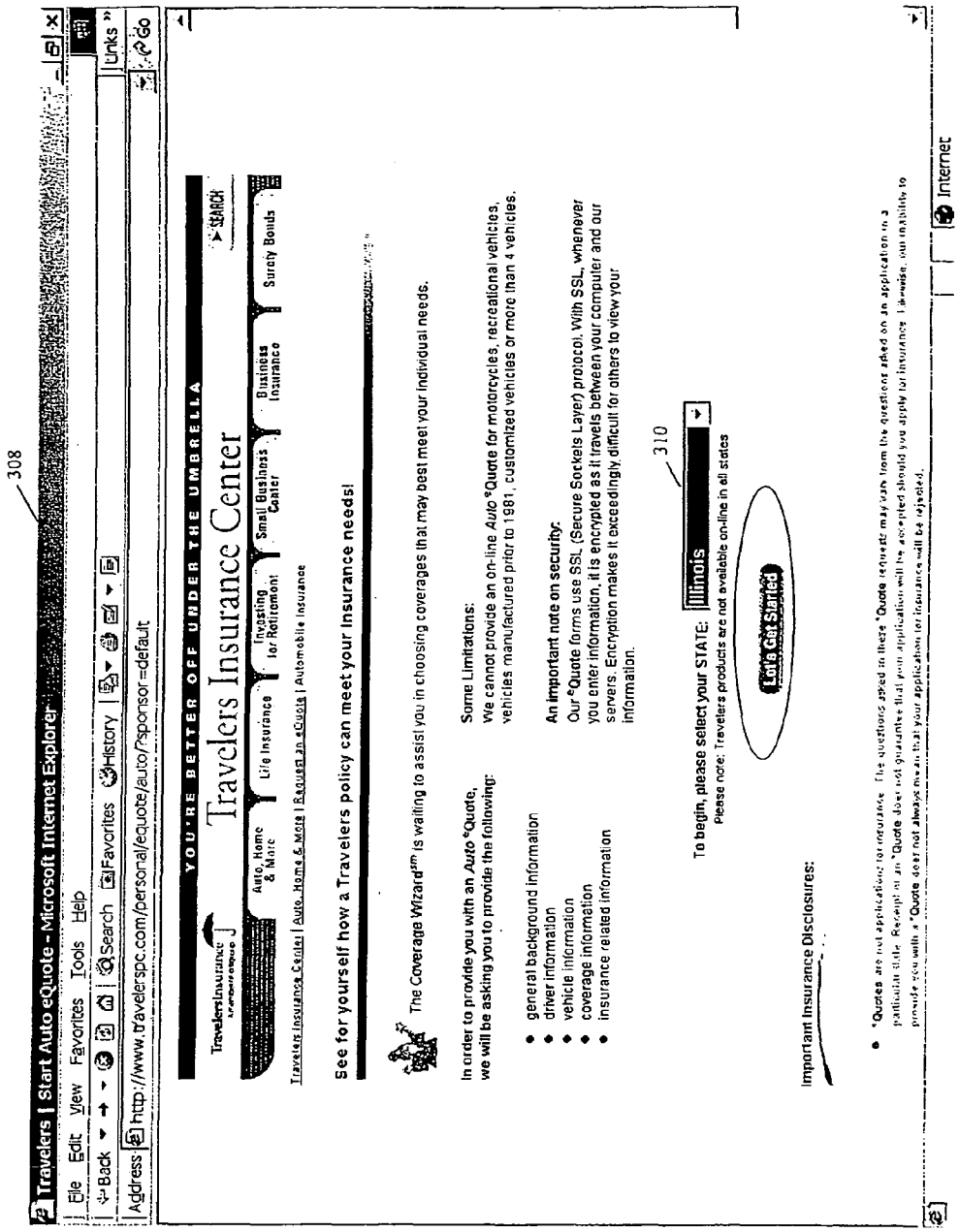
Figure 19:
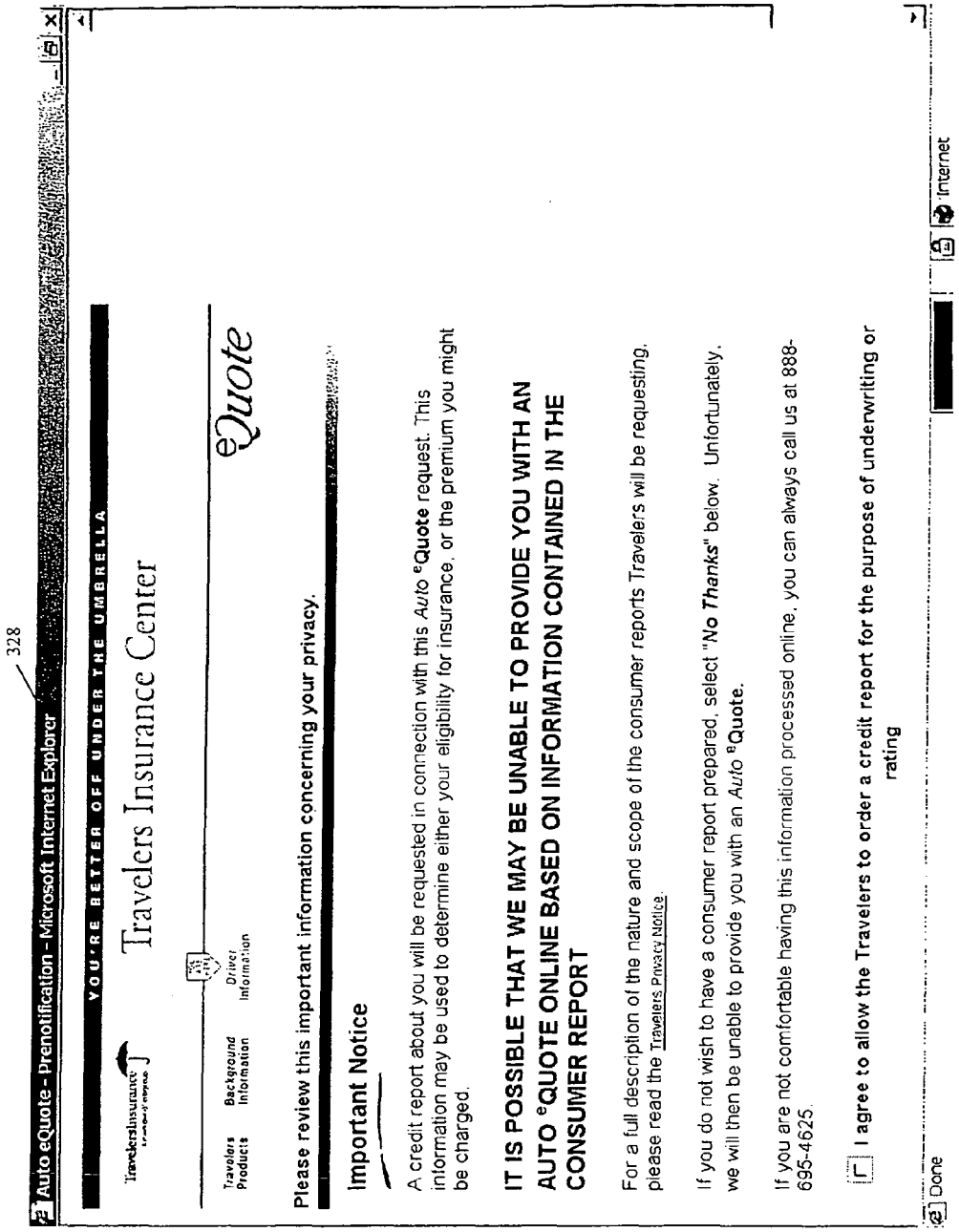

FIGS. 14-35 show examples of Graphical User Interface (GUI) screens for the on-line quote system for an alternate embodiment of the present invention. FIGS. 36a, 36b, 36c, and 36d (referred to collectively herein as "FIG. 36") show a schematic flow chart which provides further detail regarding the on-line quote process using the sample GUI screens shown in FIGS. 14-35. Referring to FIGS. 14 and 36, at S150, the user 202 logs on to the website 208, and at S151, the user 202 selects "Request an e-Quote" 300 on an "Auto, Home and More" page 302. Referring to FIGS. 15 and 36, at S152, the user 202 can then enter a selection for auto insurance 304 on a "Request an E-Quote" page 306. Referring to FIGS. 16 and 36, at S153, a "State" page 308 is displayed for the user 202 on which the user 202 enters the state 310 in which the user 202 is interested in getting a quote. At that point, referring to FIGS. 17 and 36, the system gathers some basic information 312 on a "Background Information" page 314 at SS154, such as the number of drivers 316, the number of vehicles 318, the user's current policy expiration 320, and the user's current premiums 322. The user 202 then proceeds to a "Driver Information" page 324 at S155, as shown in FIGS. 18 and 36, on which driver information 326, such as who the user 202 is, can be collected. Thereafter, as shown in FIGS. 19 and 36, a "Prenotification" page 328 is displayed at S156, and accident and violation information 330 is collected on a "Driver Details" page 332 at S157, as shown in FIGS. 20 and 36. Thus, the user's information is collected up front rather than at the end of the process, so the quote process is not anonymous.

Figure 21:
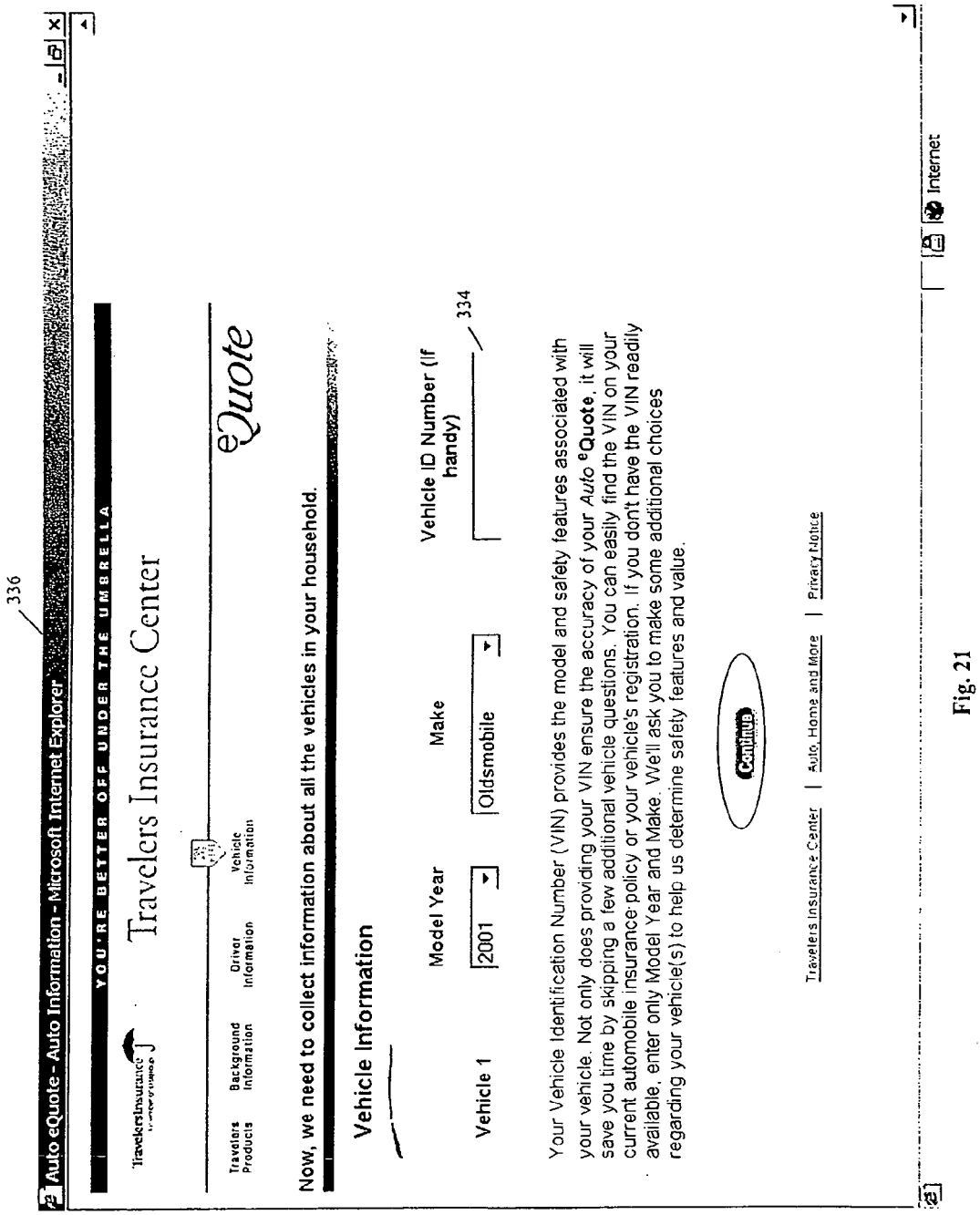
Figure 22:
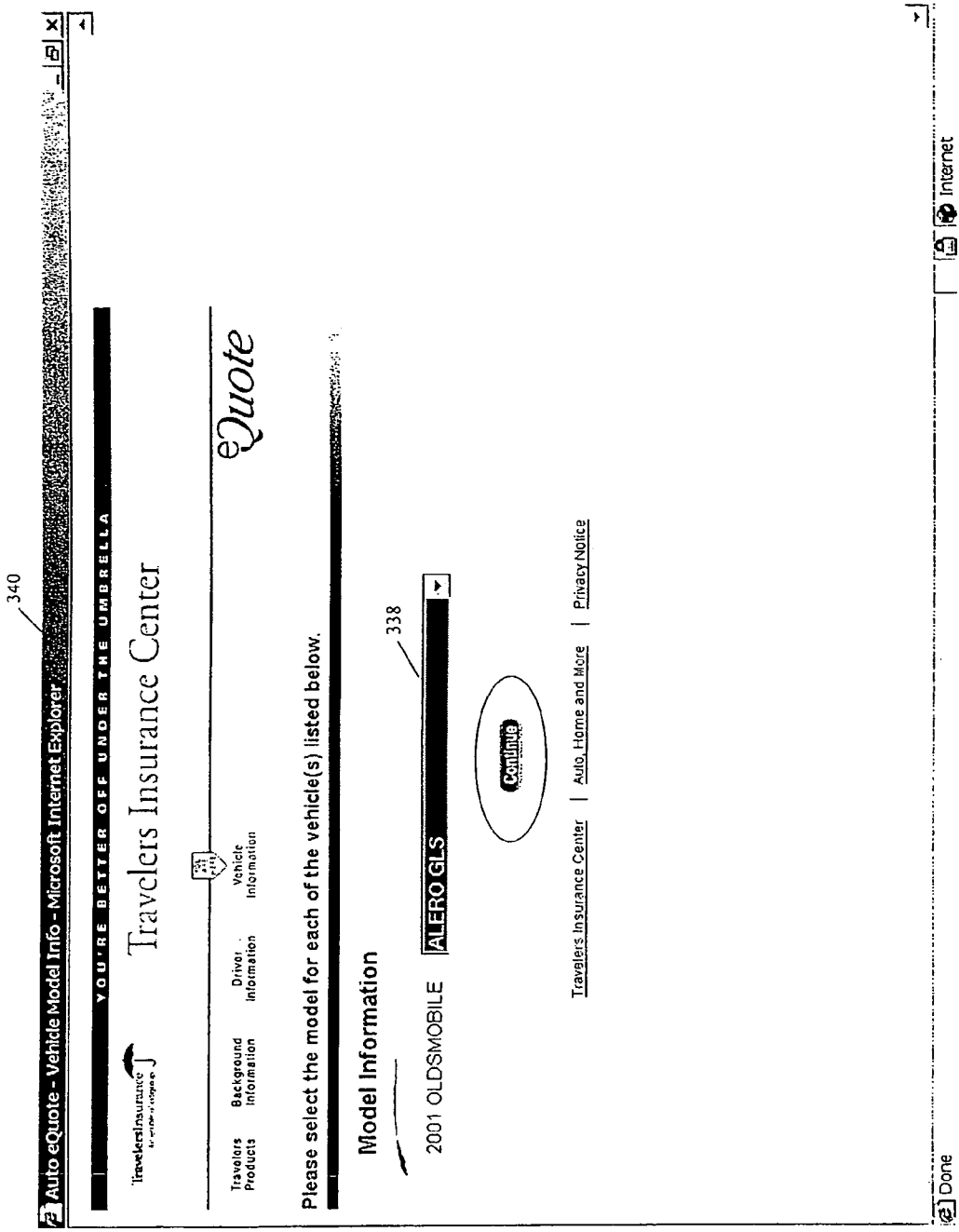
Figure 23:
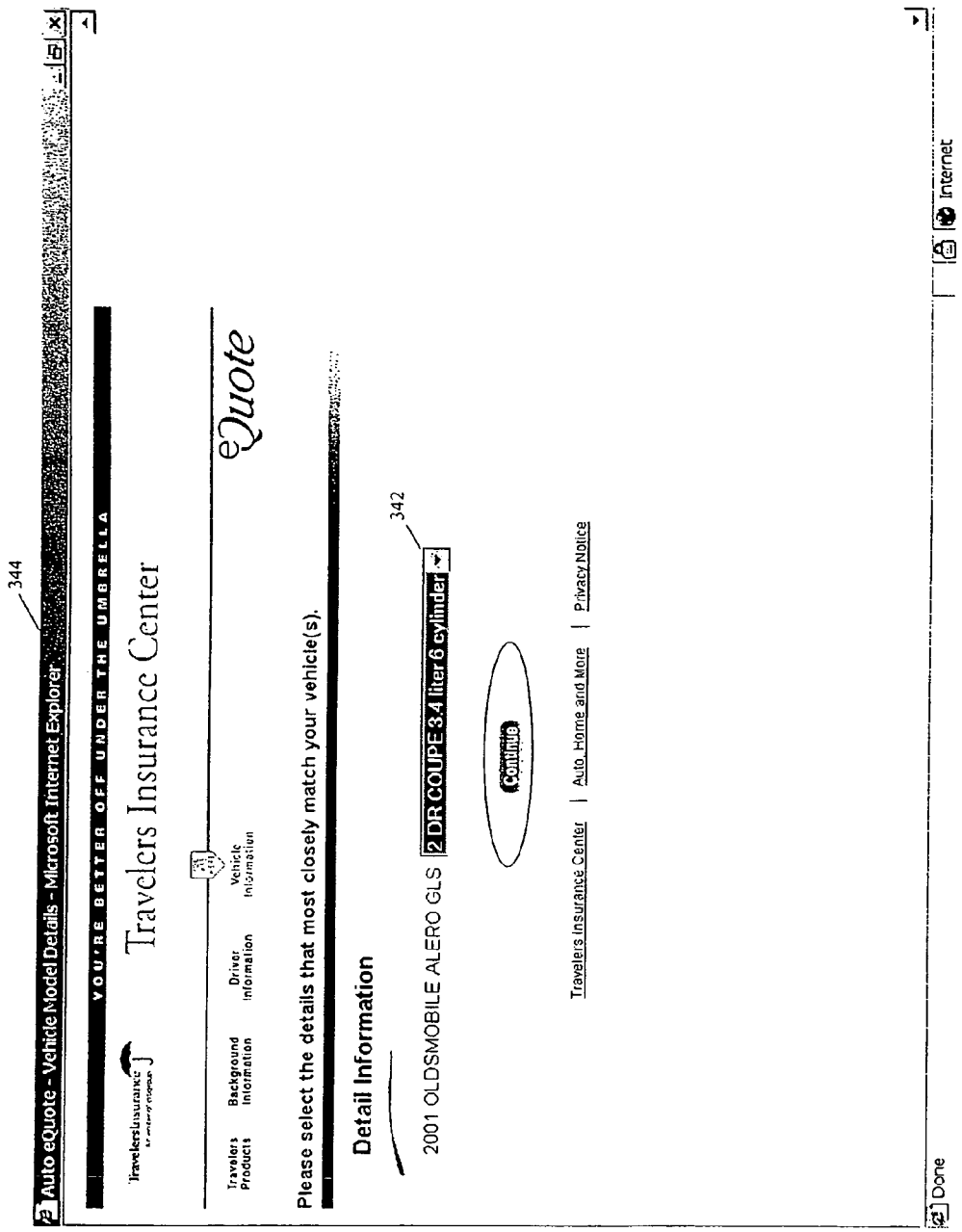
Figure 24:
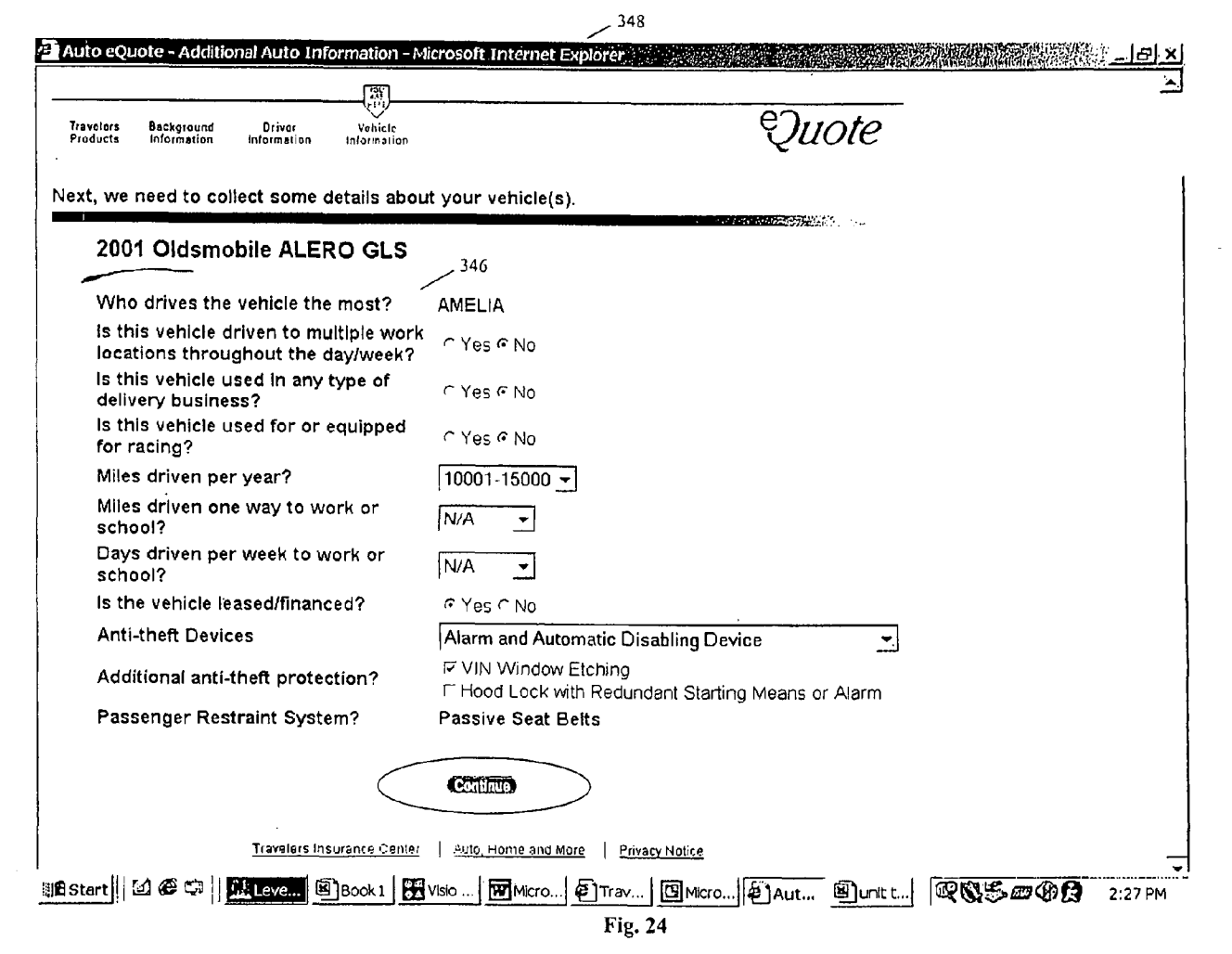
Figure 25:
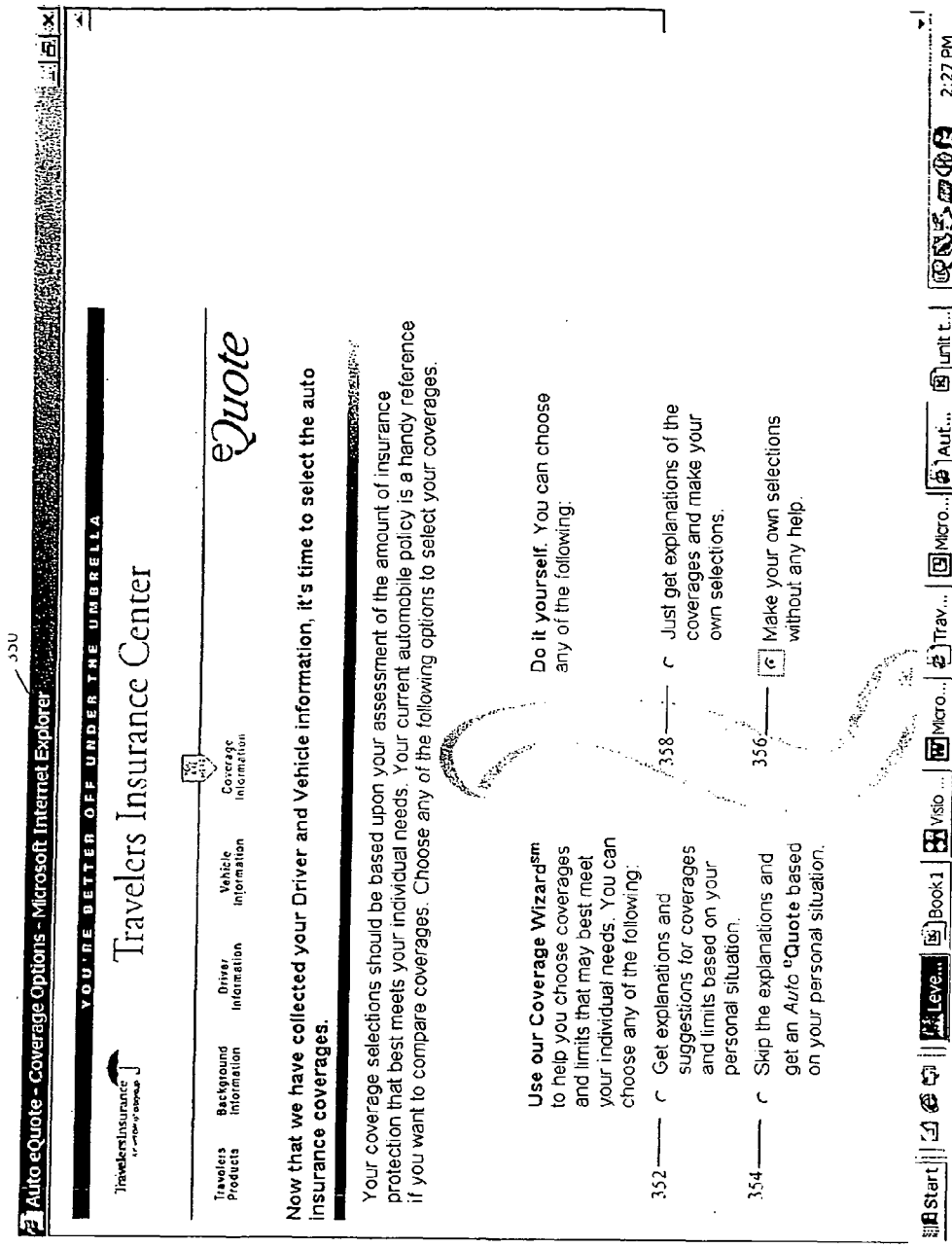
Figure 26:
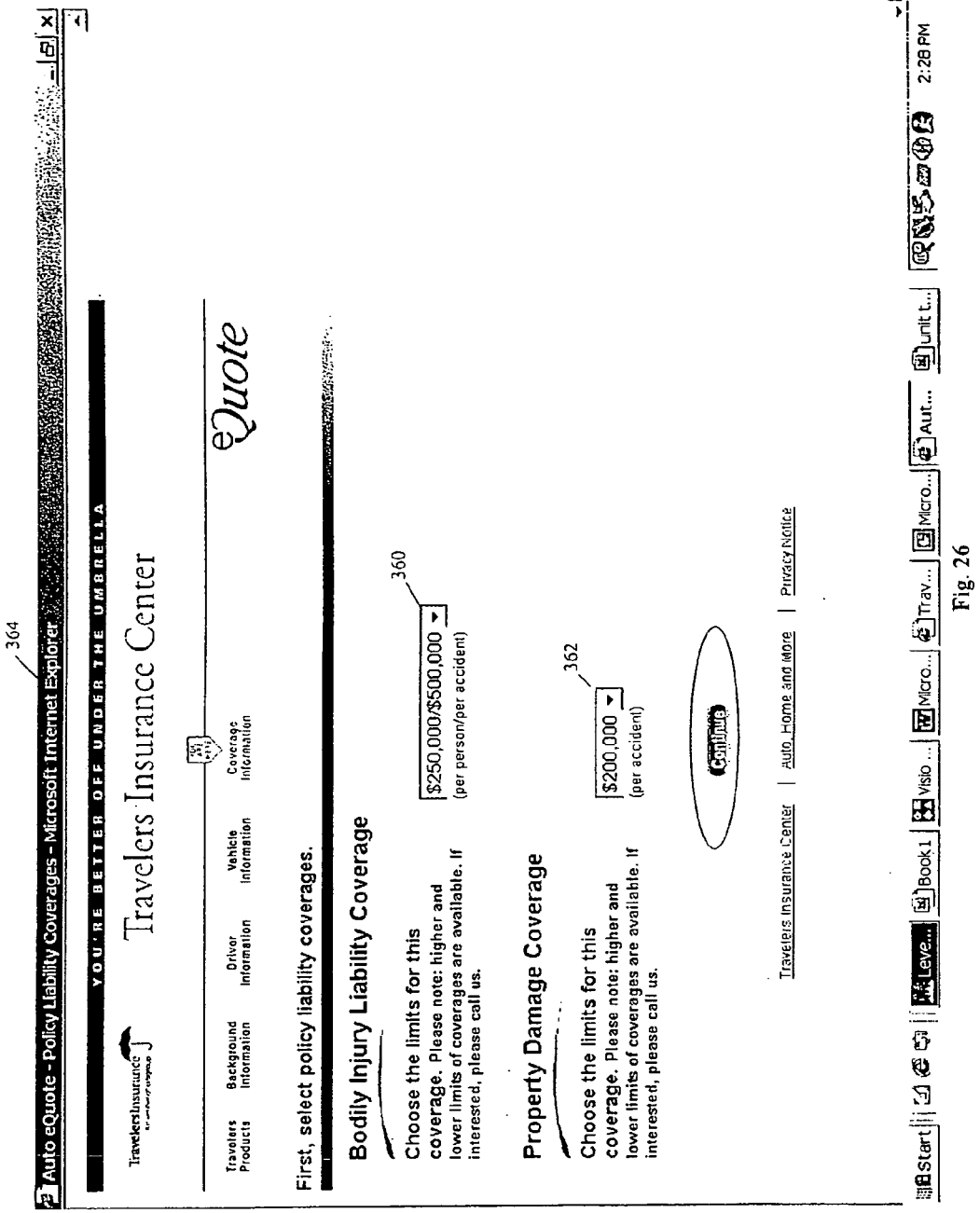
Figure 27:
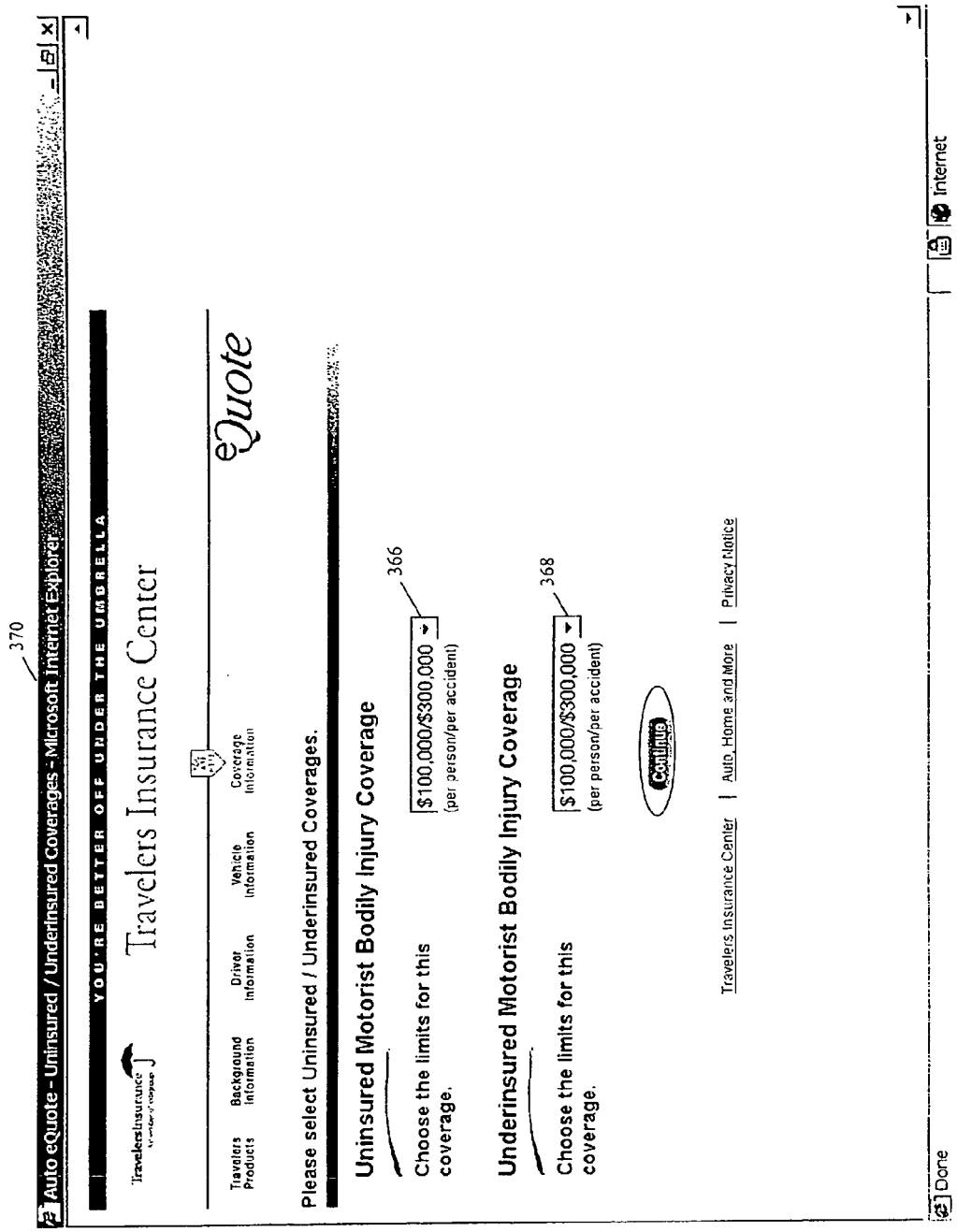
Figure 28:
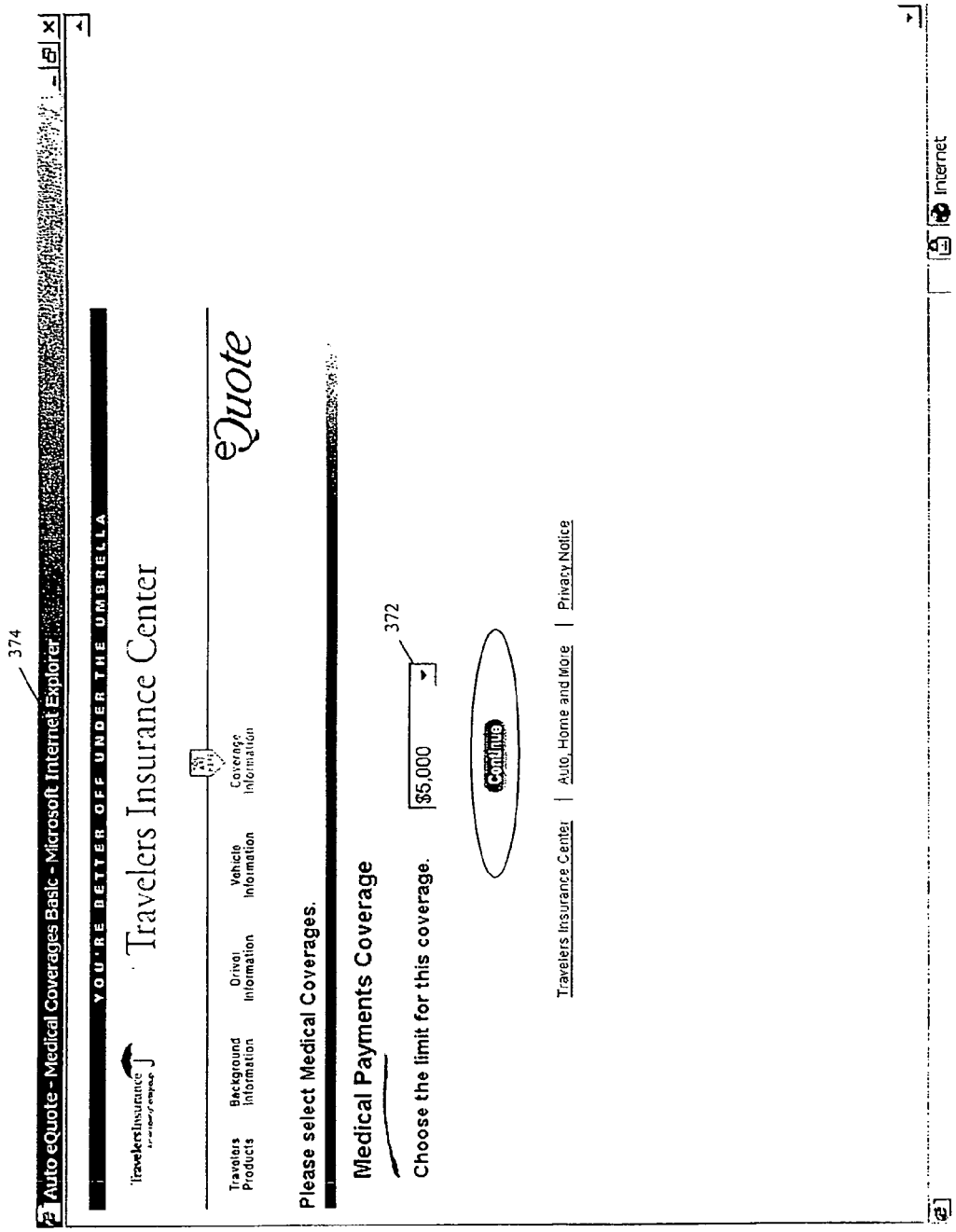
Figure 29:
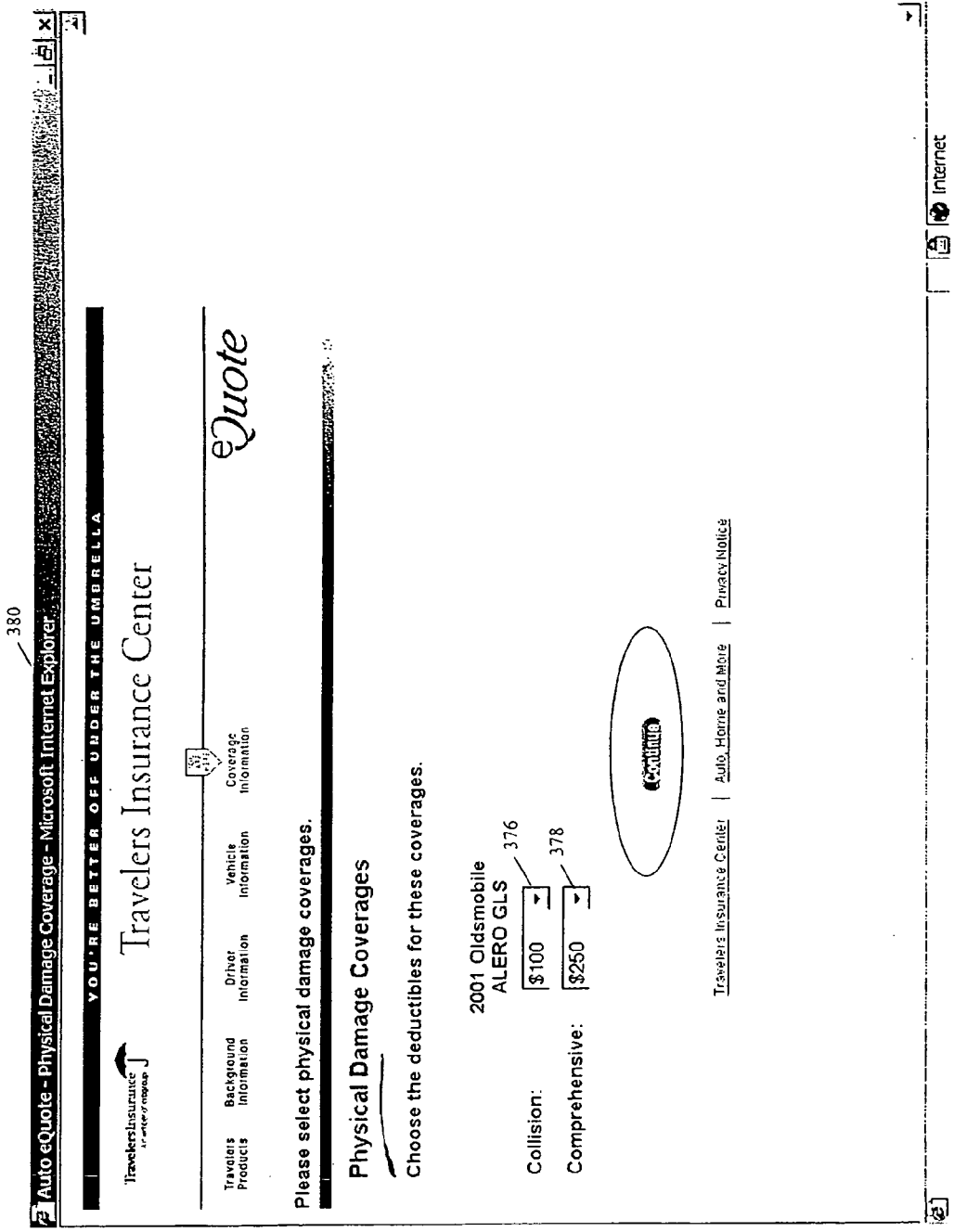

Continuing with the example, as the user 202 proceeds through the application, at S158, the user 202 enters a vehicle VIN 334 on an "Auto Information" page 336 as shown in FIGS. 21 and 36, model information 338 on a "Vehicle Model Information" page 340 at S159 as shown in FIGS. 22 and 36, vehicle detail information 342 on a "Vehicle Model Details" page 344 at S160 as shown in FIGS. 23 and 36, and vehicle driver information 346 on an "Additional Auto Information" page 348 at S161 as shown in FIGS. 24 and 36. Referring to FIGS. 25 and 36, at S162, the user 202 arrives at a point where the user is presented, for example, with four options on a "Coverage Options" page 350. One option is selection of the "Coverage Wizard" 352 at S163 on which the user 202 enters some basic information, such as whether the user 202 has vehicle coverage for towing and the like, and basic financial information, such as how much the user 202 has available to pay for a claim if a claim arises. When the user 202 enters that information, the user 202 then can elect an option to go through the "Direct-to-Quote" process 354 at S164, which is functionality provided by the alternate embodiment of the invention, or the user 202 can proceed through the Coverage Wizard process 352 in which the system recommends different coverages for the user 202.

Based upon the information entered by the user 202, the system for an alternate embodiment of the invention makes recommendations, and the user 202 can follow through and either make modifications or simply accept what the system pre-fills for the user 202. The other two options are manual in which the user 202 is required to go through and enter selections for every item. For example, if the user 202 has a policy setting in front of him or her, the user 202 can elect an option to make the users own selections without help 356 and go through the particular fact path and simply enter whatever the user 202 wants. On the other hand, the user 202 can elect an option to make the users own selections with explanations of coverages 358, and the user 202 is provided with additional information which explains all the coverages in a great deal of detail for the user 202. The user 202 can enter coverages selections, for example, for bodily injury 360 and liability 362 coverage on a "Policy Liability Coverages" page 364 shown in FIG. 26, uninsured 366 and underinsured 368 motorist coverage on an "Uninsured/Underinsured Coverages" page 370 shown in FIG. 27, medical payments coverage 372 on a "Medical Coverages" page 374 shown in FIG. 28, collision 376 and comprehensive 378 coverage on a "Physical Damage Coverage" page 380 shown in FIG. 29, and additional coverages 382 on an "Additional Coverage" page 384 shown in FIG. 30.

Figure 35:
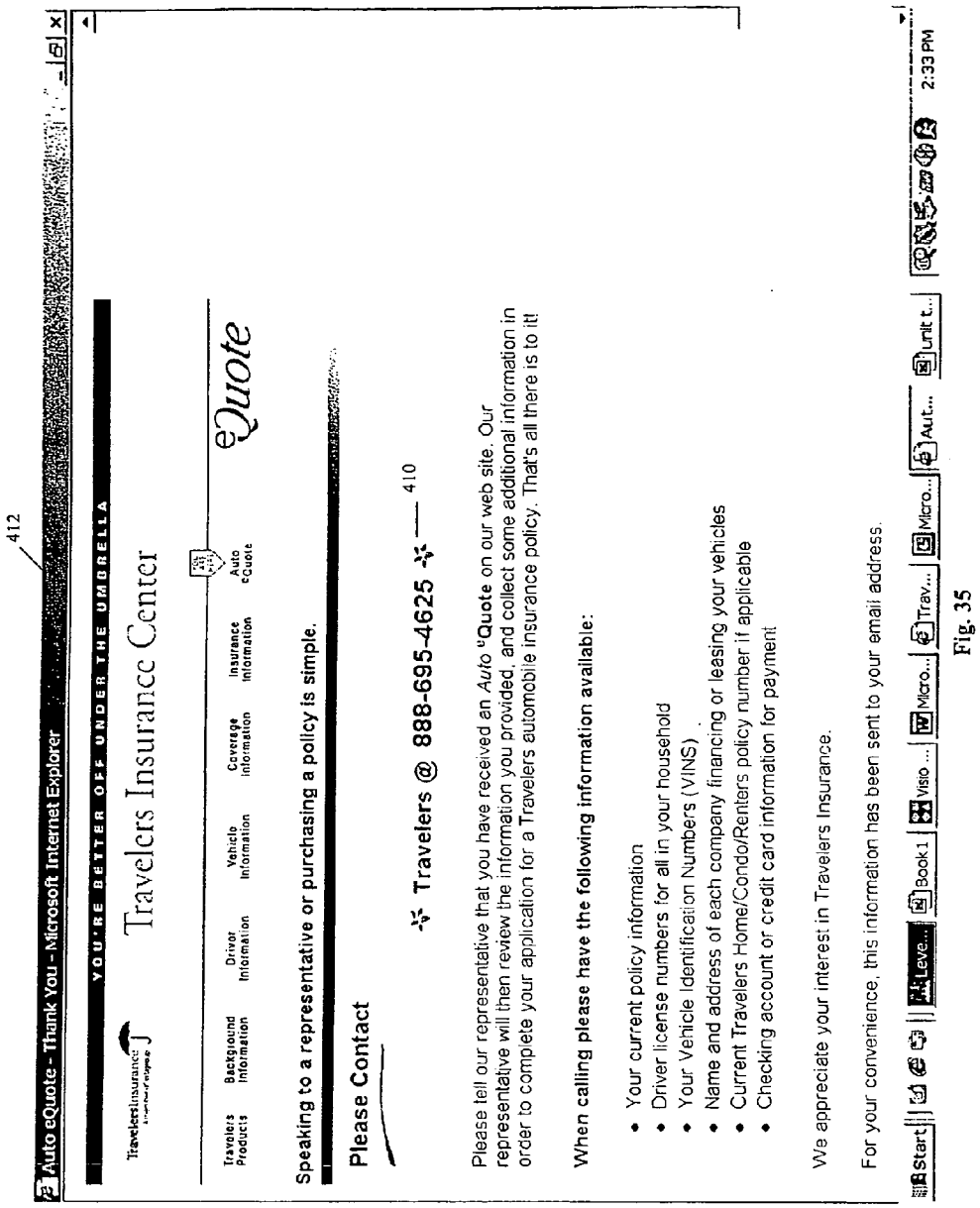
Figure 36A:
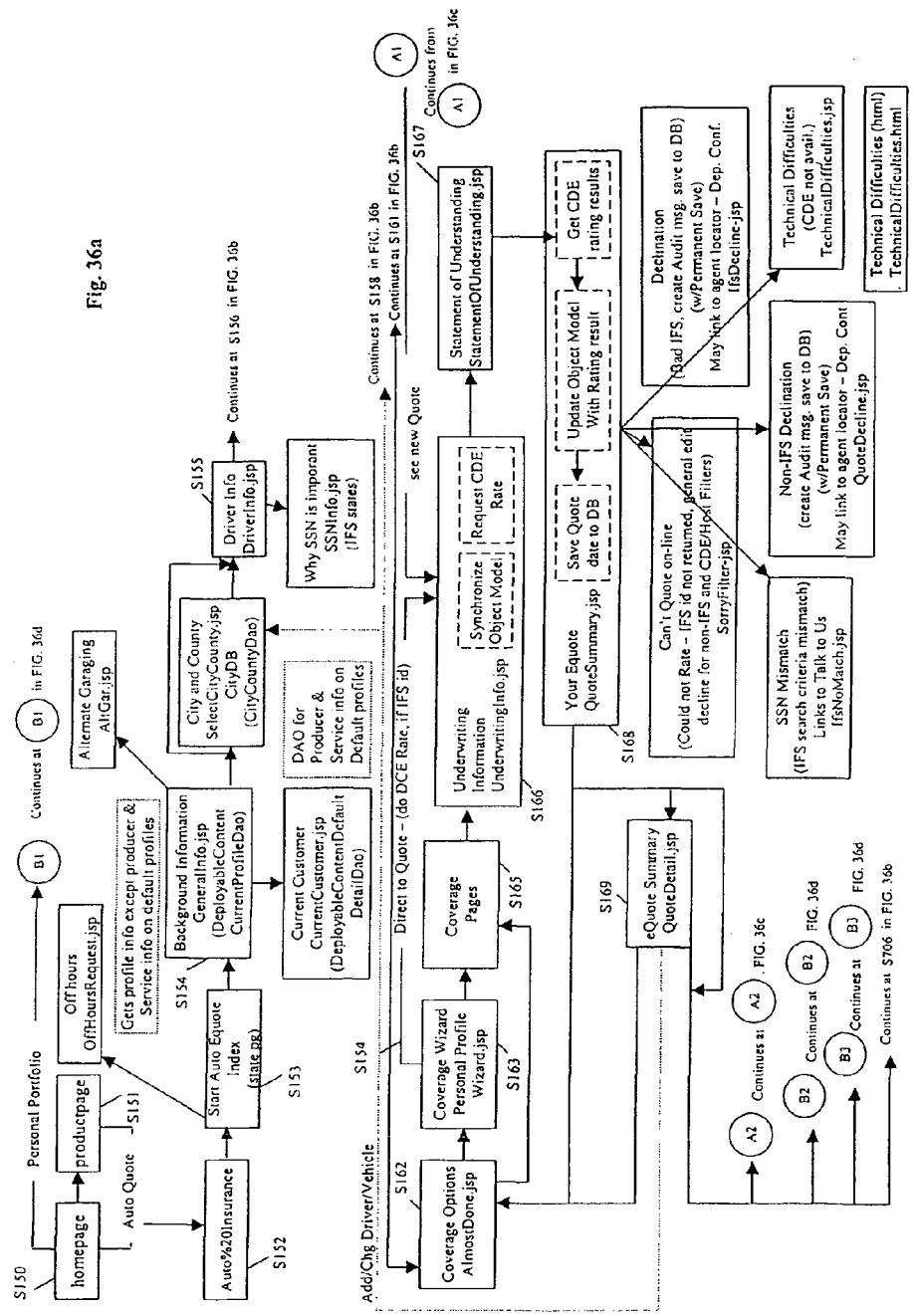
FIGS. 36*a*-36*d* show a schematic flow chart which provides further detail regarding the on-line quote process using the sample GUI screens shown in FIGS. 14-35.
Figure 36B:
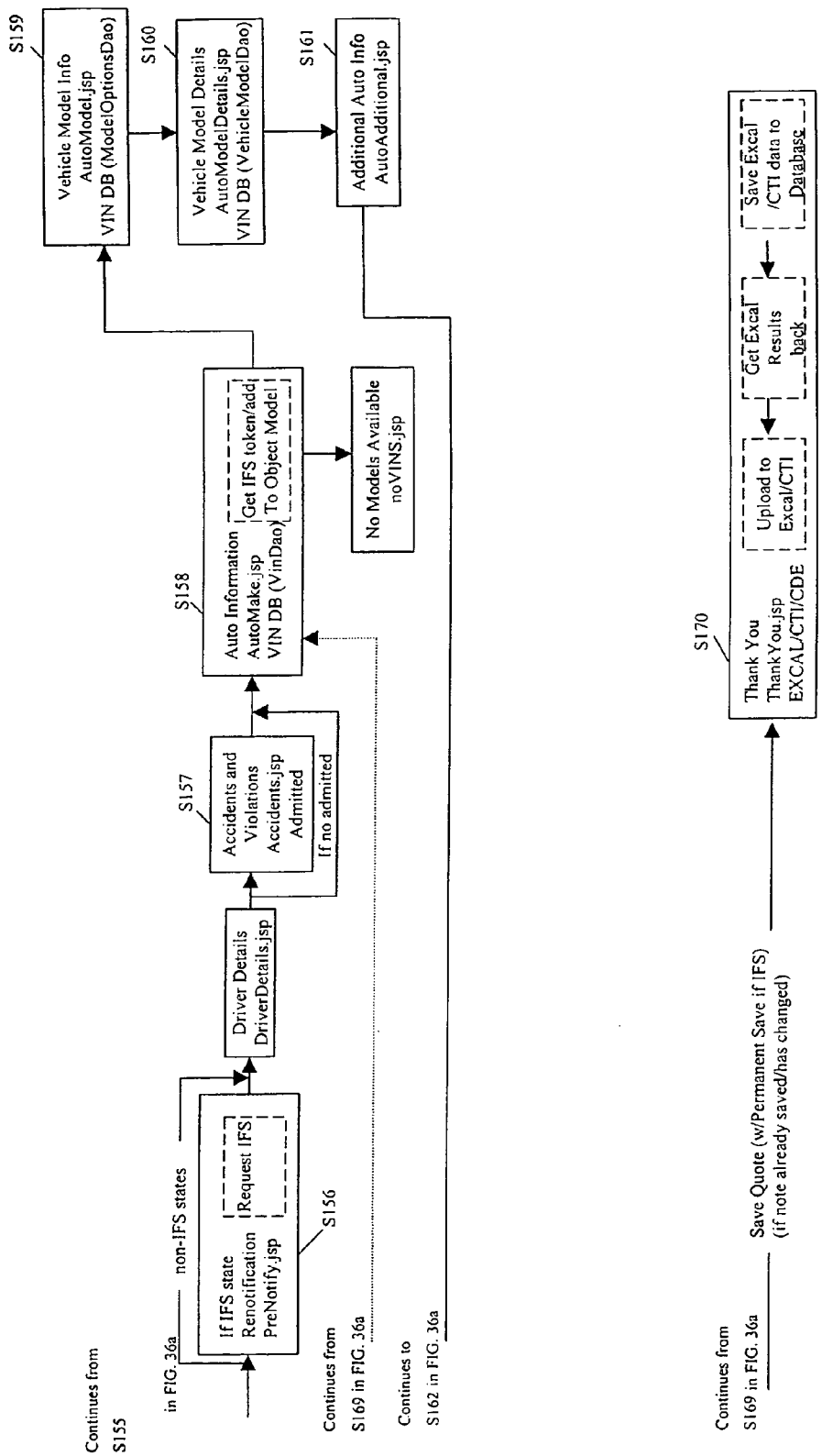
Figure 36C:
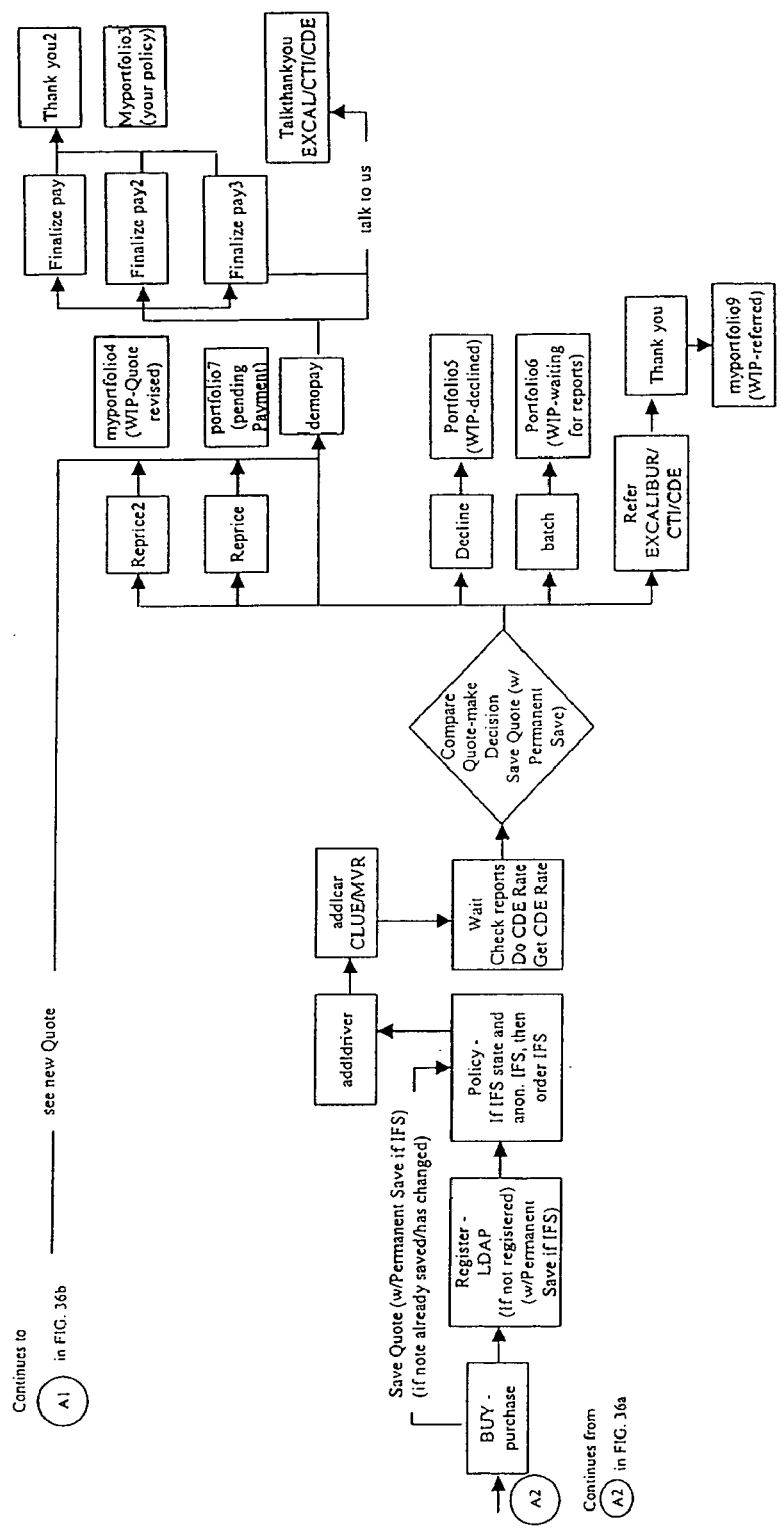
Figure 36D:
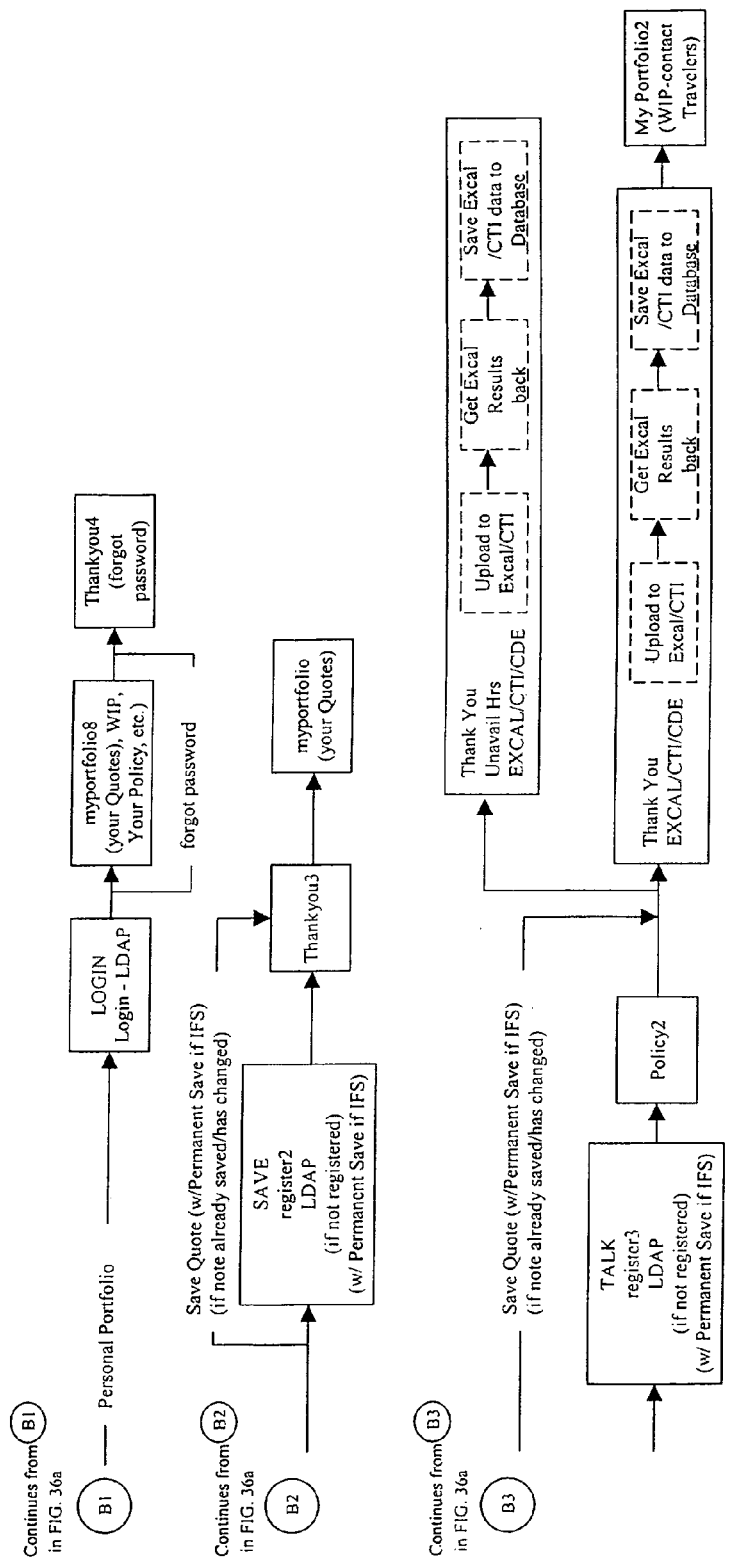
Figure 37:
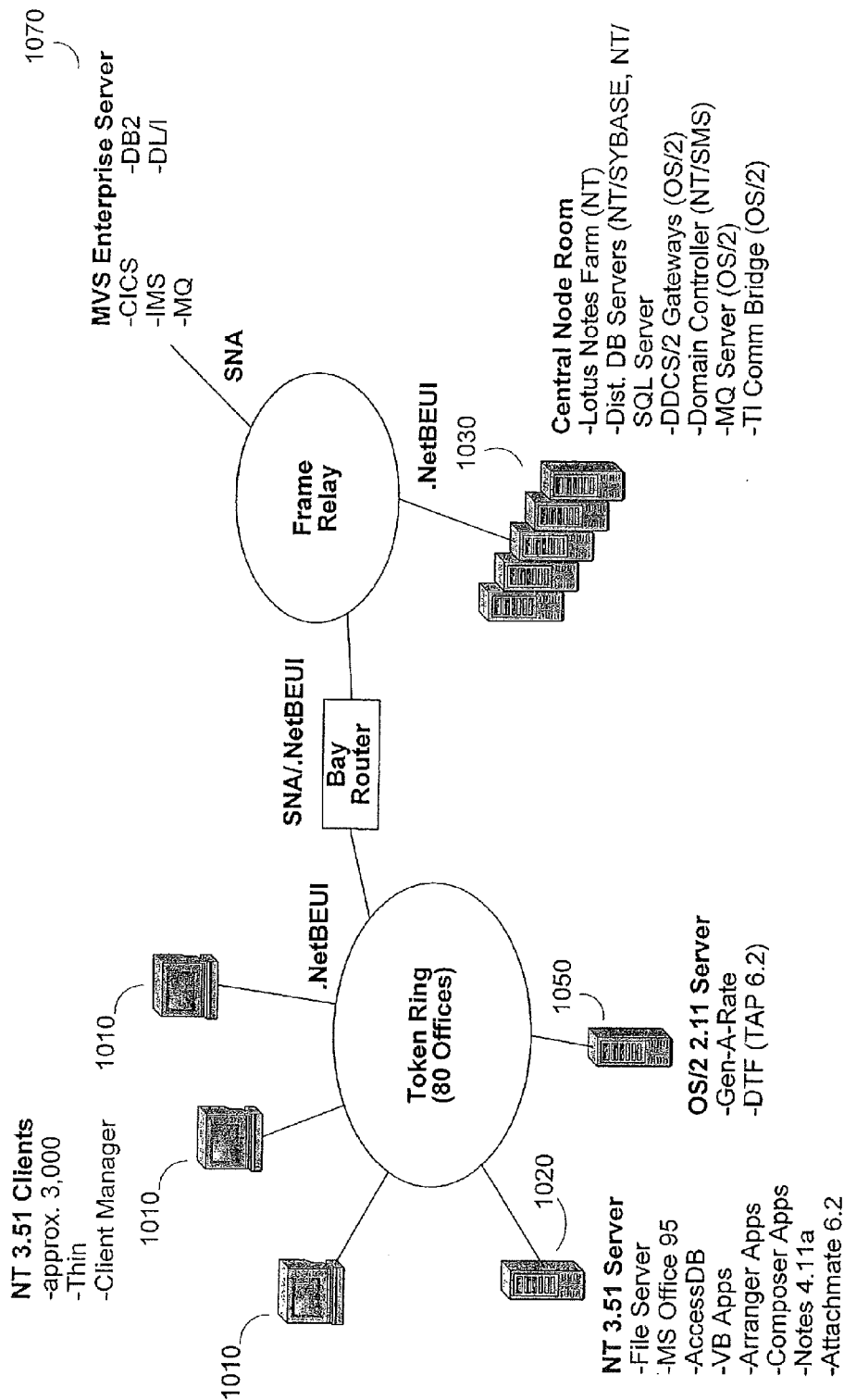
FIG. 37 depicts an example of a known technical infrastructure of a data processing system.

In the system for an alternative embodiment of the present invention, following selection of the coverages, the user 202 is prompted to enter answers to underwriting questions 386 on an "Underwriting Information" page 388 at S166 as shown in FIGS. 31 and 36 and is thereafter provided with information 390 on a "Statement of Understanding" page 392 at S167 as shown in FIGS. 32 and 36. All four of the options 352, 354, 356, and 358, take the user 202 to a quote 394 displayed on a "Your E-Quote" page 396 at S168 as shown in FIGS. 33 and 36. From the "Your E-Quote" page 396, the user 202 can select a "See More Details" option 398 and be presented with a summary of driver information 400, summary of vehicle information 402, and a quote summary 404 on an "E-Quote Detail" page 406 at S169 as shown in FIGS. 34 and 36. The quote summary 404 is a high level view of details of the selected coverages and what the user 202 will be paying, for example, per year, and the system also provides the user 202 with different options at that point, as well. For example, the user 202 can click on a "Talk To Us" button 408, which allows the system to upload the data to a backend system and provide the user with phone numbers 410 which the user 202 can call to speak to either the underwriter's CSRs or an agent on a "Thank You" page 412 at S170 as shown in FIGS. 35 and 36.

An alternate embodiment of the present invention also provides functionality which enables the user 202 to go back and modify any item, for example, by clicking on "Explore Your Options" 414 from the "E-Quote Detail" page 406. A navigation bar built into the application allows the user 202 to go back and modify any item at any point in time. Another functionality provided by an alternate embodiment of the present invention is referred to as "Fast Forward". For example, if the user 202 goes all the way through to a quote and then goes back and enters a modification, such as adding a driver, when the user 202 goes back to the appropriate page to add the new driver, the user 202 can click on a "Fast Forward" button. When the user 202 clicks the "fast forward" button, the system only requires the user 202 to go to the pages in the application that require additional information from the user 202. Thus, the system stops only on pages that are affected by the newly entered information, and it is not necessary for the user 202 to actually go through every single page again.

This aspect of the on-line quote system for an embodiment of the present invention enables delivery of the on-line quote application 212 to market on the public Internet faster. Aside from the pure marketing aspects, such as providing an on-line coverage counseling tool, real-time quoting, update of host systems, and the like, there are serious financial implications for the underwriter's personal lines, as well. In the past, for example, consumers provided data at the underwriter's web site 208 (and co-branded affinity web sites) that was emailed to the underwriter's telemarketing office for processing. Processors then printed the request, processed a quote for the consumer and sent the completed quote back to the consumer via email. This process generally took several days and was very expensive for the underwriter in terms of cost per quote processed and cost per policy actually converted.

Deployment of the on-line quote application 212 for this aspect of an embodiment of the present invention substantially reduces these processing expenses and also has implications on the sales side of the equation. The on-line quote system of the present invention substantially reduces call time on every sale and enables the underwriter, for example, to significantly increase on-line advertising efforts. In addition to financial restrictions, past systems also had constraints in terms of capacity concerns in that enormous manpower was required for processing the volume of leads generated via on-line advertising, partnerships and ties, for example, with web sites of a financial institution, such as a bank. Implementation of this aspect of the on-line quote application 212 of the present invention removes this as an issue going forward. In addition, other aspects, such as real time, on-line quotes for property insurance can also be implemented.

The deployment of such a property lines Internet strategy utilizing the on-line quote system for an embodiment of the present invention provides Internet capabilities that enable personal lines to sell and service automobile insurance policies through a process that is less expensive, simpler and faster. These capabilities provide, for example, flexible deployment that can leverage both the underwriter's and one or more affiliated financial institution's brands and develop on-line third party brand names, such as Quicken, InsWeb, and Quotesmith; benefits property lines sales across all channels, such as retail, affinity marketing, call center, and direct; address all phases of the sales process, such as data capture, underwriting, pricing, proposal, acceptance and issue; and provides for differences in consumer preferences and behaviors.

The on-line quote system for an embodiment of the present invention can make the sale of automobile policies less expensive by eliminating labor acquisition costs for policies bought on-line and significantly reducing the acquisition costs for policies shopped on-line and bought off-line; transferring the responsibility for the accurate collection and input of data to the end consumer; and reducing the amount of time required to make new call center or agency employees productive. In addition, the on-line quote system for an embodiment of the invention can make the sale of automobile policies simpler by providing education and counseling for the consumer to better understand the product and bolster their confidence in a purchase decision and retooling the current process to differentiate quoting from purchase and collect information at the appropriate time in the process. Further, the on-line quote system of the present invention can make the sale of automobile policies faster by providing the ability to complete the purchase during an on-line session for those who wish to purchase on-line; making consumer input data available in real-time to closing agents for those who wish to purchase off-line and quickly connecting the consumer to those agents; and reducing the amount of "talk" time and after-call processing time required for the sale of a policy.

Additional details of a related three-tiered technical infrastructure on which the above system may operate are described further in relation to FIGS. 37-46.

Figure 38:
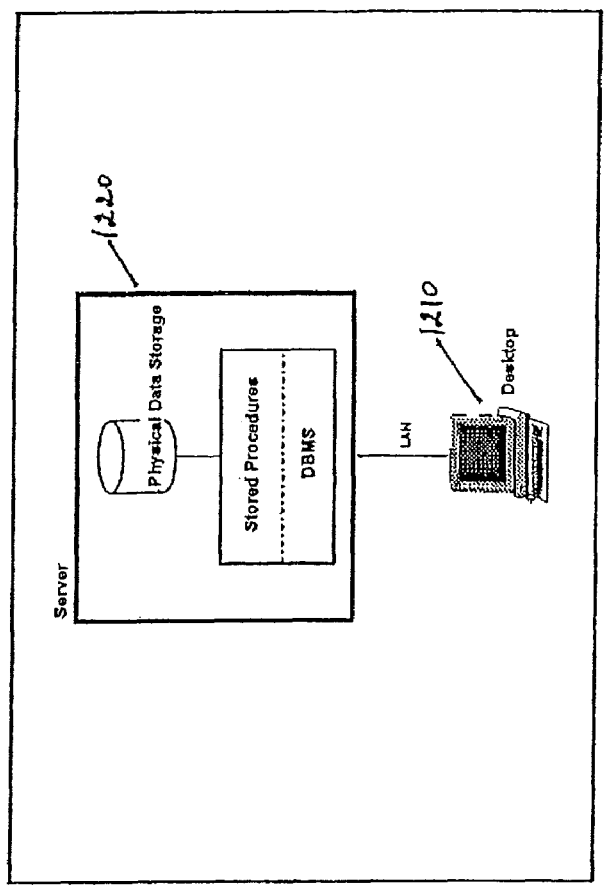
FIG. 38 depicts a known client/server application model.

Applications designed for the technical infrastructure of a data processing system of the present invention is client/server oriented in nature. However, the approach of the present invention is different from those typically used in application development in the past. Previously, client/server applications were designed using a remote data access approach, as illustrated in FIG. 38. In this approach, system applications usually consisted of a desktop component 1210 and a server component 1220. The desktop component typically contained not only GUI code, but also most of the application's business logic. The server component was usually tightly coupled to a vendor's database management system (DBMS), and it managed interaction with the application's database and underlying DBMS. However, the server component also contained business logic, usually in the form of database stored procedures. This design is typical of most applications written using the more popular client/server development tools of the last few years, such as Microsoft Visual Basic (VB) for the desktop component and the Sybase and Microsoft SQL Server DBMSs for the server component.

The typical client/server approach has been effective in that it allows quick applications roll-out to users. However, there are several fundamental disadvantages to this approach. First of all, the tight coupling of the applications inhibits the ability to reuse components across applications. Even simple logic components that are needed by numerous applications—such as, for example, the logic needed to validate office codes—have to be reinvented in multiple code for multiple different server types. This is obviously a wasteful use of scarce application development resources, and must be corrected. Secondly, the typical approach is storage of application logic on the desktop, and tight coupling to the server, which results in high costs of application operations and administration. This is because even a small change on either the desktop or server side application often will require redeployment of the entire application. It becomes even more cost-prohibitive and complicated as a greater numbers of remote users must be considered, and the prospect of a rapidly growing remote user population. Finally, this approach uses a considerable amount of communications bandwidth, as it often requires that large volumes of data be downloaded to the user's machine in order to perform application tasks.

Figure 39:
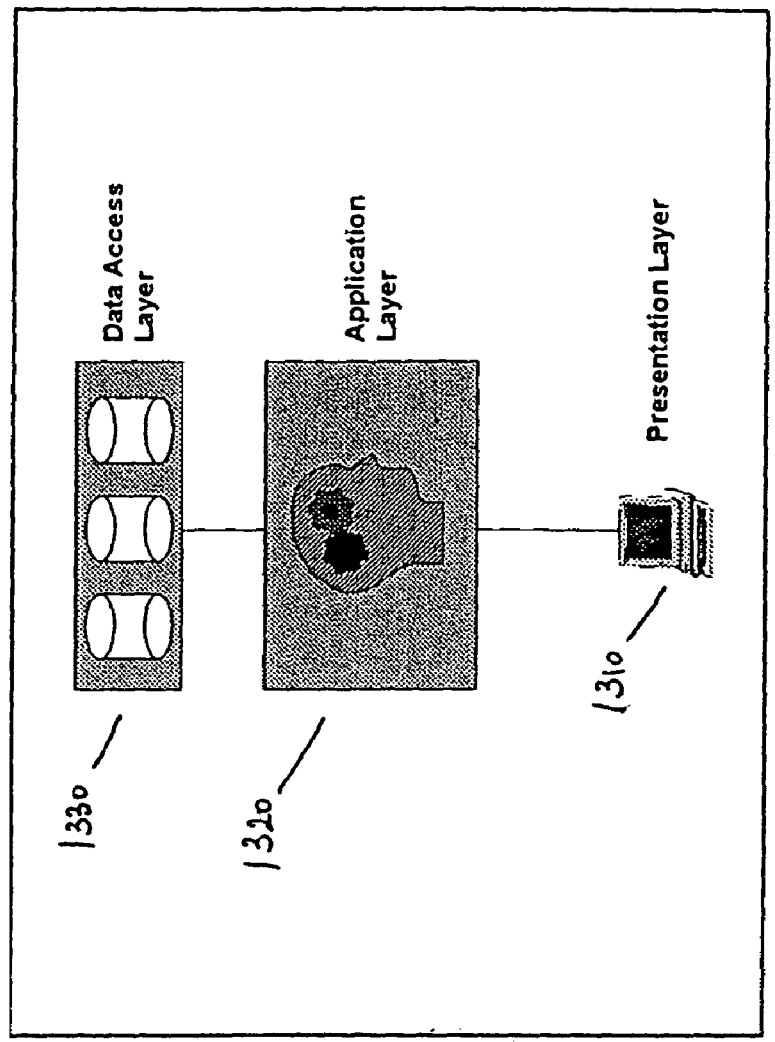
FIG. 39 depicts a distributed, three-tier application model, in accordance with an embodiment of the present invention.

For the above reasons, the technical architecture or infrastructure of the present invention supports a distributed, three-tier application model. The model, which is illustrated in FIG. 39, splits the application functions into three units, or "layers": the Presentation layer 1310, the Application layer 1320, and the Data Access layer 1330.

The Presentation layer 1310 is the part of the application concerned with end user interaction. It provides the user with tools for navigating within an application and executing business transactions. The Presentation layer 1310 handles user data collection, simple data editing/validation, and text/graphical display of data according to the user's commands.

The Application layer 1320 is responsible for enforcing the rules of the business on the user's input transactions. Consider a situation, for example, where a user might attempt to create a new insurance policy (i.e., by invoking the appropriate commands via a Presentation layer module). In order for the policy to successfully be created, it must be associated with an existing account. Upon the user's invoking the desired "create policy" transaction, the transaction's input data would be passed to an Application layer module, which would check to ensure that the target account exists. A similar example is validation of input office codes of a user/insurance agent. The list of valid codes is large and subject to change, and therefore not appropriate to place in the Presentation layer 1310. Instead, an application needing to verify the existence of an office code input by the user would call an Application layer module to perform that task.

The Data Access layer 1330 is responsible for how application data is physically stored, and how it is made available to the Application layer 1320. It is responsible for enforcing database "referential integrity"—that is, insuring that the business relationships between data elements are properly enforced as data is added or removed from the database and for communicating with transaction control mechanisms when updates across multiple databases must be coordinated. Generally speaking, except for DBMS "trigger" code to drive the underlying DBMS' referential integrity mechanisms, there will be very little application logic or responsibility in the Data Access layer 1330.

Well-designed applications that employ the aforementioned three-tiered approach of the present invention will not exhibit the shortcomings that have been experienced in systems built using the typical two-tiered model. The uncoupling of the presentation code, application logic, and data access routings can improve software reusability across the applications of the host data processing system and also can reduce administration costs. This is because these routines will not be inherently dependent on one another. The three-tiered design approach will also allow data to be updated closer to the data source, resulting in less consumption of the communications bandwidth.

The notion of distributed software "components" is fundamental to the design of the three-tiered client/server technical architecture of the present invention. As referred herein, a component is a software object that satisfies a specific business need or system application. Components have well-defined inputs and outputs that are independent of underlying hardware platforms or communication protocols. Because of this, any calling program on any platform that knows its interface can access a component. One of the most important features of a component, however, is that its interface is guaranteed by its developer; as a component is enhanced over time, it is the developer's responsibility to make sure that existing programs dependent on its services will still properly function. Commonly accessed business functions are ideal candidates for implementation as components. For example, the office code access and maintenance functions discussed earlier could be contained within a component, which could then be accessed by any application module of the host data software system needing these functions. This approach is capable of achieving excellent reusability in that a single component, able to provide services to MVS/IMS, MVS/CICS, and Windows NT based programs, is all that is needed in the runtime environment—not one component per application or one per platform.

According to the invention, implementation of a component-based, three-tiered application technical infrastructure of a data processing system is beneficial in ways beyond the traditional two-tiered approach. As discussed earlier, software reuse is a by-product of this approach and will result in lower software development and maintenance costs over the long term. A three-tiered application environment will also be easier for the technical infrastructure to maintain and operate. For instance, if the business requires the functionality provided by a component to be enhanced, only that component will need to be replaced in the runtime environment. Meanwhile, applications using the published interface of that particular component will continue to operate as designed, and will not be affected. Thus, application changes can be made with a minimal amount of development, testing, and administration effort.

In transitioning a business data processing system to a component-based approach, a detailed analysis is made of both the existing software inventory and the projected system requirements of the business. This will identify both the component needs and the possible strategies to achieve those needs for the business (e.g., cases where existing software modules can be reengineered into components versus where components must be built from scratch). A software repository is also built to house the official copies of the components and modules and establish procedures for contributing code and advertising the repository's contents. Once conceived, these procedures can be defined and deployed, and the components for the system infrastructure of the present invention can be designed and implemented, by one skilled in the art.

Figure 40:
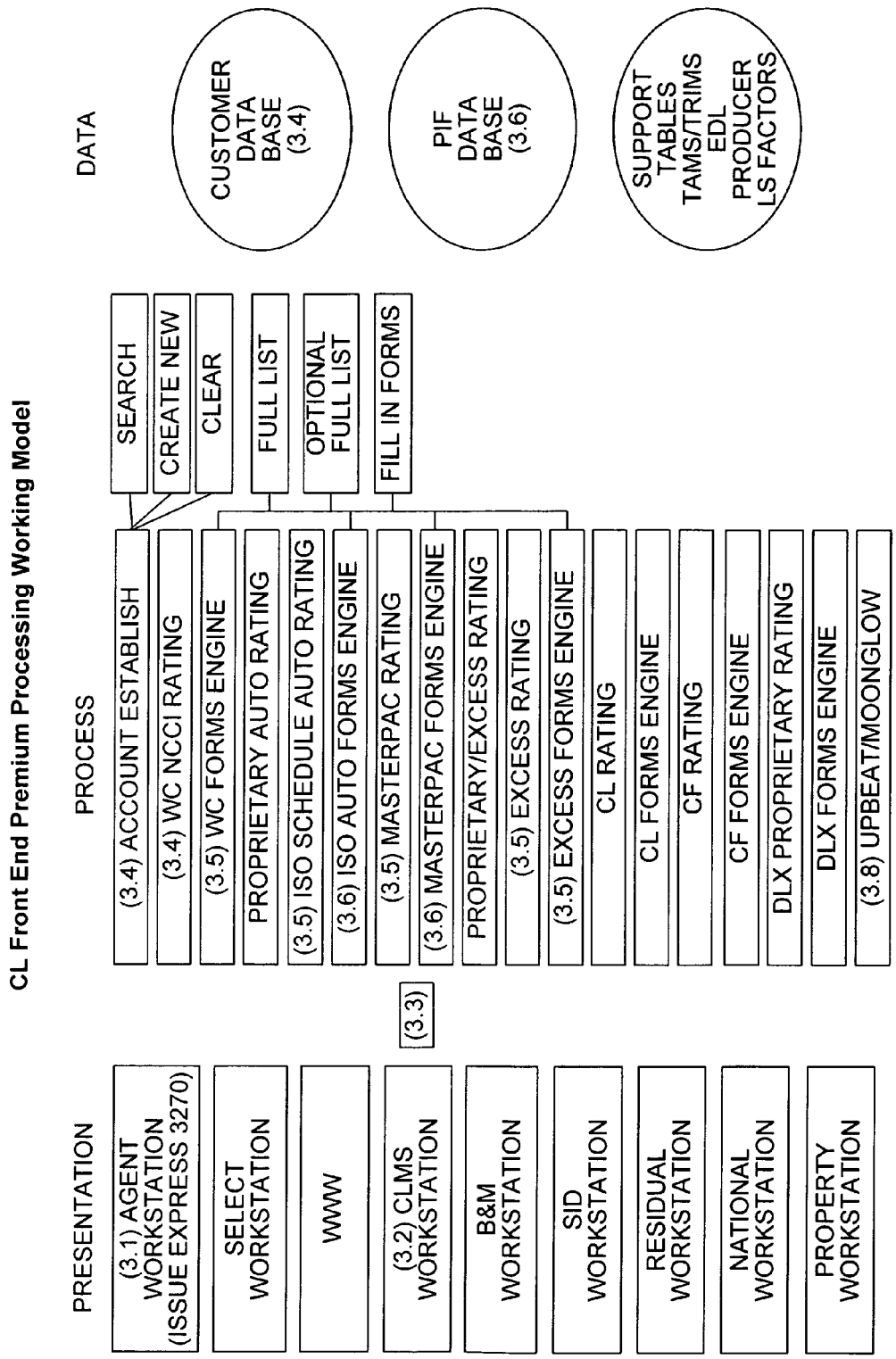
FIG. 40 depicts a three-tiered working model of a front-end premium processing environment for a data processing system, in conformance with the three-tiered application approach shown in FIG. 39, in accordance with an embodiment of the present invention.

FIG. 40 illustrates the three-tiered working model of the front-end premium processing environment for a data processing system of the present invention, in accordance with the three-tiered application approach shown in FIG. 39. This environment is distributed in nature, supporting continued access to MVS/IMS and MVS/CICS legacy applications as well as to client/server applications shown under the "process" (application) column in FIG. 40. Because the presentation logic and application logic may be independent from one another, the environment of FIG. 40 will allow an authorized user running on any platform under the "Presentation" column to access any application. The standard desktop configuration will allow the user to access multiple applications simultaneously (i.e., in different application windows), regardless of whether the user is locally or remotely logged in.

To the users, the most significant difference between the known system architecture environment and that of the present invention is the presentation of applications on the desktop. Specifically, the presentation layer may be based on Hypertext Markup Language (HTML) browser technology, with a standard HTML-capable vendor product (e.g., Microsoft Internet Explorer or Netscape Navigator/Communicator) as the desktoppresentation "engine." A browser-based presentation approach is beneficial to the users in several ways. First, HTML/browser technology forces the developer to separate presentation logic and application logic early in the design process, and thus helps to achieve software reuse in the application layer. Second, software distribution to the users is simplified because HTML/browser applications are server-based in their design, so the users can run multiple applications via this approach without having to install additional software on the desktop beyond the browser and its supporting tools. Furthermore, the browser-based approach requires only a minimum of hardware and software to be installed on the user's desktop. Finally, browser-based applications can be run locally over a local area network or remotely via dial-up with only minimal reconfiguration on the desktop, and without change in user presentation.

Figure 41:
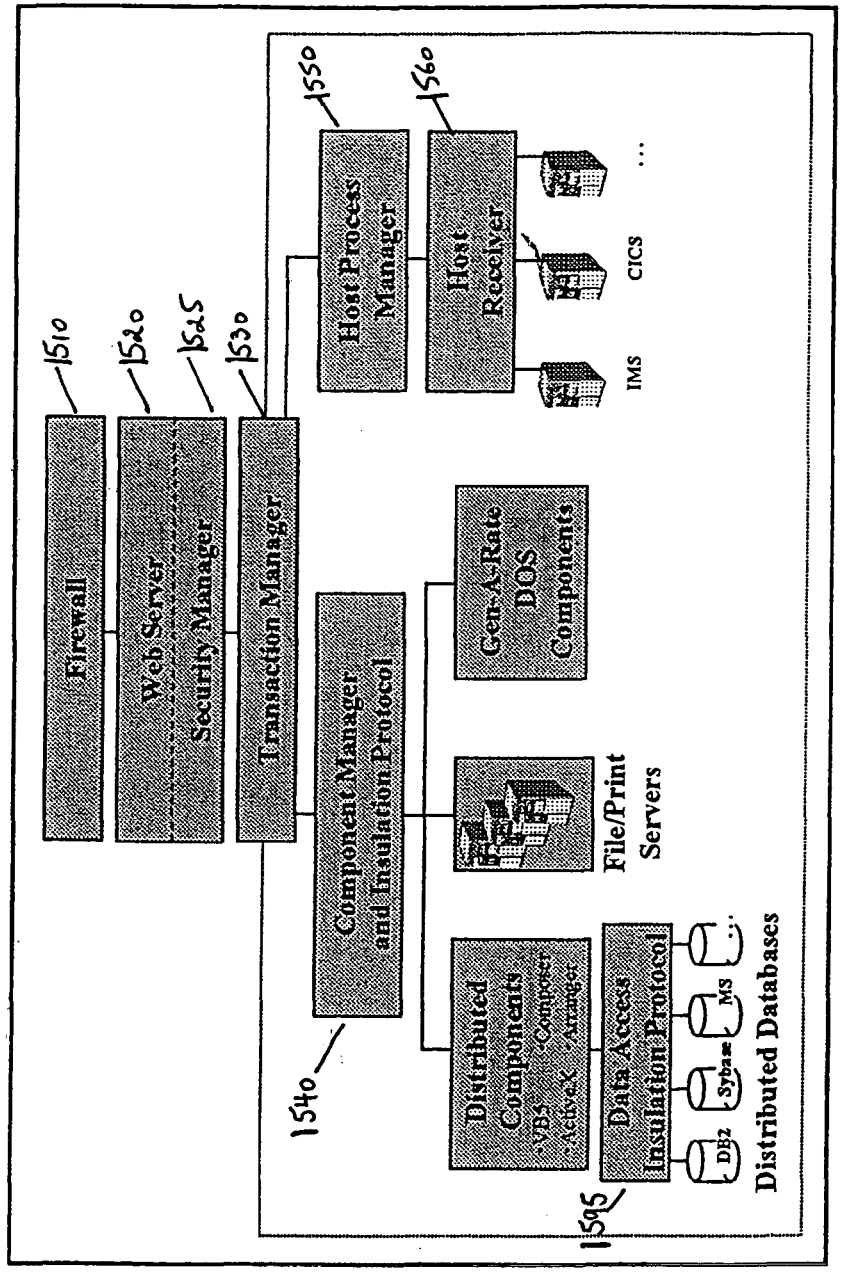
FIG. 41 depicts a technical infrastructure of the present invention with new services identified in greater detail, in accordance with an embodiment of the present invention.

From an operation perspective, there are two obvious differences between the known system architecture and the technical infrastructure of the present invention. One difference is that the technical infrastructure of the present invention uses the TCP/IP network protocol in order to support HTML browser communications, whereas SNA is the dominant protocol in the known environment. The second difference is that several new services may be introduced to manage communications between components and supporting vendor products. FIG. 41 shows the technical infrastructure of the present invention with the new services identified in greater detail. Specifically, the infrastructure services include: firewall 1510, web server 1520, security manager 1525 set up at the web server 1520, transaction manager 1530, component manager 1540, host process manager 1550, and data access insulation protocol 1595.

As is known in the art, firewalls are security mechanisms. According to one embodiment of the present invention, the firewall 1510 may be implemented via a combination of hardware and software. It is used to limit application and data access in an HTML/browser-based environment to authorized users. The firewall 1510 is implemented in a manner to force users to authenticate themselves with a login name and password upon requesting access. The web server 1520 manages the flow of data between the browser software on the user's desktop and the application accessed via the browser. This function may be performed through the use of a remote procedure call mechanism implemented over TCP/IP called the Hypertext Transfer Protocol (HTTP). Microsoft Internet Information Server (IIS) and IBM Lotus Domino are examples of the web server software products for the Windows NT environment. The security manager 1525 is a distributed mechanism used in the technical infrastructure of the present invention for authenticating users via a single login and defining what data and applications they should have access. This mechanism can be accomplished through the integration of various tools, including Windows NT security administration, MVS/RACF security administration, and Kerberos-based public-key data encryption.

The transaction manager 1530 is a distributed transaction manager, or "transaction processing monitor" (TPM), used in the technical infrastructure of the present invention to coordinate the execution of synchronous business transactions composed of multiple physical updates on one or more platforms (e.g., servers and mainframes). It is the transaction manager's role to coordinate the execution of application threads across the enterprise where needed, and ensure that all required updates have occurred on all platforms or to abort or "roll back" the business transaction if they cannot. Products available to perform this function include, for example, Microsoft Transaction Server (MTS) and IBM's Encina. The component manager and insulation protocol 1540 is also called an Object Request Broker (ORB). Its purpose is to, upon an application module's requesting the services of a component installed in the runtime environment, determine where an instance of that component is located (in the distributed components 1590) and route the request to it for processing. This service may be realized by integrating several vendor tools, such as Microsoft Active Directory service and TI's Composer. The data access insulation protocol 1595 provides a mechanism for applications to communicate commands to different vendor database products in a consistent manner. This mechanism can be implemented in distributed systems environments by Microsoft Open Database Connectivity (ODBC) or Application Database Objects (ADO) protocols, or Sun Microsystems Java Database Connectivity (JDBC) protocol. The host process manager 1560 coordinates the execution of synchronous transactions on the individual host where it resides. It can be implemented by IMS/DC and CICS in an IBM mainframe environment or MTS on Windows NT-based servers. Together, the transaction manager 1530, component manager 1540, host process manager 1550, and data access insulation protocol 1595 provide a layer of technical insulation between the user interface (web browser and web server) and existing host and client/server systems. This technical insulation provides a number of benefits, including: a common "look and feel" of user interface; leverage investment in product rules that already meet the needs of the business; mix and match client/server and host processes in a single business transaction; achieve performance and capacity improvements by placing processes on the platforms best suited to them (host mainframe or server); facilitate sharing of product and function across business lines; common "plumbing" for all applications. The placement of the Internet or web server 1520 in front of the aforementioned technical layer also: enables any of the system products and processes to be extended to the business web page; enables the creation of the "easy to use" user interfaces (e.g., with fewer screens); provide information directly to the users; and minimize dependency from the hardware and software running at the user.

The technical infrastructure environment of the present invention also include asynchronous message service for applications that require reliable data transmission between servers. This "message oriented middleware" capability can be implemented using IBM's MQ series queuing software. Another possibility is the Microsoft Message Queuing Service (MSMQ) that can provide similar capabilities under Windows NT. With the infrastructure of the present invention, remote data access has virtually been eliminated, with updates taking place at the data source for later transmission instead of at a remote machine. To further improve application response times and to increase available communications bandwidth, office automation tools can be directly installed on users' desktops. Furthermore, applications are channeled to the user desktop via a common mechanism, the browser, which can be used to establish a common "look and feel" across applications of the host data processing system.

Figure 42:
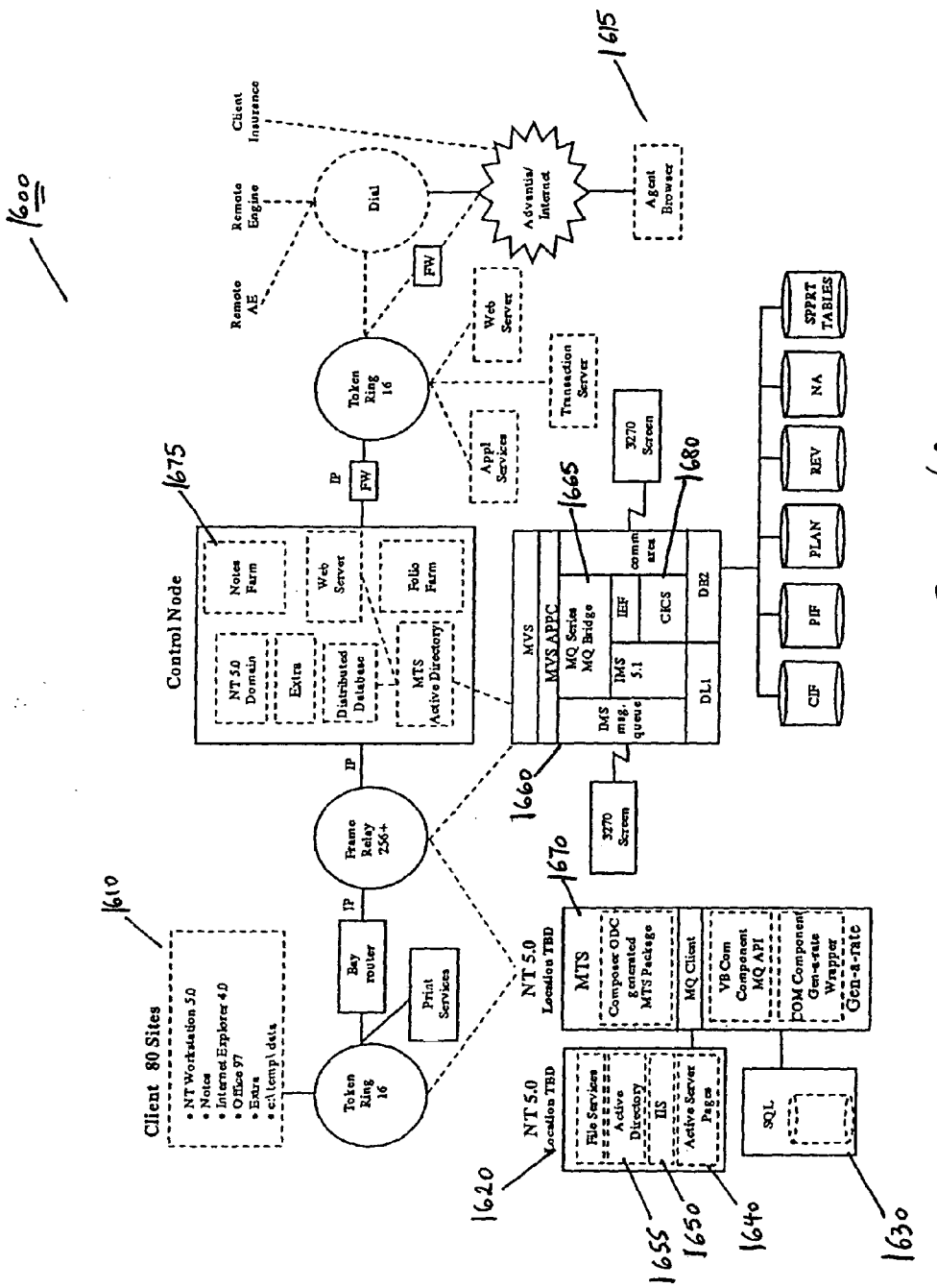
FIG. 42 depicts an implementation of the technical infrastructure of FIG. 41 to a data processing system, in accordance with an embodiment of the present invention.

FIG. 42 depicts a data processing system 1600 according to an implementation of the technical infrastructure shown in FIG. 41. The infrastructure of system 1600 can support "traditional" client GUI development (i.e., using Visual Basic and other languages) and clients designed for use over either the Internet or an Intranet. A key desktop component supporting the system applications is a browser at the local user 1610 or remote user 1615 that is capable of presenting forms and data to the user via a mix of HTML, ActiveX, and Java technologies. This approach provides great flexibility in how information can be displayed and collected on the desktop. As mentioned earlier, the primary protocol used for communication to the desktop is HTTP. Using the browser as the primary presentation engine also provides delivery of identical applications to the local and remote users 1610 and 1615, with the only difference being in how connectivity to the servers and mainframes of the system infrastructure is established (i.e., LAN/WAN for local Intranet users or dial-up for remote users). The client configuration for a user's desktop connected to the Intranet may include: a processor with sufficient processing speed and sufficient support memory, sufficient memory storage capacity, and the desired software. An example of such a desktop is an Intel Pentium-based PC, with at least 63 MB of memory and a 1.0 GB hard disk drive, Windows NT Workstation, Microsoft Internet Explorer, Microsoft Office 97, Lotus Notes, Adobe Acrobat Document Reader, TCP/IP network drivers and MC hardware, and Folio (accessed via the Internet Explorer browser). In addition to the above tools, some laptop users desiring a fully functional "disconnected" environment will also have Microsoft SQL Server DMBS for Windows NT installed. The tools desired on remote desktops include: an Internet Explorer-compatible browser; TCP/IP dial-up networking support; a modem with sufficient speed, and Adobe Acrobat Reader.

The Data Access layer of the technical infrastructure of the present invention may comprise a mix of IMS/DB, DB2, and Lotus Notes databases, as shown throughout in FIG. 42. Most new mainframe databases and transactions will use DB2 via the MVS/CICS environment, with a minimum of new development targeting the IMS environment. Any existing inventory of IMS databases and transactions of the data processing system may be leveraged via the use of IBM MQ Bridge for IMS 1665, which will allow for the initiation of IMS transactions from the CICS environment via MVS cross-memory services. As mentioned earlier, the active directory service 1655 and TI composer implement the component manager. Microsoft SQL Server 1630 can be utilized on the Windows NT server platform 1620 in situations where an application requires the storage of local WIP data. Lotus Notes servers 1675 maintained under the Windows NT Server can support the storage of unstructured data (e.g., documents and file attachments) in the system infrastructure environment of the present invention.

According to an embodiment of the present invention, the application logic for the technical infrastructure will exist on both the Windows NT server platform 1620 and MVS/CICS platform 1660. Desktop software will typically connect to NT server-based application logic through the use of Active Server pages (ASPs) 1640, a Microsoft technology that allows for the dynamic formatting of HTML pages based on the data to be displayed. The ASPs 1640 are enabled through the use of Microsoft's Internet Information Server (IIS) web server 1650 on the NT server platform 1620, and are capable of initiating back-end application processes on both NT servers and on the mainframe via IBM's MQ Series software. Thus, the IIS web server is used to support connectivity between the infrastructure's Presentation and Application layers. Under CICS 1680, the application logic may be developed using TI Composer, with connectivity to these modules provided via the MQ Series software as well.

The MTS 670 and IBM MQ Series 1665 provide the "glue" to hold this distributed environment together. As mentioned earlier, the MTS 1670 will be used as a transaction manager to manage application threads executing under Windows NT, and MQ will be used directly by ASPS or associated back-end processes to connect to the mainframe when needed. The MQ Series software provides the best path to MVS legacy integration in the system technical infrastructure. The use of MQ IMS bridge and MQ CICS bridge provides the best possible performance when invoking mainframe transactions in the system environment of the present invention. Alternatively, TI may provide support within its Composer product to allow MTS to control Composer-based application access on the mainframe, as well as Windows NT-based processes. Data communications in the new environment will be supported via HTTP application data streams riding over the TCP/IP communications protocol.

Software development in the system environment of the present invention may be accomplished via a mix of Microsoft Active Studio tools for Windows NT workstation- and server-based components and TI Composer for Windows NT server and MVS/CICS-based components. For instance: Microsoft InterDev may be used for most browser-based application screens (i.e., those that can be built using the HTML language); Microsoft Visual Studio may be used to create ActiveX controls to implement desktop functionality that is not easily accomplished with HTML alone; it may also be used to support the creation of ASPs for the Application layer, and can also be used to develop back-end processing modules for the Windows NT server platform; TI Composer may, be used for developing back-end processing modules for the Windows NT platform, particularly when such modules must carry out complex logic or system-level functions; and TI Composer may also be used to develop both application logic and new data layer modules for the MVS/CICS platform.

The data processing system 1600 is a true three-tier architecture that allows an application's presentation, business logic, and data access mechanisms to be independent from one another. Software designed for this architecture can be engineered for a high degree of reusability and customization. The use of the HTTP data communications protocol will allow CL to employ a "thin client" approach to application design, requiring a minimum of software on the desktop. This approach will allow an application's "look and feel" to be identical for both local and remote users, and require a minimum of software maintenance and administration. The system 1600 also accomplishes a high degree of integration with any existing IMS environment, as well as other existing server applications.

Figure 43:
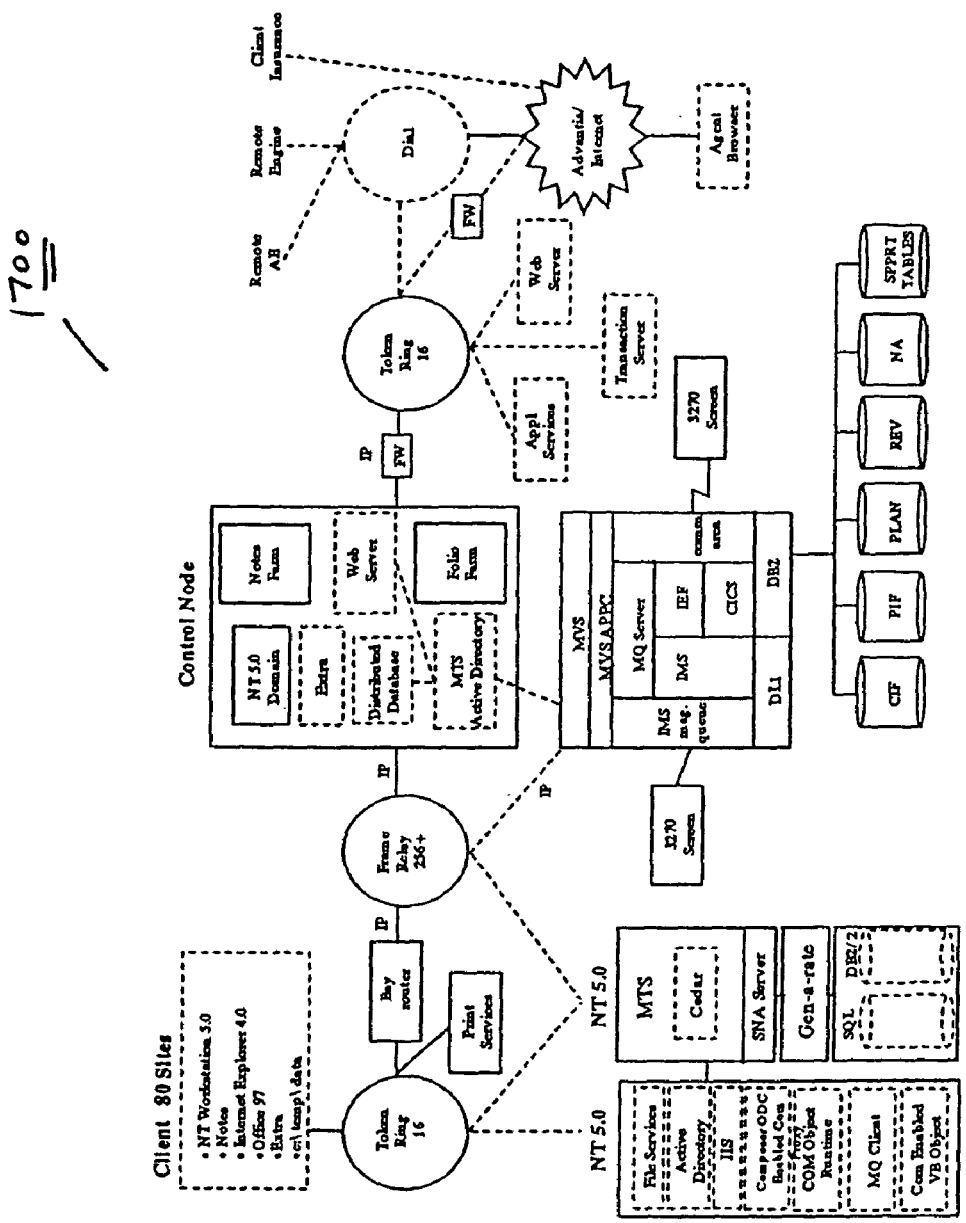
FIG. 43 depicts another implementation of the technical infrastructure of FIG. 41 to a data processing system, in accordance with an embodiment of the present invention.
Figure 44:
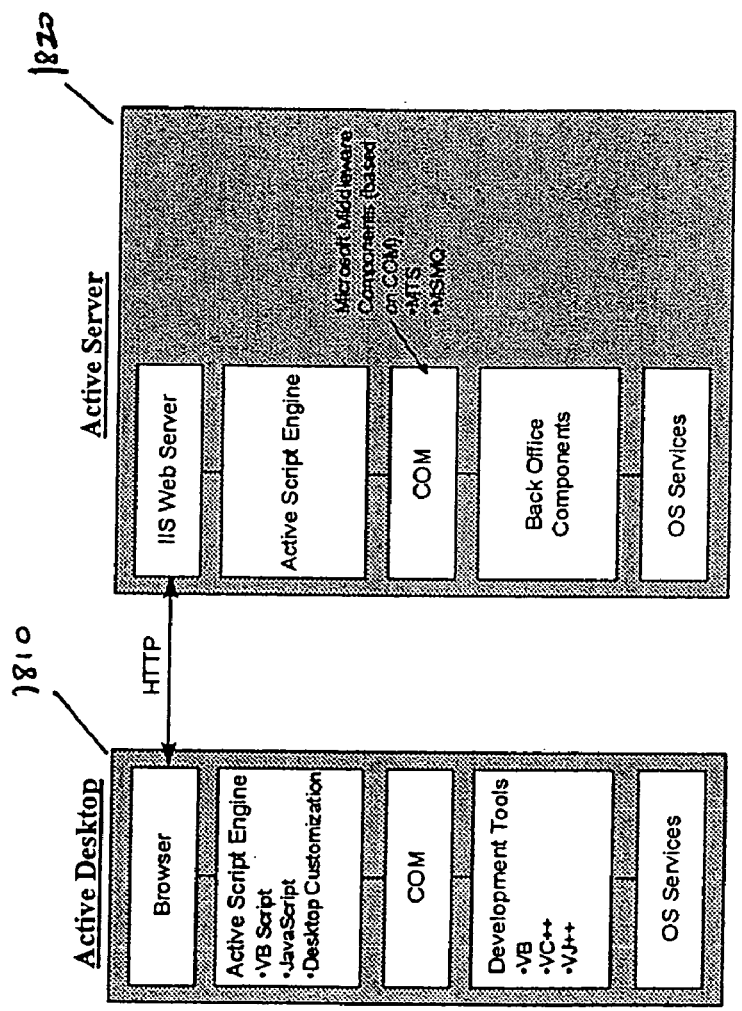
FIG. 44 depicts the Microsoft "Active Platform" distributed systems architecture.

FIG. 43 depicts a data processing system 1700 according to another implementation of the technical infrastructure shown in FIG. 41. The technical infrastructure of the system 1700 is based on Microsoft's distributed systems architecture direction named "Active Platform." This architecture comprises desktop 1810 and server 1820 components, as illustrated in FIG. 44. Execution of logical transactions across multiple physical platforms is also coordinated in the "Active Platform" environment using MTS. The difference between the system architectures 1600 and 1700 is that in the latter to facilitate initiation of MVS transactions, a Windows NT-based synchronous communication service named "Cedar" can be used in conjunction with Microsoft SNA server for NT to insert transaction requests to the IMS Message Queue or CICS Communications Area on MVS. The presentation services available to support the "Active Desktop" of the aforementioned "Active platform" include: HTML language—prepared using Microsoft Visual InterDev, Microsoft FrontPage, or a third-party HTML editor; ActiveX controls—compiled using any Microsoft 32-bit development language; VB Script language; Active Server pages—code written in a Microsoft language is stored and executed on an IIS web server, but resulting presentation objects are rendered on the desktop via a browser; Java applets—compiled using Microsoft Visual J++, downloaded to the desktop and executed via a browser; and JavaScript language. Most of the application functionality resides on the servers under this technical architecture, and could be updated largely independently of the client's desktops. Remote users dialing in to the environment 1700 using the "Active Desktop" would also require only a minimal software environment (i.e., a browser, or a client application implementing functionality) on their machines to connect. Under the "Active Desktop", the only difference between the local and remote environments would be that remote users would connect to the system servers via Windows Dial-Up Networking through one or more firewalls.

Figure 45:
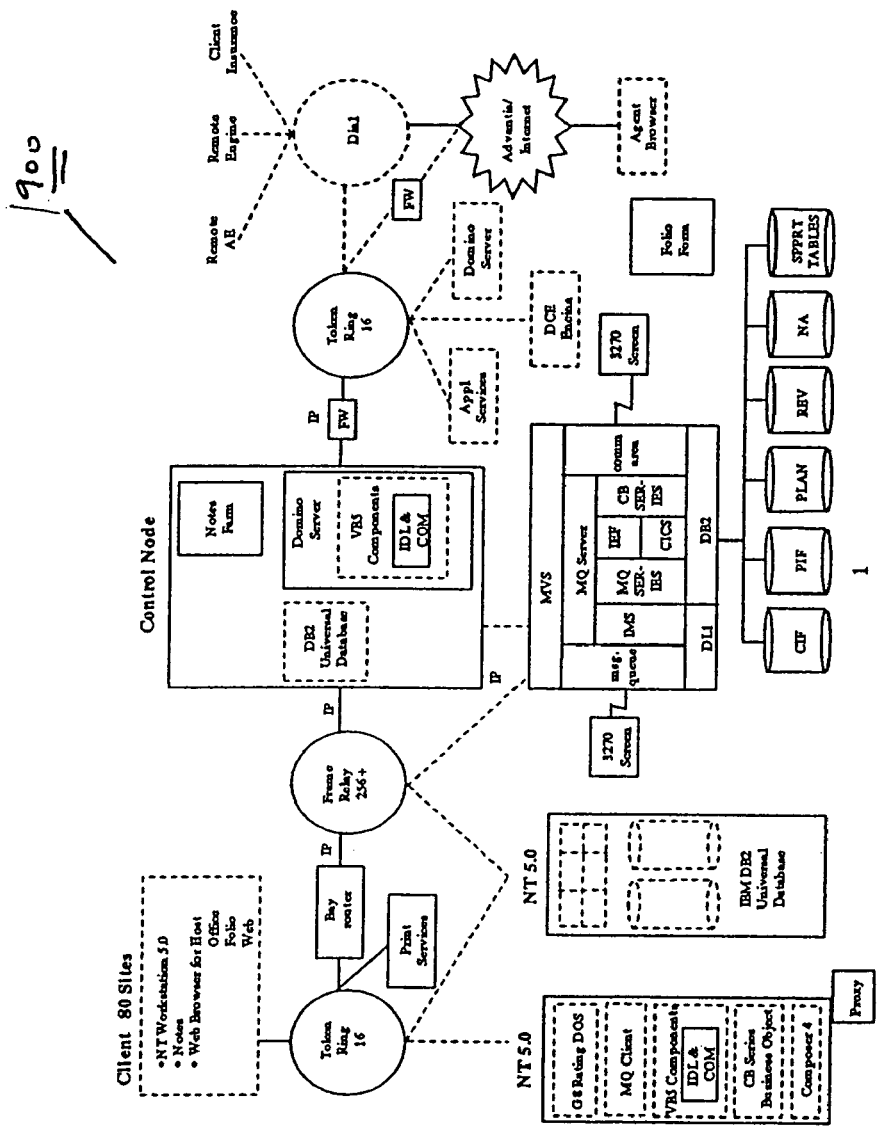
FIG. 45 depicts still another implementation of the technical infrastructure of FIG. 41 to a data processing system, in accordance with an embodiment of the present invention.
Figure 46:
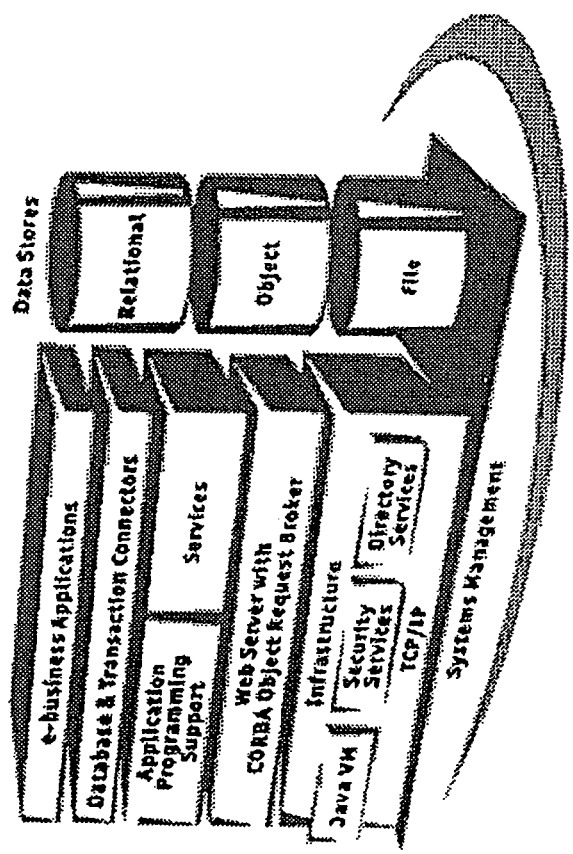
FIG. 46 depicts the IBM "Network Computing Framework" distributed systems architecture vision.

FIG. 45 depicts a data processing system 1900 according to still another implementation of the technical infrastructure shown in FIG. 41. The technical infrastructure of the system 1900 is based on IBM's distributed systems architecture vision named "Network Computing Framework" (NCF). FIG. 46 illustrates the NCF at a higher level. In the NCF, two protocols, HTTP and HOP, are used to facilitate the exchange of data. HTTP, which is used to enable browser-based applications, will provide a tactical mechanism for allowing users to initiate transactions over the NCF. For these applications, IBM's Lotus Domino web server can provide a means for allowing the desktop to communicate with CORBA-compliant server components. Asynchronous submission of MVS/IMS and MVS/CICS transactions in the NCF is supported by IBM's MQ Series software. The presentation services available to support the NCF include: HTML, Java, JavaScript, and C++ languages. DB2 is the database manager of choice in the NCF environment. Communication with physical databases under NCF is accomplished via the Java Database Connectivity (JDBC) protocol. Numerous DBMSs, including DB2, Sybase SQL Server, and Microsoft SQL Server, are accessible via JDBC.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. Furthermore, any means-plus-function clauses in the claims (invoked only if expressly recited) are intended to cover the structures described herein as performing the recited function and all equivalents thereto, including, but not limited to, structural equivalents, equivalent structures, and other equivalents.

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention.

What is claimed is:

1. A computer system architecture for providing remote access to insurance applications to a user computer at a remote location, comprising:
    an insurance computer system comprising:
        a memory comprising one or more computer databases storing predetermined rules and data relating to the insurance applications;
        at least one processor retrieving the predetermined rules from said one or more computer databases, and executing instructions responsive thereto; and
        a service oriented application architecture executed by said at least one processor, and configured to include:
    a presentation layer accessible to the user computer at the remote location that provides tools for navigating within the insurance applications and executing transactions, wherein the presentation layer comprises web browser technology;

an application layer that executes the predetermined rules retrieved from said computer databases responsive to commands and transactions input from the user computer located at the remote location;

a data access layer that manages physical storage of the application data in the databases and provides the application layer with access to the application data; and a distributed technical layer separating a presentation logic of the presentation layer from an application logic of the application layer, wherein the distributed technical layer is configured to coordinate an execution of the insurance applications on one or more different platforms.

2. The system architecture of claim 1, wherein the presentation layer uses TCP/IP network protocol to remotely access the applications.

3. The system architecture of claim 1, wherein the presentation layer remotely accesses the applications through a private data network.

4. The system architecture of claim 1, wherein the presentation layer remotely accesses the applications through a public data network.

5. The system architecture of claim 1, wherein the distributed technical layer is further configured to locate components of the insurance applications requested by the application layer.

6. The system architecture of claim 5, wherein the distributed technical layer is further configured to direct an insurance application of the insurance applications requested by the application layer to communicate commands to the databases.

7. The system of claim 6, wherein at least one of the databases resides on a host mainframe.

8. The system architecture of claim 7, wherein the distributed technical layer is further configured to coordinate an execution of synchronous transactions on the host mainframe.

9. The system architecture of claim 6, wherein at least one of the databases reside on a host mainframe, and the distributed technical layer is further configured to coordinate an execution of synchronous transactions on the host mainframe.

10. The system architecture of claim 1, wherein the distributed technical layer is further configured to coordinate updates to the insurance applications.

11. The system architecture of claim 1, wherein the distributed technical layer is further configured to determine whether it can coordinate updates to the insurance applications, and if it cannot coordinate the updates, roll back any of the updates that have occurred.

12. The system architecture of claim 1, wherein the distributed technical layer is further configured to coordinate an execution of business transactions on the one or more different platforms.

13. The system architecture of claim 1, wherein each of the one or more different platforms comprise at least one of a server and a mainframe executing at least one insurance application of the insurance applications.

14. The system architecture of claim 1, wherein each of the one or more different platforms comprise at least one of a server and a mainframe.

15. The system architecture of claim 1, wherein said service oriented application architecture uncouples presentation processes, application processes, and data access processes.

16. The system architecture of claim 1, wherein the application layer utilizes components.

17. The system architecture of claim 1, wherein the application layer comprises components executing the predetermined rules retrieved from said computer databases responsive to commands and transactions input from the user computer located at the remote location.

18. The system architecture of claim 1, wherein the data access layer enforces database referential integrity.

19. The system architecture of claim 1, wherein the data access layer enforces database referential integrity concurrently with managing physical storage of the application data in the databases and providing the application layer with access to the application data.

20. A computer system architecture for providing remote access to insurance applications to a user computer at a remote location, comprising:

an insurance computer system comprising:

a memory comprising one or more computer databases storing predetermined rules and data relating to the insurance applications;

at least one processor retrieving the predetermined rules from said one or more computer databases, and executing instructions responsive thereto; and a service oriented application architecture executed by said at least one processor, and configured to include:

a presentation layer accessible to the user computer at the remote location that provides tools for navigating within the insurance applications and executing transactions, wherein the presentation layer comprises web browser technology;

an application layer that executes the predetermined rules retrieved from said computer databases responsive to commands and transactions input from the user computer located at the remote location; and a data access layer that manages physical storage of the application data in the databases and provides the application layer with access to the application data, the presentation layer, application layer, and data access layer communicating to provide the remote access.

21. The system architecture of claim 20, wherein the presentation layer uses TCP/IP network protocol to remotely access the applications.

22. The system architecture of claim 20, wherein the presentation layer remotely accesses the applications through a private data network.

23. The system architecture of claim 20, wherein the presentation layer remotely accesses the applications through a public data network.

24. The system architecture of claim 20, wherein said service oriented application architecture uncouples presentation processes, application processes, and data access processes.

25. The system architecture of claim 20, wherein the application layer utilizes components.

26. The system architecture of claim 20, wherein the application layer comprises components executing the predetermined rules retrieved from said computer databases responsive to commands and transactions input from the user computer located at the remote location.

27. The system architecture of claim 20, wherein the data access layer enforces database referential integrity.

28. The system architecture of claim 20, wherein the data access layer enforces database referential integrity concurrently with managing physical storage of the application data in the databases and providing the application layer with access to the application data.

* * * * *